US007559838B2

(12) United States Patent
Walker et al.

(10) Patent No.: US 7,559,838 B2
(45) Date of Patent: Jul. 14, 2009

(54) GAMING DEVICE AND METHOD OF OPERATION THEREOF

(75) Inventors: Jay S. Walker, Ridgefield, CT (US); James A. Jorasch, Stamford, CT (US); Magdalena M. Fincham, Norwalk, CT (US); Geoffrey M. Gelman, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 904 days.

(21) Appl. No.: 10/361,201

(22) Filed: Feb. 7, 2003

(65) Prior Publication Data

US 2003/0119579 A1 Jun. 26, 2003

Related U.S. Application Data

(63) Continuation-in-part of application No. 09/521,875, filed on Mar. 8, 2000, now Pat. No. 6,520,856, which is a continuation of application No. 09/052,291, filed on Mar. 31, 1998, now Pat. No. 6,068,552.

(51) Int. Cl.
*G06F 17/00* (2006.01)

(52) U.S. Cl. .......................................................... 463/21

(58) Field of Classification Search ............. 463/16–25, 463/30, 31

See application file for complete search history.

(56) References Cited

U.S. PATENT DOCUMENTS 4,184,683 A 1/1980 Hooker
4,448,419 A 5/1984 Telnaes .................. 273/143 R (Continued)

FOREIGN PATENT DOCUMENTS

GB 2161008 A 1/1986

(Continued)

OTHER PUBLICATIONS

Brewer, Kathleen Pearl, Cummings, Leslie E., "Gaming language: getting a handle on slots.", Cornell Hotel & Restaurant Administration Quarterly, Apr. 1995, Section: vol. 36, No. 2, p. 74, ISSN: 0010-8804.

(Continued)

*Primary Examiner*—Ronald Laneau

(57) ABSTRACT

A gaming device such as a video based gaming device provides a player the ability to modify at least one element of the gaming device. The gaming device may then modify other elements to ensure a desired house advantage. The probability of occurrence for one or more outcomes, the payout corresponding to one or more outcomes, and the wager amount required to play a game, may be modified by a player. The gaming device may then automatically determine changes in the values of other elements in order to maintain a constant house advantage. The player may also impose constraints on the value of one or more elements so that the gaming device cannot change the constrained elements in maintaining the house advantage. Software running on the gaming device may use an equation that takes into account pertinent elements such as the size of the jackpot, the size of the wager needed to play each game, and probability of hitting the jackpot during a game. Based on the equation, the software may adjust elements other than the element(s) specified by the player so that, for example, the house advantage remains constant with each game. A player interface provides an easy to use method of modifying selected elements.

30 Claims, 25 Drawing Sheets

U.S. PATENT DOCUMENTS

| | | | | |
|---|---|---|---|---|
| 4,570,934 | A | 2/1986 | Smyth | |
| 4,669,731 | A | 6/1987 | Clarke | |
| 4,679,143 | A | 7/1987 | Hagiwara | 364/412 |
| 4,695,053 | A | 9/1987 | Vazquez, Jr. et al. | 273/143 R |
| 4,760,245 | A | 7/1988 | Fukaya | 235/379 |
| 4,856,787 | A | 8/1989 | Itkis | |
| 4,939,705 | A | 7/1990 | Hamilton | |
| 4,991,848 | A | 2/1991 | Greenwood et al. | 273/143 R |
| 5,083,271 | A | 1/1992 | Thacher | |
| 5,108,099 | A | 4/1992 | Smyth | |
| 5,123,649 | A | 6/1992 | Tiberio | 273/143 R |
| 5,178,390 | A * | 1/1993 | Okada | 273/143 R |
| 5,179,517 | A | 1/1993 | Sarbin | |
| 5,242,163 | A | 9/1993 | Fulton | |
| 5,259,616 | A | 11/1993 | Bergmann | 273/138 A |
| 5,275,400 | A | 1/1994 | Weingardt et al. | 273/85 CP |
| 5,277,424 | A * | 1/1994 | Wilms | 463/12 |
| 5,342,047 | A | 8/1994 | Heidel | |
| 5,356,140 | A | 10/1994 | Dabrowski | |
| 5,370,399 | A | 12/1994 | Liverance | |
| 5,393,057 | A | 2/1995 | Marnell, II | |
| 5,393,061 | A | 2/1995 | Manship | |
| 5,401,023 | A | 3/1995 | Wood | 273/85 CP |
| 5,409,225 | A | 4/1995 | Kelly | |
| 5,449,173 | A | 9/1995 | Thomas | |
| 5,494,287 | A | 2/1996 | Manz | 273/143 R |
| 5,511,784 | A | 4/1996 | Furry | |
| 5,544,892 | A | 8/1996 | Breeding | |
| 5,559,312 | A | 9/1996 | Lucero | |
| 5,564,700 | A | 10/1996 | Celona | |
| 5,580,308 | A | 12/1996 | Nakamura | |
| 5,580,309 | A | 12/1996 | Piechowiak | |
| 5,586,766 | A | 12/1996 | Forte | |
| 5,603,502 | A | 2/1997 | Nakagawa | |
| 5,611,730 | A | 3/1997 | Weiss | |
| 5,639,088 | A | 6/1997 | Schneider et al. | 273/138.2 |
| 5,655,961 | A | 8/1997 | Acres et al. | 463/27 |
| 5,664,998 | A | 9/1997 | Seelig | |
| 5,695,400 | A | 12/1997 | Fennell | |
| 5,695,402 | A | 12/1997 | Stupak | |
| 5,697,843 | A | 12/1997 | Manship | |
| 5,702,304 | A | 12/1997 | Acres | |
| 5,704,835 | A | 1/1998 | Dietz, II | 463/20 |
| 5,720,662 | A | 2/1998 | Holmes, Jr. | |
| 5,722,891 | A | 3/1998 | Inoue | |
| 5,741,183 | A | 4/1998 | Acres | |
| 5,755,621 | A | 5/1998 | Marks | |
| 5,761,647 | A | 6/1998 | Boushy | |
| 5,770,533 | A | 6/1998 | Franchi | |
| 5,800,264 | A | 9/1998 | Pascal | |
| 5,811,772 | A | 9/1998 | Lucero | |
| 5,823,879 | A | 10/1998 | Goldberg | |
| 5,833,537 | A | 11/1998 | Barrie | |
| 5,833,538 | A | 11/1998 | Weiss | |
| 5,833,540 | A | 11/1998 | Miodunski | |
| 5,836,586 | A | 11/1998 | Marks | |
| 5,848,932 | A | 12/1998 | Adams | |
| 5,851,147 | A | 12/1998 | Stupak et al. | 463/13 |
| 5,882,260 | A | 3/1999 | Marks | |
| 5,910,048 | A | 6/1999 | Feinberg | |
| 5,979,702 | A | 11/1999 | Hennessey | |
| 5,980,384 | A * | 11/1999 | Barrie | 463/16 |
| 5,997,400 | A | 12/1999 | Seelig | |
| 5,997,401 | A | 12/1999 | Crawford | |
| 6,004,207 | A | 12/1999 | Wilson | |
| 6,015,344 | A * | 1/2000 | Kelly et al. | 463/16 |
| 6,019,374 | A | 2/2000 | Breeding | |
| 6,033,307 | A | 3/2000 | Vancura | |
| 6,039,648 | A | 3/2000 | Guinn | |
| 6,053,813 | A | 4/2000 | Mathis | |
| 6,068,552 | A | 5/2000 | Walker | |
| 6,077,162 | A | 6/2000 | Weiss | |
| 6,077,163 | A | 6/2000 | Walker | |
| 6,089,975 | A | 7/2000 | Dunn | |
| 6,093,100 | A | 7/2000 | Singer | |
| 6,110,043 | A * | 8/2000 | Olsen | 463/27 |
| 6,113,102 | A | 9/2000 | Marks | |
| 6,135,882 | A | 10/2000 | Kadlic | |
| 6,142,872 | A | 11/2000 | Walker | |
| 6,165,071 | A | 12/2000 | Weiss | |
| 6,203,430 | B1 | 3/2001 | Walker | |
| 6,264,560 | B1 | 7/2001 | Goldberg | |
| 6,270,409 | B1 | 8/2001 | Shuster | 463/20 |
| 6,270,412 | B1 | 8/2001 | Crawford | |
| 6,287,202 | B1 | 9/2001 | Pascal | |
| 6,302,790 | B1 * | 10/2001 | Brossard | 463/20 |
| 6,312,332 | B1 | 11/2001 | Walker | |
| 6,364,765 | B1 | 4/2002 | Walker | |
| 6,375,187 | B1 | 4/2002 | Baerlocher | |
| 6,471,589 | B1 | 10/2002 | Nagano | |
| 6,520,856 | B1 | 2/2003 | Walker et al. | |
| 6,606,602 | B1 | 8/2003 | Kolls | |
| 6,857,959 | B1 * | 2/2005 | Nguyen | 463/25 |
| 6,887,157 | B2 * | 5/2005 | LeMay et al. | 463/32 |
| 2002/0042294 | A1 * | 4/2002 | Pau et al. | 463/16 |
| 2004/0072613 | A1 * | 4/2004 | Visocnik | 463/25 |

FOREIGN PATENT DOCUMENTS

| | | |
|---|---|---|
| WO | WO 96/08295 | 3/1996 |
| WO | WO 98/19280 | 5/1998 |

OTHER PUBLICATIONS

Rose, Bob, "New Ways for the House to Win", St. Louis Post-Dispatch, Oct. 3, 1996, Section: Get Out, p. 50.

"Shuffle Master Begins Immediate Rollout of Five Deck Frenzy and Introduces New Version of Let It Ride", PR Newswire, Jun. 30, 1997, Section: Financial News.

Review: "Five Deck Frenzy", by Shuffle Master and IGT, (http //pitboss com/R-5deck shtm), download date: Feb. 1, 1998.

Notice of Allowance U.S. Appl. No. 09/521,875, filed Mar. 8, 2000 4 pages.

Office Action U.S. Appl. No. 09/521,875, filed Mar. 8, 2000 10 pages.

Office Action U.S. Appl. No. 09/521,875, filed Mar. 8, 2000 8 pages.

Notice of Allowance U.S. Appl. No. 09/052,291, filed Mar. 8, 2000 8 pages.

Notice of Allowability for U.S. Appl. No. 09/164,473, filed Aug. 28, 2000, 1pp.

Office Action for U.S. Appl. No. 09/164,473, filed Jan. 18, 2001, 3pp.

Notice of Allowance for U.S. Appl. No. 10/784,845, filed Dec. 11, 2007, 2pp.

Office Action re Petition Decision for U.S. Appl. No. 10/784,845, filed Mar. 2, 2007, 7pp.

Office Action for U.S. Appl. No. 10/784,845, filed Jul. 14, 2006, 4pp.

Office Action for U.S. Appl. No. 10/784,845, filed Apr. 27, 2006,10pp.

Office Action re Petition Decision for U.S. Appl. No. 10/784,845, filed Dec. 10, 2007, 5pp.

Office Action for U.S. Appl. No. 10/784,845, filed Apr. 7, 2005, 8pp.

Restriction for U.S. Appl. No. 10/784,845, filed Dec. 17, 2004, 4pp.

Office Action for U.S. Appl. No. 11/556,399, filed Mar. 13, 2007, 2pp.

Office Action for U.S. Appl. No. 11/556,399, filed Jun. 27, 2007, 2pp.

Office Action for U.S. Appl. No. 10/772,837, filed Sep. 13, 2007, 7pp.

Office Action for U.S. Appl. No. 10/778,576, filed Mar. 6, 2007, 2pp.

Office Action for U.S. Appl. No. 10/778,576, filed Jul. 20, 2005, 8pp.

Office Action for U.S. Appl. No. 11/456,255, filed Nov. 23, 2007, 5pp.

Office Action for U.S. Appl. No. 09/716,918, filed Jan. 8, 2008, 8pp.

Office Action for U.S. Appl. No. 09/716,918, filed May 8, 2007, 2pp.

Office Action for U.S. Appl. No. 09/716,918, filed Dec. 8, 2006, 11pp.

Office Action for U.S. Appl. No. 09/716,918, filed Jul. 20, 2005, 10pp.

Office Action for U.S. Appl. No. 09/716,918, filed Oct. 1, 2004, 7pp.
Office Action for U.S. Appl. No. 09/716,918, filed Oct. 1, 2004, 9pp.
Office Action for U.S. Appl. No. 09/716,918, filed Feb. 24, 2004, 6pp.
Office Action for U.S. Appl. No. 09/716,918, filed May 20, 2003, 4pp.
Office Action for U.S. Appl. No. 09/716,918, filed May 3, 2002, 4pp.
Decision on Petition for U.S. Appl. No. 09/716,918, filed Apr. 29, 2003, 1pp.
Notice of Non-Compliant Appeal Brief for U.S. Appl. No. 09/716,918, filed Oct. 3, 2007, 2pp.
Notice of Allowance for U.S. Appl. No. 10/752,068, filed Sep. 22, 2004, 5pp.
Office Action for U.S. Appl. No. 09/108,646, filed Sep. 13, 2001, 2pp.
Notice of Allowability for U.S. Appl. No. 09/108,646, filed Nov. 28, 2001, 5pp.
Office Action for U.S. Appl. No. 09/108,646, filed Jun. 18, 2001, 6pp.
Office Action for U.S. Appl. No. 09/108,646, filed Dec. 29, 2000, 5pp.
Office Action for U.S. Appl. No. 09/108,646, filed May 10, 2000, 5pp.
Office Action for U.S. Appl. No. 09/108,646, filed Jan. 7, 2000, 5pp.
Notice of Allowance for U.S. Appl. No. 10/029,143, filed Sep. 25, 2003, 3pp.
Office Action for U.S. Appl. No. 10/029,143, filed Sep. 4, 2003, 2pp.
Office Action for U.S. Appl. No. 10/029,143, filed Mar. 28, 2003, 7pp.
Office Action for U.S. Appl. No. 09/164,473, filed Jul. 17, 2000, 9pp.
Notice of Allowability for U.S. Appl. No. 09/521,875, filed Sep. 17, 2002, 1pp.
Office Action for U.S. Appl. No. 09/521,875, filed Jun. 11, 2002, 2pp.
Office Action for U.S. Appl. No. 09/521,875, filed Dec. 21, 2001, 9pp.
Office Action for U.S. Appl. No. 09/521,875, filed Oct. 11, 2001, 2pp.
Office Action for U.S. Appl. No. 09/521,875, filed Jun. 20, 2001, 4pp.
International Search Report for Application No. WO 2004/005090 A3 dated Feb. 24, 2005, 2pp.
Written Opinion for Application No. PCT/US04/05090 dated Feb. 24, 2005, 3pp.
International Preliminary Report on Patentability for Application No. PCT/US04/05090 dated Apr. 6, 2005, 4pp.
Brochure: "Power Play Slots", (http //www softsite com/ulti/), Jan. 1997.
Author Unknown; "Innovative Gaming Announces Nevada Approval of IGT Joint Venture Game-Bonus Streak", PR Newswire; May 14, 1997, Section: Financial News.
Poole, David, "Letter From Charlotte: Vegas Perfect For Racing", Las Vegas Review-Journal, Jun. 22, 1997, Section C, p. 2C.
Cook, Melissa, "The Best New Slots", Casino Player Magazine, Apr. 1998, p. 45.
Grochowski, John; "Royal Is Worth Taking A Risk" Chicago Sun Times, Apr. 5, 1998, Section: SHO, Casinos, p. 18; NC.
Green, Marian; "The New Slot Market", International Gaming & Wagering Business, May 1998, vol. 19, No. 5.
Website: "World of Slots—The Game King", Casino Journal, (http://www.casinocenter.com/journal/oct97/html/igt.html), download date Jun. 4, 1998.
Website: "A New Generation", Casino Journal (http://www.casinocenter.com/journal/oct97/html/bally html), download date Jun. 4, 1998.
Author Unknown; "The Interactive Experience", Casino Journal (http://www.casinocenter.com/journal/oct97/html/ac_coin.html), download date Jun. 4, 1998.
Brokopp, John, "New Slots Send Up Caution Flag", (http //brokopp casinocitytimes com/articles/545 html), dated: Aug. 2, 1999.
Brochure: "Vision Series—5-Line Double Diamond Mine", IGT, Copyright 2000.
Website: "Double Diamond Mine Slots", (http //www igt com/GamingGroup/Games/game asp?pid=5.12.108.119&theme_id=2390), download date: Feb. 9, 2004.
Legato, Frank, "When a Bonus . . . Isn't", Strictly Slots, (http //www strictlyslots com/archive/0006ss/html/behind html), download date: Feb. 9, 2004.
Website: "Wild Wizard Slots", Gameport.com, (http //www gameport com/pcgames/cards/000075 html), download date: Feb. 9, 2004.
Website: "Williams X—Factor—3 Coin Dotmation" "AzSlot Machine Company—Used Slot Machines and Slot Machine Parts for Sale",, (http //www slotdepot com/723 htm), download date: Feb. 9, 2004.
Fey, A Pictorial History Of Slot Machines, The First 100 Years, Liberty Belle Books, 1983, p. 89.
Schneier, Applied Cryptography 2e, Chapter 2.

* cited by examiner

1010

| OUTCOME 1012 | DEFAULT PAYOUTS 1014 | DEFAULT PAYOUTS 1016 |
|---|---|---|
| CHERRY/ANY/ANY | 2 | 2 |
| ANY/ANY/CHERRY | 2 | 2 |
| CHERRY/CHERRY/ANY | 5 | 5 |
| ANY/CHERRY/CHERRY | 5 | 5 |
| CHERRY/ANY/CHERRY | 5 | 5 |
| 1022 CHERRY/CHERRY/CHERRY | 20 | 15 |
| BAR/ORANGE/ORANGE | 10 | 10 |
| ORANGE/ORANGE/BAR | 10 | 10 |
| ORANGE/ORANGE/ORANGE | 20 | 20 |
| BAR/PLUM/PLUM | 14 | 14 |
| PLUM/PLUM/BAR | 14 | 14 |
| PLUM/PLUM/PLUM | 20 | 20 |
| BAR/BELL/BELL | 18 | 18 |
| BELL/BELL/BAR | 18 | 18 |
| BELL/BELL/BELL | 20 | 20 |
| BAR/BAR/BAR | 50 | 50 |
| 7/7/7 | 100 | 200 (1020) |

FIG. 10

1110

| OUTCOME 1112 | DEFAULT PAYOUTS 1114 | CUSTOMIZED PAYOUTS 1116 |
|---|---|---|
| CHERRY/ANY/ANY | 2 | 2 |
| ANY/ANY/CHERRY | 2 | 2 |
| CHERRY/CHERRY/ANY | 5 | 5 |
| ANY/CHERRY/CHERRY | 5 | 5 |
| CHERRY/ANY/CHERRY | 5 | 5 |
| CHERRY/CHERRY/CHERRY | 20 | 20 |
| BAR/ORANGE/ORANGE | 10 | 10 |
| ORANGE/ORANGE/BAR | 10 | 10 |
| ORANGE/ORANGE/ORANGE | 20 | 20 |
| BAR/PLUM/PLUM | 14 | 14 |
| PLUM/PLUM/BAR | 14 | 14 |
| PLUM/PLUM/PLUM | 20 | 40 (1119) |
| BAR/BELL/BELL | 18 | 18 |
| BELL/BELL/BAR | 18 | 18 |
| BELL/BELL/BELL | 20 | 20 |
| (1118) BAR/BAR/BAR | 50 | 100 |
| 7/7/7 | 100 | 50 (1117) |

FIG. 11A

1120

| OUTCOME 1122 | DEFAULT | | CUSTOMIZATION | |
|---|---|---|---|---|
| | RANDOM NUMBER 1124 | EXPECTED HITS PER CYCLE 1126 | RANDOM NUMBER 1128 | EXPECTED HITS PER CYCLE 1130 |
| NONWINNING COMBINATION | 1-8570 | 8570 | 1-8604 | 8604 |
| CHERRY/ANY/ANY | 8571-9250 | 680 | 8605-9284 | 680 |
| ANY/ANY/CHERRY | 9251-9930 | 680 | 9285-9964 | 680 |
| CHERRY/CHERRY/ANY | 9931-10130 | 200 | 9965-10164 | 200 |
| ANY/CHERRY/CHERRY | 10131-10330 | 200 | 10165-10364 | 200 |
| CHERRY/ANY/CHERRY | 10331-10398 | 68 | 10365-10432 | 68 |
| CHERRY/CHERRY/CHERRY | 10399-10418 | 20 | 10433-10452 | 20 |
| BAR/ORANGE/ORANGE | 10419-10460 | 42 | 10453-10494 | 42 |
| ORANGE/ORANGE/BAR | 10461-10466 | 6 | 10495-10500 | 6 |
| ORANGE/ORANGE/ORANGE | 10467-10508 | 42 | 10501-10542 | 42 |
| BAR/PLUM/PLUM | 10509-10528 | 20 | 10543-10562 | 20 |
| PLUM/PLUM/BAR | 10529-10533 | 5 | 10563-10567 | 5 |
| PLUM/PLUM/PLUM | 10534-10583 | 50 | 10568-10592 | 25 (1139) |
| BAR/BELL/BELL | 10584-10587 | 4 | 10593-10596 | 4 |
| BELL/BELL/BAR | 10588-10607 | 20 | 10597-10616 | 20 |
| BELL/BELL/BELL | 10608-10627 | 20 | 10617-10636 | 20 |
| (1138) BAR/BAR/BAR | 10628-10647 | 20 | 10637-10646 | 10 |
| 7/7/7 | 10648 | 1 | 10647-10648 | 2 (1137) |

FIG. 11B

1200

| OUTCOME 1210 | DEFAULT PAYOUTS 1212 | CUSTOMIZED PAYOUTS 1214 |
|---|---|---|
| CHERRY/ANY/ANY | 2 | 2 |
| ANY/ANY/CHERRY | 2 | 2 |
| CHERRY/CHERRY/ANY | 5 | 5 |
| ANY/CHERRY/CHERRY | 5 | 5 |
| CHERRY/ANY/CHERRY | 5 | 5 |
| CHERRY/CHERRY/CHERRY | 20 | 20 |
| BAR/ORANGE/ORANGE | 10 | 10 |
| ORANGE/ORANGE/BAR | 10 | 10 |
| ORANGE/ORANGE/ORANGE | 20 | 20 |
| BAR/PLUM/PLUM | 14 | 14 |
| PLUM/PLUM/BAR | 14 | 14 |
| PLUM/PLUM/PLUM | 20 | 20 |
| BAR/BELL/BELL | 18 | 18 |
| BELL/BELL/BAR | 18 | 18 |
| BELL/BELL/BELL | 20 | 20 |
| BAR/BAR/BAR | 50 | 50 |
| 7/7/7 | 100 | 10,548 |
| WAGER AMOUNT | 1 | 2 |

1220

1230

FIG. 12

GAMING DEVICE AND METHOD OF OPERATION THEREOF

CROSS-REFERENCE TO RELATED APPLICATIONS

The present Application is a Continuation-in-part of commonly-owned, U.S. patent application Ser. No. 09/521,875 entitled "A GAMING DEVICE AND METHOD OF OPERATION THEREOF", filed Mar. 8, 2000 now U.S. Pat. No. 6,520,856 in the name of Walker et al; which is a Continuation of commonly-owned U.S. patent application Ser. No. 09/052,291 filed Mar. 31, 1998 in the name of Walker et al and which issued as U.S. Pat. No. 6,068,552 on May 30, 2000. The entirety of the above-referenced Applications is incorporated by reference herein for all purposes.

FIELD OF THE INVENTION

This invention relates to gaming devices and, more specifically, to gaming devices which are customizable by the player.

BACKGROUND

One of the main goals of a casino is to keep its customers playing as long as possible, since longer play generates higher revenues. Casinos are thus interested in maintaining player interest and excitement, especially with regard to gaming device play, which encompasses a large portion of the casino's revenues and profits.

People generally are more likely to be interested in something over which they have some say or control. They are more likely, on the other hand, to get easily frustrated, or bored, with something that they perceive to be determined purely by chance or luck, pre-defined, or in some other way completely out of their influence.

Many players are also frustrated after losing for many spins in a row. They would love to improve their probability of winning but have no way of doing so. Players on a "hot streak", on the other hand, sometimes believe that they are almost certain to soon hit an outcome with a high payout. U.S. Pat. No. 5,851,147 to Stupak et al. discloses a method for allowing players to increase the jackpot of a gaming device. However, Stupak does not disclose allowing a player to increase payouts for other outcomes that a player may consider even more likely to occur than the outcome corresponding to the jackpot. Additionally, the method disclosed by Stupak lowers the payouts for one or more outcomes in return for increasing the payout of the jackpot. A player on a hot streak may not wish to lower any of the payouts. Therefore, a player wishing to get higher payouts will likely move to a new gaming device, but this means abandoning his "lucky" machine.

There is, therefore, a need for a gaming device that induces the player to continue playing for extended periods of time.

DESCRIPTION OF THE FIGURES

FIG. 10 is an exemplary table representative of customized payouts and the corresponding compensating payouts.

FIGS. 11A and 11B are exemplary tabular representations of customized payouts and the corresponding compensating probabilities.

FIG. 12 is an exemplary tabular representation of customized payouts and the corresponding compensating wager amount.

DETAILED DESCRIPTION

Figure 1:
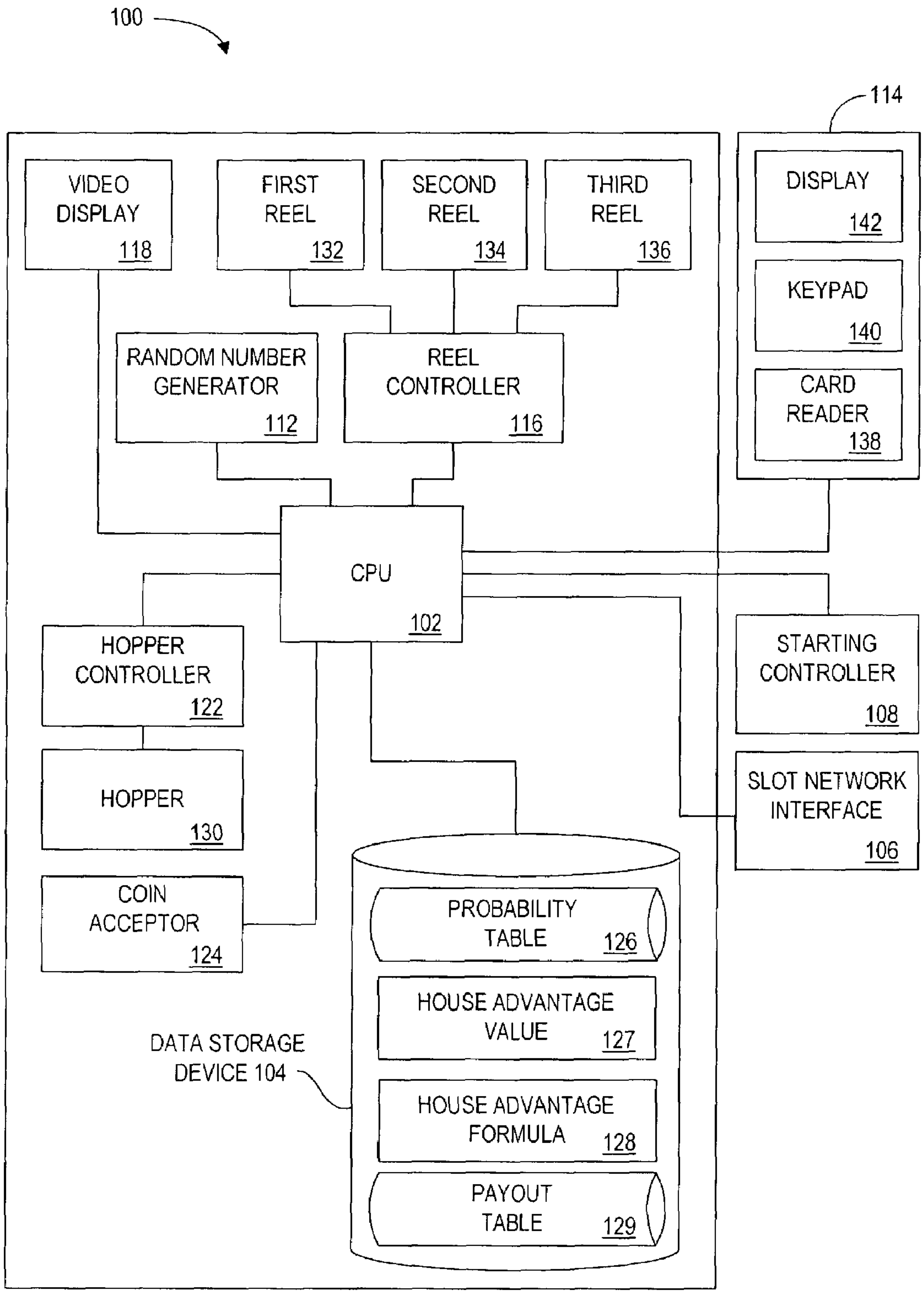
FIG. 1 is a block diagram of an architecture of a programmable gaming device consistent with one or more embodiments of the present invention.

In accordance with one or more embodiments of the present invention, a gaming device such as a slot machine provides a player the ability to modify at least one element of the gaming device. The gaming device then modifies one or more other elements to ensure a desired house advantage. In one embodiment, the gaming device allows the player to customize elements whose values represent probabilities, payout amounts, or wager amounts, by trading off one or more of a first set of element values for one or more of a second set of element values in order to maintain a constant house advantage.

In one embodiment, a player indicates, for a particular outcome of a gaming device, a payout that is higher or lower than the default value of the payout. In order to compensate for the higher or lower payout indicated by the player, the gaming device alters one or more of: (i) the probability of attaining certain outcomes (and thereby the probability of obtaining the corresponding payouts); (ii) one or more payouts not modified by the player; (iii) the amount of coins required per pull (wager amount); (iv) the strategies available to the player; (v) the required rate of play; (vi) the number of outcomes with a certain payout; or any of numerous other elements, while keeping the house advantage constant. In one embodiment, gaming device software implements an equation that takes into account pertinent elements such as the amounts of one or more payouts, the amount of a wager taken in at each pull, and the probabilities of obtaining one or more outcomes. Based on the equation, the software adjusts the values of elements other than the element(s) specified by the player so that the house advantage would remain constant with each pull. If, for example, the "house" decided that for a $1.00 wager the machine was to average $0.92 in payouts, then that house advantage of 8 cents would remain true no matter what the choices made by the player were and the casino would not need to worry about increasing or decreasing the house advantage.

In one embodiment, the player may impose a constraint on an element. The constraint may limit the ability of the gaming device to modify the value of the element in order to compensate for the player's modification(s). For example, suppose the player has customized the probability of the occurrence of the outcome "bar-bar-bar" to increase from a default of 50 hits per cycle to 80 hits per cycle. In order to maintain a house advantage, the gaming device must now adjust the value of one or more compensating elements. However, the player may feel as though he is soon due to hit the outcome "cherry-cherry-cherry," and may not wish for its payout or its probability of occurrence to decrease. Therefore the player may constrain the probability of occurrence of the "cherry-cherry-cherry" outcome to remain at its default value. The player may further constrain the payout of the "cherry-cherry-cherry" outcome to remain at its default value. The gaming device must therefore use as a compensating element an element that is not the payout, or the probability of occurrence, of the outcome "cherry-cherry-cherry."

In one embodiment, a touch screen provides an easy to use method of modifying the values of selected elements. This enables the player to reconfigure the gaming device to provide desired characteristics. When a player has the ability to reconfigure a gaming device he is less likely to leave the gaming device in search of a different gaming device having the characteristics desired. The player may thereby be discouraged from moving to a different casino, thus optimizing the overall return of the casino.

In the following description, reference is made to the accompanying drawings which form a part hereof, and in which are shown by way of illustration, specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense.

An exemplary architecture for a customizable gaming device consistent with one or more embodiments of the present invention is first described, followed by a description of several different embodiments of the gaming device. Several payout tables are referenced. Various equations showing how elements may be adjusted in accordance with the present invention, once a player modifies other elements, are also referenced. Like components in the figures are commonly represented by the same reference number which should be clear from the context of use. Further, the reference numbers generally follow a convention wherein the hundreds and thousands digits correspond to the figure number in which the reference number first appears.

As used herein, the term "gaming device" means a gaming machine including, but not limited to, a slot machine, video poker machine, keno machine, bingo machine, video roulette machine, and video blackjack machine, wherein a paid play generates one or more random or pseudo-random values that are used to determine an outcome and a payout corresponding to the outcome.

As used herein, the term "outcome" refers to the resolution or end result of a random, pseudo random, or other unpredictable event. "Outcome" may also refer to a potential resolution of an unpredictable event even when the outcome has never actually occurred as a resolution. Typically, the term "outcome" refers to a set of indicia that occur together on the pay line of a gaming device. For example, "cherry-bar-bell" is an outcome that might occur at a slot machine. "As Ks Js 8s 6s" is an outcome that might occur at a video poker machine. "Lantern" is an outcome that might occur in the bonus round of a slot machine game, when a player is choosing from among three closed doors in order to reveal a treasure behind one of them. Note that a "payout" is generally not the same thing as an outcome. A payout may be associated with an outcome, as for example, a payout of 30 (e.g., coins or electronic credits) might be associated with the outcome "sheep-sheep-sheep". However, the payout only occurs, in general, because the outcome has already occurred. An exception is when a payout is itself the resolution of an unpredictable event. For example, turning over a lily pad in a bonus game may simply reveal the number 50, representing a payout of 50.

As used herein, the term "house advantage" refers to the amount of money an operator of a gaming device expects to make for a game played on the gaming device. For example, if the wager required to play a game on a gaming device is $1.00, and the gaming device pays out an average of $0.95 cents per game, then the house advantage is 5 cents for the game.

As used herein, the phrase "maintain a house advantage" and variations thereof means to keep a house advantage within an acceptable range. For example, a gaming device may be configured to maintain a house advantage such that the house advantage is always between 7 cents and 9 cents. In one or more embodiments, "maintaining a house advantage" may include keeping the house advantage at exactly one particular value, such as 8 cents.

As used herein, the term "payback percentage" refers to the amount of money a gaming device expects to pay out for a game, divided by the wager required to play the game. The ratio is then typically expressed as a percentage. For example, if a gaming device expects to pay out $1.90 for a game, and the wager required for the game is $2.00, then the payback percentage is $1.90/$2.00, or 95%. Therefore, the house advantage is equal to the wager required to play a game multiplied by the quantity one minus the payback percentage. In other words, house advantage=wager*(1−payback percentage).

As used herein, the term "element" refers to an independent or loosely dependent single-valued variable governing the play of a game at a gaming device. The phrase "independent or loosely dependent" indicates that the value of an element is typically not significantly constrained by the value of another element. For example, the probability of the outcome "cherry-cherry-cherry" occurring is an element. The probability of "cherry-cherry-cherry" is loosely dependent on the probabilities of other outcomes, since the probabilities of all outcomes must add up to one. However, an increase in the probability of, say, "bar-bell-plum" may be offset by slight decreases in probabilities spread over a number of other outcomes, including "cherry-cherry-cherry". Therefore, the probability of "cherry-cherry-cherry" occurring need not change significantly or at all even if the probability of another outcome occurring does change significantly. Therefore in this example, the probability of "cherry-cherry-cherry" is only loosely dependent on the probability of "bar-bell-plum". It can be understood that the probability of "cherry-cherry-cherry" is only loosely dependent on other probabilities, and indeed, on elements other than probabilities. Therefore, the probability of "cherry-cherry-cherry" occurring may be considered an element. Note that, if the probability of "bar-bell-plum" is set to 1, then the probability of "cherry-cherry-cherry" is constrained to exactly zero. However, for typical values of the two elements, the two are only loosely dependent. Other constraints that could influence the dependency of one variable on others may include: the need for a minimum house advantage at a gaming device (thus e.g., creating a dependency between an outcome's probability and payout, although not necessarily a tight dependency); the need for a payout to occur in multiples of a given number of units (e.g., of a whole token, or of 100 tokens); the need for a wager to occur in multiples of a given number of units; etc.

When two strongly interdependent variables are discovered, then they may typically be considered the same element. For example, one variable is the average number of seconds used by a player on a single handle pull. Another variable is the average number of handle pulls made by a player per minute. However, these two variables are completely interdependent in that they are related by a simple equation. The equation, written in words, says that the average number of seconds used by a player on a single handle pull is equal to 60 divided by the average number of handle pulls made by the player per minute. Therefore the two variables are the same element expressed in different ways.

The phrase "single-valued" indicates that there is only one value at a time that may be meaningfully assigned to an element. Thus, the payout of an outcome such as "cherry-cherry-cherry" is an element, but a paytable is not an element, since a paytable requires multiple values, one corresponding to each outcome.

Exemplary Elements Include:

i. The payout of a particular outcome. For example, the payout for the outcome "bar-plum-bell" is an element. The element may take on values, such as five coins or zero coins.

ii. The probability of the occurrence of a particular outcome on a single handle pull. For example, the probability of the occurrence of the outcome "bar-plum-bell" on a single handle pull is an element. The element may take on values, such as 0.0001, or 0.0003.

iii. The required wager amount on a single handle pull. The required wager amount may take on values, such as 25 cents, 1 dollar, or $1.05.

iv. The minimum allowable wager on a single handle pull.

v. The maximum allowable wager on a single handle pull.

vi. The minimum number of pay lines that may be played on a single handle pull.

vii. The maximum number of pay lines that may be played on a single handle pull.

viii. The minimum allowable wager per pay line played.

ix. The maximum allowable wager per pay line played.

x. The required rate of play at the gaming device.

xi. The number of symbols present on a reel of a gaming device.

xii. The number of occurrences of a particular symbol on a particular reel of a gaming device. For example, the number of cherry symbols present on the reel of a gaming device.

xiii. The type of symbol present in the second position of the first reel of a gaming device. Examples of types of symbols include "cherry", "lemon", "2×" (as in a symbol that multiplies a payout by 2), "wild", and "blank". Note that a symbol's type may be considered the value of an element. For example, the value of an element describing the symbol present in the fifth stop of the third reel may be "plum".

xiv. The type of symbol that, when it appears three times on a pay line, produces a particular result. For example, the symbol that, if achieved on each reel, will result in the win of a jackpot, may be altered to be "lemon" instead of "bell". Then, if three lemon symbols appear across a pay line, a player may win a jackpot. The opportunity to customize this element may appeal to players that consider one particular symbol their "lucky" one (e.g., "my large payouts were always won with outcomes containing lemon symbols, so lemons are lucky for me."). As another example, the symbol that, if achieved on each reel, will result in the initiation of a bonus round may be altered from "joker" to "cannon ball".

xv. The number of types of symbols present on the reel of a gaming device. For example, a reel might have 22 symbols, but only 6 different types of symbols, as there may be multiple symbols of the same type on a reel.

xvi. The number of opportunities to achieve a benefit in a bonus game. For example, a Scrabble™ bonus game may have multiple sections, where each section provides the opportunity to spell a complete word by selecting tiles with hidden letters. A player of the Scrabble™ bonus round will have opportunities to achieve benefits based on the number of opportunities he has to spell words. Thus, an element value might indicate the number of words a player would be allowed to spell before the bonus game ends.

xvii. The location of a property in a Monopoly™ bonus game. An exemplary value might be 5 spaces from "GO."

xviii. The number of reels on a gaming device. One result of changing the number of reels may be the probability of a player hitting the jackpot. As the number of reels changes and the probabilities of occurrence for each symbol on each individual reel are maintained at a constant level, the overall probability of hitting the jackpot decrease. For example, if the gaming device starts out with 4 reels, each having a 2/22 probability of coming up with a jackpot symbol, the resulting probability of hitting the top jackpot is 16/234,256. Adding one more reel, also with 2/22 probability, results in a probability of hitting the jackpot of 32/5,153,632.

xix. The denomination of coins that the coin slots can receive. For example, coins slots may be configured to receive coins of 5-cent denomination (e.g., nickels), 25-cent denomination (e.g., quarters), and so on.

xx. One of the bonus amounts a gaming device provides in a bonus round. For example, a bonus amount might correspond to what a player receives by hopping onto a particular lily-pad in a bonus round. An exemplary value might be 100 coins.

xxi. The number of symbol types that a wild symbol may assume. For example, a wild symbol may become a "cherry" if it is one of three symbols comprising an outcome, and if the other two symbols are cherry. The wild symbol would thereby allow for the outcome of "cherry-cherry-cherry," a winning outcome. Similarly, a wild symbol might, in other circumstances, become an "orange" or a "lemon".

xxii. The number of cards the gaming device allows a player to redraw in a game of video poker. For example, a player may be allowed to redraw all five cards in a hand, only up to four cards, etc.

xxiii. The number of opportunities a player has to redraw cards in a game of video poker. For example, with two opportunities, a player might be allowed to discard cards from a first hand, receive a second hand, then discard cards from the second hand, and receive a third hand.

xxiv. Whether or not a player may discard a card from a particular position in a game of video poker. For example, a player may not be allowed to discard the card in the third position of a hand of video poker.

xxv. Whether or not a player may discard cards in a particular combination of positions in a game of video poker. For example, a player may not be allowed to discard both the first and third cards from a hand, although he may be allowed to discard just the first card or just the third card.

xxvi. Whether or not a player may discard a particular card. For example, the player may not be allowed to discard the nine of clubs should it occur in his hand.

xxvii. Whether or not a player may discard cards from a particular set of cards. For example, the player may not be allowed to discard any nine, or any diamond.

xviii. The number of decks the gaming device employs in a game of video poker.

xxix. The number of a particular card in a game of video poker. For example, the number of aces of spades in a deck, or the number of threes in a deck might each be elements.

xxx. The number of hands in a game of multi-play video poker.

xxxi. The number of cards in a deck of cards used for a game of video poker.

xxxii. The number of wild cards in a deck of cards, such as a deck of cards used in a game of video poker.

xxxiii. In video poker, the threshold hand that qualifies to be classified as a certain outcome. For example, a threshold hand that qualifies to be paid as a "pair" has two jacks in it, and no other relevant cards. However, this threshold might be changed to a hand with two tens, or to a hand with two queens.

xxxiv. The number of outcome classifications in a game of video poker.

xxxv. In video poker, the number of cards that constitute a complete poker hand. For example, the number may be changed such that a complete poker hand is only four cards rather than five. Such a hand would allow straights or flushes to be obtained more easily.

xxxvi. The amount of a player's wager that a gaming device contributes to a progressive jackpot.

xxxvii. The number of comp points to be provided per dollar wagered, or the number of comp points to be provided per dollar lost.

xxxviii. An amount of work required of the player per handle pull in which the player has some advantage. For example, the player must perform 10 seconds of monitoring of a security camera feed for every handle pull in which the jackpot is five times its usual size.

xxxix. The type of prize to be awarded upon the occurrence of a given outcome. Types of prizes may include: cash; credits; foreign currency; merchandise; discounts; free stays in a hotel room; services; video clips; audio clips; software; tickets; stamps comp points; frequent flyer miles; or internet currency. For example, merchandise may be awarded to the player upon the occurrence of "diamond-diamond-diamond". As another example, free hotel stays may be awarded upon the occurrence of "room-room-room". In one or more embodiments, an element might indicate the specific prize to be awarded upon the occurrence of an outcome rather than the type of prize. For example, a diamond necklace may be awarded to a player upon the occurrence of "diamond-diamond-diamond".

xl. The amount of money required of a player as an upfront deposit in return for a certain amount of play in which the player has some advantage. For example, the player must deposit $10 upfront, and in return may play for 10 minutes during which the gaming device has a payback percentage of 105%.

xli. The house advantage of a gaming device.

xlii. The frequency with which a hint will be provided. For example, a hint will be provided once every two handle pulls. In another example, a hint will be provided once every three handle pulls in which the player has two plausible strategies.

xliii. The amount of time or the number of handle pulls during which some player advantage or other game alteration will be in effect. For example, the outcome "cherry-cherry-cherry" will pay double for the next 10 handle pulls.

xliv. An element describing the number of years over which a jackpot won be a player will be paid to the player. For example, a jackpot may be awarded as one lump sum, as payments over 10 years, as payments over 15 years, or as payments over 20 years. Awarding jackpots as payments over a number of years allows the casino to collect interest on the money over those years and also effectively lowers the payout when the time value of money is taken into account.

xlv. The rate at which a player's gaming device contributes to a progressive jackpot. Typically, a progressive jackpot is formed when a number of gaming devices are linked together to contribute to a single jackpot. A portion of each wager made on each gaming device is added to the jackpot. Then, when one of the linked gaming devices produces a certain outcome, the player at the gaming device wins the progressive jackpot. Therefore, if a player's gaming device contributes, by default, two cents of every dollar wagered to the progressive jackpot, contribution of the gaming device might be altered to be only one cent per dollar wagered.

xlvi. The fraction of the progressive jackpot that a player will win if he obtains a jackpot outcome. For example, this element might take on a value of ½, indicating that a player will only win ½ of the progressive jackpot if he obtains a jackpot outcome. A value of 2 for this element might indicate that a player will win twice the amount of the progressive jackpot. Note that this element differs from an element describing the absolute size of a jackpot to be paid to a player, because with a progressive jackpot, it is unknown what the size of the jackpot will be when a player wins it, if at all. Therefore the size of ½ of the progressive jackpot, or twice the progressive jackpot is also unknown.

xlvii. The number of incorrect choices a player may make in a bonus round (e.g., when choosing closed doors behind which prizes are hidden) before the bonus round ends.

xlviii. An element describing whether a gaming device is linked or unlinked from the progressive jackpot. A value of "unlinked", for example, would indicate that no portion of a wager made at the gaming device would be contributed to the progressive jackpot.

xlix. The number of rows on a bingo card.

l. The number of columns on a bingo card.

li. The number of numbers corresponding to an individual space on a bingo card. For example, a space might be filled if either of two possible numbers are called.

lii. The number of automatic spaces on a bingo card.

liii. In keno, the upper limit on the range of numbers that may be drawn. For example, whereas the number 80 is typically the upper limit, this limit may be reduced to 40, or increased to 100.

liv. In pachinko, the size of winning pockets.

lv. In pachinko, the number of balls received upon getting a ball into a winning pocket.

lvi. In pachinko, the number of balls received after aligning three symbols on an activated gaming device.

lvii. In pachinko, the size of balls that are launched.

lviii. The amount of training a player may receive before playing a game. Training may instruct the player as to how to play a game, or as to how to play a game well.

lix. The number of members on a team.

lx. The amount of a team prize.

lxi. The cumulative number of hours that team members must spend gaming.

lxii. The minimum number of team members that must be playing at any one time in order for a team to be progressing towards their goal.

lxiii. The minimum number of team members who must achieve a winning outcome within a particular time frame in order for a team to meet a team goal.

lxiv. The number of symbols that team members may swap with each other within an hour.

lxv. The name of a person who is to be a player's teammate.

lxvi. The number of fellow team members who must be playing at once in order for the player to realize some advantage. For example, a player may receive double the normal amount of comp points per handle pull if at least 3 fellow team members are playing.

lxvii. The total amount of money a team is to wager as part of a team objective. For example, a team may have the objective of wagering a total of $3000 during the course of a day. If the team meets its objective, the team may be provided with a prize.

lxviii. The prize a team is to be provided. A prize may include a free meal for all team members, a free hotel suite for the team, a donation to a charity of the team's choosing, etc.

In one or more embodiments, as used herein, the term "default value" refers to the value an element will assume during one or more initialization circumstances. For example, when a new player initializes play at a gaming device, an element may assume its default value. In another example, when a gaming device is first plugged in, or when the gaming device's power is first turned on, an element may assume its default value. In a third example, when a player begins play after a break of more than a predetermined amount of time, an element value may assume its default value. An example of a default value is 0.001 as a value for the element describing the probability of occurrence of the outcome "cherry-bell-bell". An element's default value may be stored, for example, in the memory of a gaming device, so that the element's value may be initialized to its default value at appropriate times.

In one or more embodiments, "default value" may refer to an element's current value. For example, in the absence of further input, an element may remain at its current value, even though its current value is different from the value the element had when the gaming device was first plugged in. Thus, for example, when a first player changes the value of an element at a gaming device from a first value to a second value, and then a second player sits down at the gaming device, the value of the element may remain at the second value.

As used herein, the term "customizable element" is an element whose value is or can be altered by a player. A player may be said to "customize" an element when the player provides an indication of the desired value for the element, and when the element assumes the indicated value.

As used herein, the term "compensating element" is an element whose value is or can be altered (e.g., by the casino or its representatives) in order to offset the effects of the prior alteration of an element (e.g., by a player).

As used herein, the term "payout element" is an element that, when its value is altered, modifies the amount paid to the player upon the occurrence of an outcome. An exemplary payout element is the number of coins awarded for the outcome "orange-orange-orange." The payout element that is the payout for the outcome "orange-orange-orange" may take on such values as 20, 10, 0, or 50. In some embodiments, the values could be decimal, fractional, or even negative.

As used herein, the term "non-payout element" is an element that, when its value is altered, does not alter the amount paid to a player upon the occurrence of any given outcome. Non-payout elements include elements whose values describe an amount to be withheld from a payout and, e.g., placed in a separate account. For example a "tax" element with a value of 3 may indicate that 3 coins are to be withheld from any payout above 20 coins. All withheld coins may be kept in an account on the gaming device, and paid to the player at the end of the hour in one lump sum. With tax elements applicable, a player is still considered to receive a payout—it is just that a portion of the payout may be withheld.

As used herein, the term "constraint" is any limitation on the set of values that an element may assume. Therefore, if an element can normally assume a first set of values, then a constraint specifies a second set of values that the element may assume. The second set of values is a subset of the first set of values. A constraint may be indicated, for example, by a player, by a gaming device, or by a casino server. Note that indicating a constraint is a superset of indicating a customization. For example, by customizing a payout to be 50 coins, a player has also indicated a constraint on the payout, wherein the constraint specifies that the payout cannot be other than 50 coins. Note also that a constraint may be stated or indicated in terms of which values an element may not assume. It is then implied that the element may assume all values of the first set except those excluded by the constraint. A constraint may apply to a combination of elements as well as to a single element. An example of a constraint applying to a combination of elements would be that the payout for the outcome "cherry-cherry-cherry" cannot equal the payout for the outcome "lemon-lemon-lemon." Thus, the payout for the outcome "cherry-cherry-cherry" may assume any value, as may the payout for the outcome "lemon-lemon-lemon." However, in this example, the two payouts must not coincide. Some other exemplary constraints are:

i. The payout for the outcome "cherry-cherry-cherry" may not change from its default value ii. The number of lemon symbols on the first slot reel must change from its default value. In other words, the number of lemon symbols must either increase or decrease, but cannot stay the same.

iii. The probability of the outcome "lemon-lemon-lemon" occurring must increase.

iv. The required wager must fall within the range of five to seven coins, inclusively.

v. The payout for the outcome "bell-bell-bell" must equal 100. The verb "constrain" is used herein to mean apply a constraint.

As used herein, the term "value" is a concrete instance or embodiment of an element. For example, the element that is the number of coins paid out for the outcome "bell-bell-bell" may take on the value of 20 coins, 10 coins, or 100 coins. The element that is the number of cards a player is allowed to draw in a game of video poker may take on the value of 5, 4, 3, 2, 1, or 0. The element that is the type of symbol on the fifth stop position of the third reel of a gaming device may take on the value of cherry, lemon, or orange.

As used herein, the phrase "category of elements" or just "category" may refer to a set of at least two elements. The elements may typically share a common characteristic, but need not do so. One exemplary category of elements described herein is the category of payout elements. Another exemplary category of elements described herein is the category of non-payout elements. A third category of elements might consist of every element whose value is a payout for an outcome that pays more than five coins. A fourth exemplary category of elements might consist of every element whose value is the probability of an outcome's occurrence. This category of elements may be termed "probability elements" and may include the probability for the outcome "plum-plum-plum" as one element, the probability of the outcome "cherry-bar-bell" as another element, and so on.

There are a number of advantages inherent in grouping elements into categories. One advantage is organizational. For example, a player who wishes to adjust the value of a particular element may select the element more easily from among a large number of elements by first selecting the element's category, and then selecting the element itself. The organizational advantage may be seen as analogous to that provided by a phone book, where it may be easier to find Joe's Pizza by first looking under the "pizza" category, and then looking up Joe's Pizza within the category.

Another advantage inherent in grouping elements into categories is that adjustments may be made to the values of large numbers of elements at once. For example, a player may indicate that the values of all payout elements should be increased by 1. Such a global indication may be easier for a player than indicating for each individual payout element that the payout should be increased by 1.

A third advantage of grouping elements into categories is that a player may more easily appreciate the significance of adjusting an element's value when he has already adjusted the values of one or more elements within the same category of elements. For example, if a player adjusts the values of several elements falling in the category of probability elements, then the player may gain a good intuitive sense of what it means to adjust the value of a probability element. The player may begin to notice, for example, that certain outcomes now occur more or less frequently because of his adjustments. When the player later adjusts the values of other elements within the category of probability elements, then the player may accordingly have a clearer expectation of what will happen as a result of the adjustments.

There are numerous possible categories of elements. Exemplary categories of elements may include:

i. The set of all elements, each of whose value corresponds to a respective payout of an outcome.

ii. The set of all elements, each of whose value corresponds to a respective probability of an outcome.

iii. The set of elements comprising the elements whose values are the payouts for a particular subset of all the outcomes. For example, the payouts for all outcomes of a flush in video poker, or the payouts for all outcomes at a reel gaming device involving three like symbols. Another example is a category consisting of the payouts for all outcomes whose default payouts are 20 coins or more.

iv. The set of all elements whose values describe the number of symbols on a reel. For example, for a gaming device with three reels, this category of elements would contain three elements. Each element would describe the number of symbols on one of the reels.

v. The set of all elements each of whose value describes the type of symbol at a particular position on a reel of a gaming device. For example, an element from this category representing the symbol at stop 7 on reel 2 of a gaming device might have the value of "orange". Therefore stop 7 on reel 2 might have an "orange" symbol. Were the value of the element to be changed to "cherry", then stop 7 on reel 2 would have a "cherry" symbol. It should be apparent from this example that the value of an element need not be numerical. Rather, it might be descriptive, as with "orange" or "cherry".

vi. The set of all elements each of whose value describes the number of comp points awarded upon the occurrence of a given outcome. For example, 10 comp points might be awarded upon the occurrence of the outcome "bell-bell-bell," and 20 comp points might be awarded upon the occurrence of the outcome "bar-bar-bar."

vii. The set of all elements each of whose value describes the type of prize to be awarded upon the occurrence of a given outcome.

viii. The set of all elements, each of whose value describes the number of cards in a deck from which a card in a hand of video poker is dealt. For example, the video poker game of Five Deck Frenzy™ has each card in a hand of video poker dealt from a separate deck. Therefore, one element might describe the number of cards to be in the first of five decks, another element might describe the number of cards to be in the second of five decks, and so on.

Figure 3A:
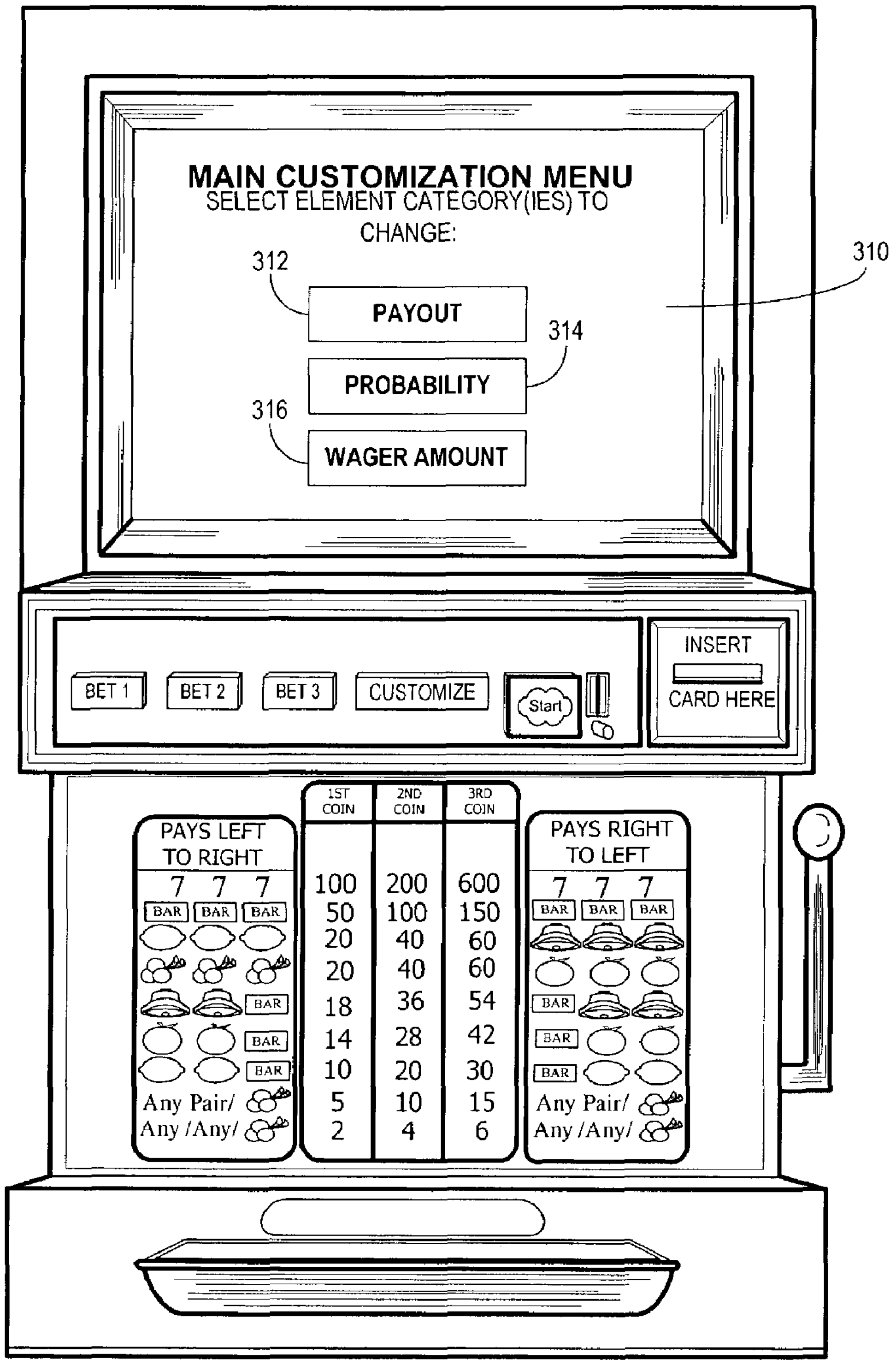
FIG. 3A is an example of a front elevation view of the gaming device of FIG. 1 showing a menu operable for customization.
Figure 3B:
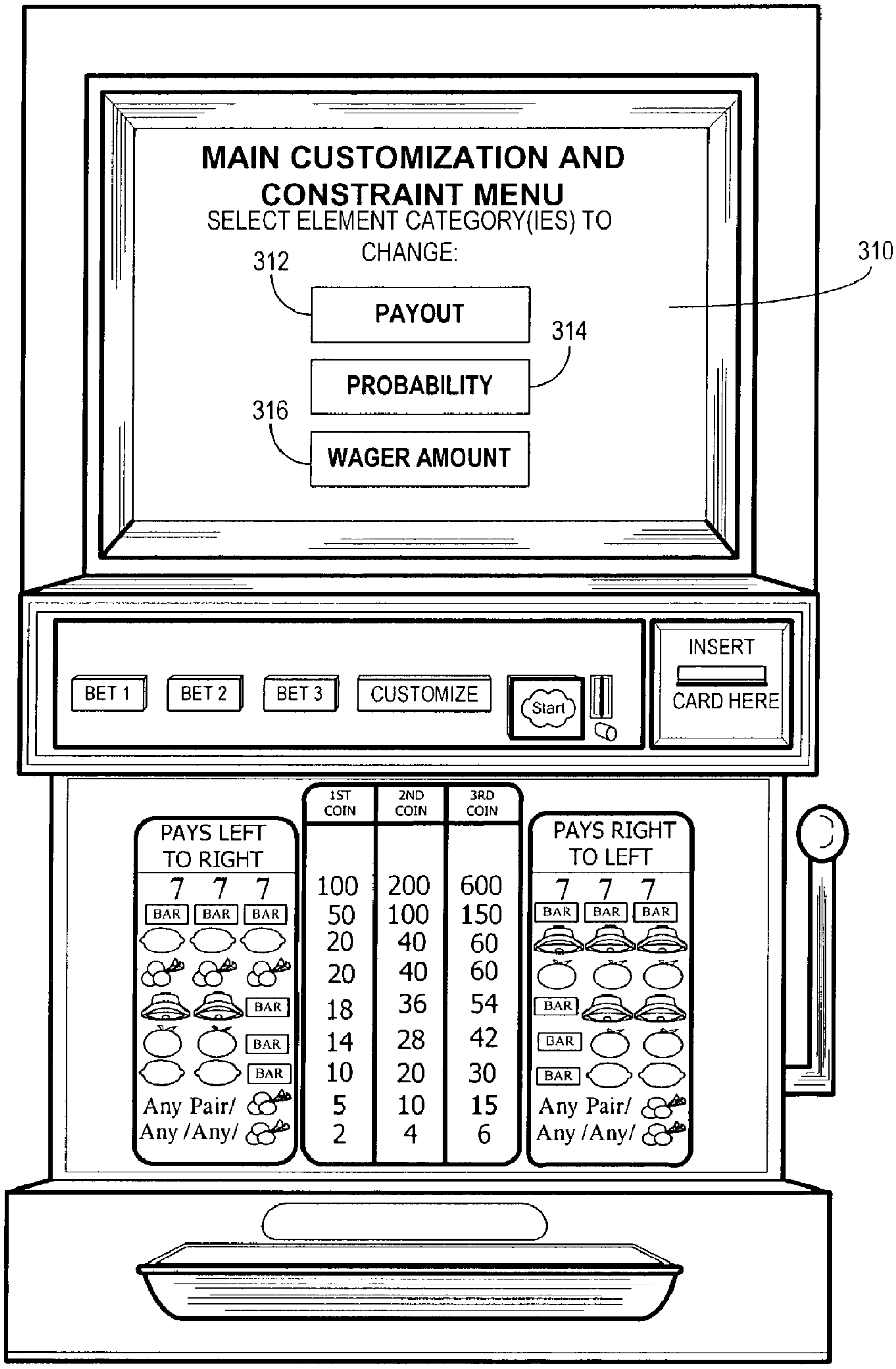
FIG. 3B is an example of a front elevation view of the gaming device of FIG. 1 showing a menu operable for customization and for imposing constraints.
Figure 13:
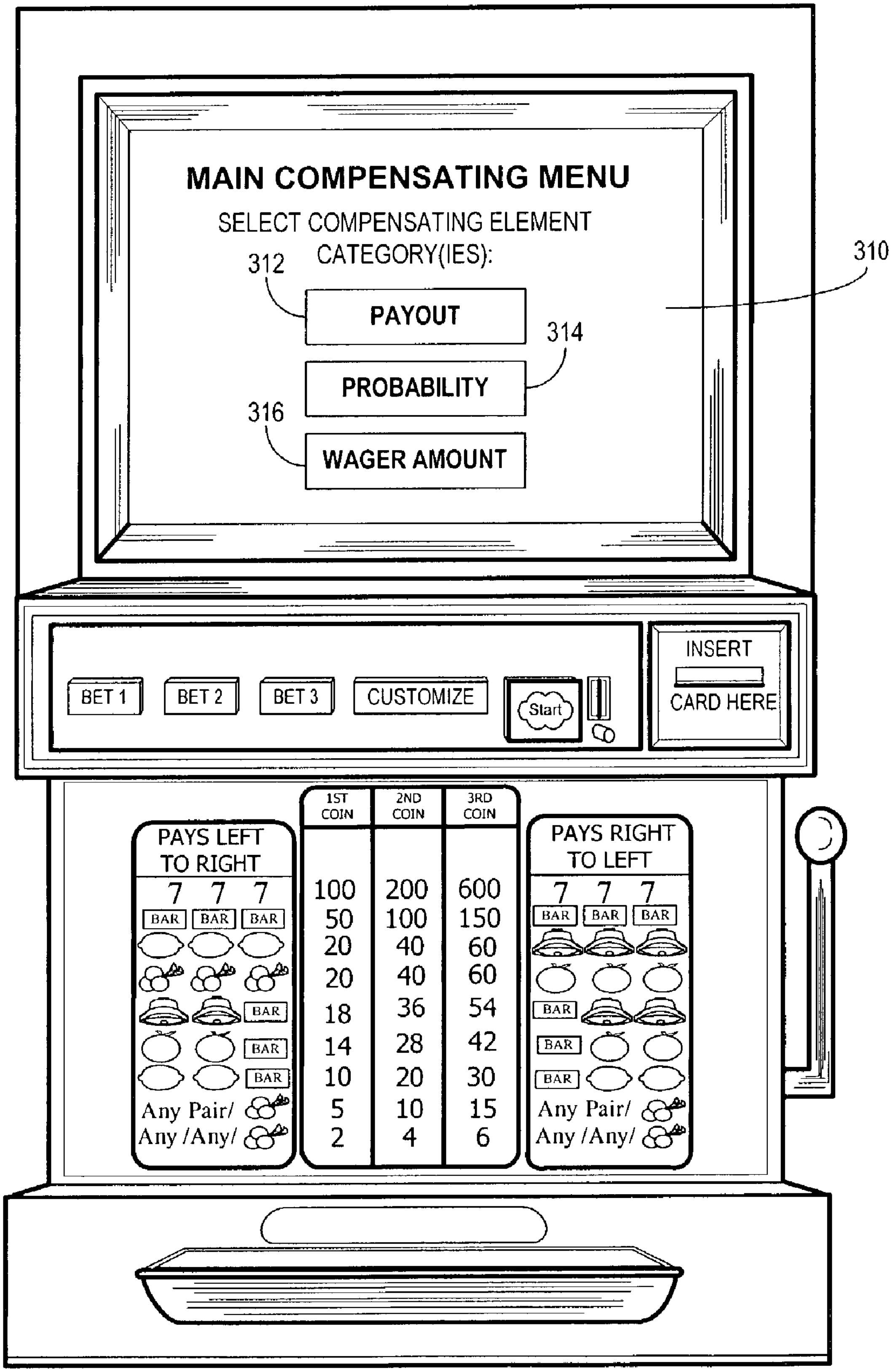
FIG. 13 is an example of a front elevation view of the gaming device of FIG. 1 showing a menu operable for selection of compensating element.

Players may have various opportunities for selecting categories of elements. As illustrated in FIG. 3A, a player may have the opportunity to select categories of elements from which to customize elements. For example, a player may select the category of "payout elements", and later customize one or more of the payout elements within that category. As illustrated by FIG. 3B, a player may have the opportunity to select categories of elements from which to customize or constrain elements. In the one or more embodiments illustrated in FIG. 13, a player has the opportunity to select categories of elements from which compensating elements are to be chosen. FIGS. 3A, 3B, and 13 will be discussed further below.

Note that categories of elements may be presented side by side with single elements. For example, in FIG. 3B, the selections designated "payout" 312 and "probability" 314 may be considered categories of elements. However, the selection designated "wager amount" 316 may be considered a single element. By clicking on "wager amount", the player may go to another screen, analogous to that of FIG. 4A, where the player may have the opportunity to customize the wager amount to such values as 50 cents, $1.00, $1.09, and so on. Another exemplary element listed may be a "hint frequency" option. Hint frequency may refer to a single element, such as an element describing the percentage of time with which a hint will be provided to a player during the play of a video-poker game. Upon selecting the "hint frequency" option, the player may be presented with another screen, analogous to that of FIG. 4A, where the player may have the opportunity to customize the hint frequency to such values as 25%, 50%, or 100%.

Referring now to FIG. 1, a block diagram of a gaming device indicated generally at 100 comprises a processor 102 and a data storage device 104 in communication with the processor 102. In communication with processor 102 are: a slot network interface 106, a starting controller 108, a random number generator 112, an input/output (I/O) device 114, a reel controller 116, a video display 118, a hopper controller 122, and a coin acceptor 124. Referring again to processor 102, the device may comprise one or more of many well known processing units, for example a Pentium™ class processor manufactured by Intel™ Corp. Data storage device 104 comprises an appropriate combination of magnetic and optical memory, such as disk drive memory, and semiconductor memory such as random access memory (RAM) and read only memory (ROM). Data storage device 104 stores a probability table 126, a house advantage value 127, a house advantage formula 128 and a payout table 129 as well as appropriate operating system and control software (not shown), functional to operate gaming device 100 in the manner described below. Random number generator 112 comprises one of many well known random or pseudo-random number generators suitable for use in a gaming device. As will be further described below, during game play, data storage device 104 also stores a player credit balance.

Coin acceptor 124 is operative to receive one or more coins, and to transmit an appropriate value signal to processor 102. Hopper controller 122, and hopper 130 connected thereto, are operative under the control of processor 102 to dispense coins to a player. Reel controller 116 is operative to control the spin and outcome displayed by first, second, and third reels 132, 134, 136, respectively, which may be mechanical in nature, or graphical and displayed on video display 118. Different numbers of reels may be used, or selected for use in further embodiments. In the present embodiment, gaming device 100 comprises a "22 stop" machine, such that 22 indicia are contained on each of reels 132, 134, 136. Video display 118 comprises any appropriate video display apparatus, for example, a touchscreen, a cathode ray tube or a liquid crystal display screen.

Starting controller 108 comprises a player-operated device such as a handle or button for initiating the play of a game. I/O device 114 comprises a conventional player interface including a card reader 138 for receiving a player tracking card, a display 142 for communicating alpha/numeric messages to the player, and a keypad 140 for receiving player input such as a player identifier.

Although not shown in the figures, gaming device 100 may also contain a transmitter, and/or a receiver. The function of transmitting and receiving may be performed, for example, by an antenna. The transmitter and/or receiver may allow the gaming device to communicate with one or more peripheral devices. Peripheral devices may include, for example, personal digital assistants (PDA's), laptop computers, or cellular phones. The peripheral devices may be used, for example, to receive inputs from players and to display information to players. For example, a player may use a cellular phone to key in the desired values of one or more elements. In another example, a gaming device may transmit to a player's cell phone values for one or more elements. The player may then approve the values of the elements before beginning play at the gaming device. In one or more embodiments, a gaming device may contain a communications port into which a peripheral device may be plugged. For example, a cord from a PDA may be plugged into the gaming device so that the gaming device may communicate with the PDA. In one or more embodiments, a casino server may serve as an intermediary in communications between a gaming device and a peripheral device. For example, a gaming device may first send information to the casino server via the slot network interface 106. The casino server may then transmit the information to the peripheral device via a wireless communication protocol.

Slot network interface 106 comprises a conventional network interface for enabling gaming device 100 to communicate with a network, thereby facilitating remote loading of new programs and values into data storage device 104 as desired.

Figure 2:
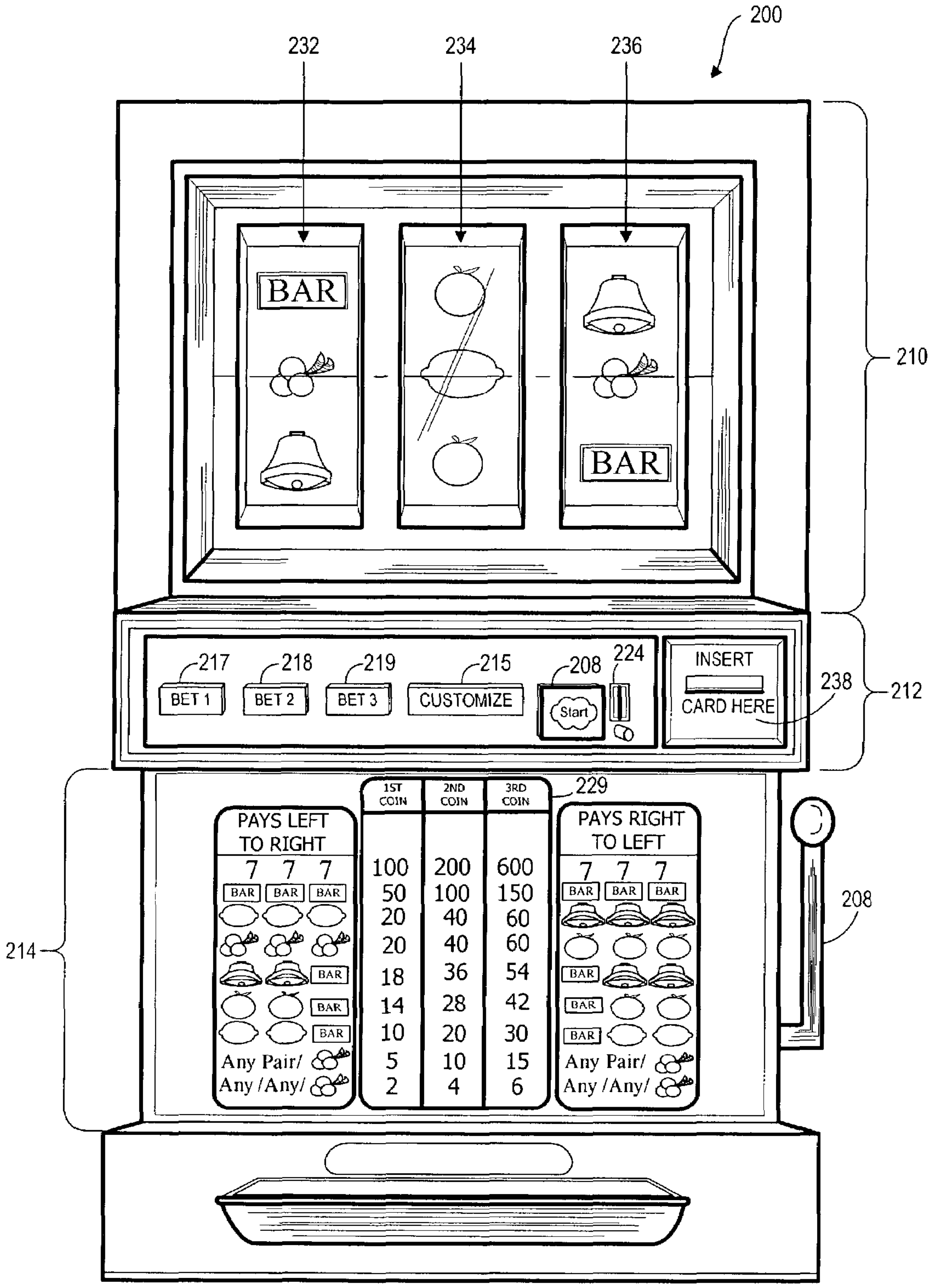
FIG. 2 is an example of a front elevation view of the gaming device of FIG. 1.

Referring to FIG. 2, a front elevation view of an exemplary gaming device consistent with one or more embodiments of the present invention is shown as indicated generally at 200. It should be noted that the arrangement of player interfaces may be varied significantly and still remain within the scope of the present invention. Gaming device 200 is generally divided into three sections: an upper panel 210, a central panel 212, and a lower panel 214. Upper panel 210 provides display of a first reel 232, a second reel 234 and a third reel 236 which, as previously mentioned with respect to the reel representations in FIG. 1, can be mechanical based or electronic in nature. In this embodiment, it is a conventional electronic graphical display capable of displaying computer generated data, such as a VGA monitor or LCD display. Central panel 212 comprises a card reader 238, a coin acceptor 224, a starting controller 208, various bet buttons 217, 218 and 219, and a customization button 215, which initiates display of a customization menu which will be described further below. The starting controller 208 may be, for example, a handle or a button. Lower panel 214 comprises a display of a pay schedule 229 comprising, for example, an electronic graphical display. The details of pay schedule 229 are discussed below, and will change with customization by the player. Basically, the pay schedule describes the amount paid for the outcomes shown, based on the number of coins or credits wagered.

Reference is now made to FIG. 3A, which illustrates exemplary front elevation view of the gaming device 100. The upper panel of the gaming device provides display of a main customization menu as indicated at 310 in FIG. 3A. The categories of elements displayed in menu 310 comprise three selections, a payout selection 312, a probability selection 314 and a wager amount selection 316. Note that in various alternative embodiments, the wager amount selection 316 may be considered a single element. Of course other categories of elements could be listed in menu 310. These selections comprise a predefined area on a touch screen allowing a player to touch the area in order to invoke functionality to allow player customization of elements associated with each selection. The customization menu may also be presented on a VGA monitor and the player selections signaled by a cursor associated with well known cursor control devices, such as a touchpad, trackball, or mouse. When a player actuates the customize button illustrated in FIG. 2 at 215, which may be a mechanical button that is pushed, a capacitive switch, a touch screen button, or any other number of devices which sense a player selection, upper panel 210 provides display of a main customization menu as indicated at 310 in FIG. 3A.

Reference is now made to FIG. 3B, which illustrates exemplary front elevation view of the gaming device 100. The menu displayed in FIG. 3B is a "Main Customization and Constraint Menu", in contrast to the "Main Customization Menu" illustrated in FIG. 3A. Using the menu of FIG. 3B, a player may ultimately select an element to which he may apply a constraint. It should be noted that applying a constraint to an element may include customizing the element.

Figure 4A:
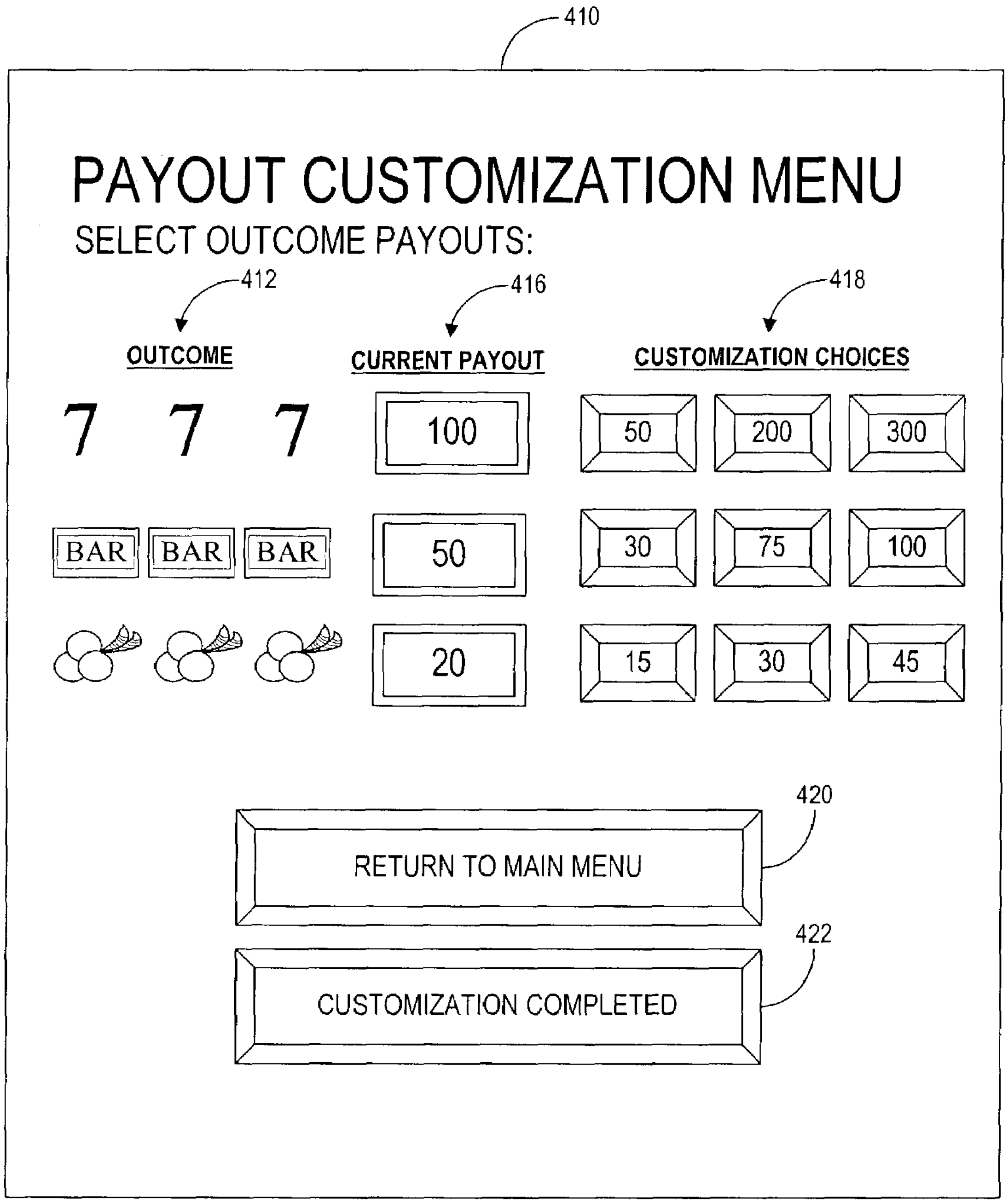
FIG. 4A is an exemplary illustration of a payout customization menu screen for the gaming device of FIG. 1.

FIG. 4A illustrates a payout customization menu 410 that is displayed upon selection of payout selection 312. Menu 410 comprises an outcome display 412 comprising sample representations of three potential winning outcomes such as three "7's", three bars and three cherries. Current payout displays 416 show current payouts each corresponding to a respective winning outcome. The values shown in current payout displays of FIG. 4A may be the default payouts (i.e. before customization begins) of "100", "50"and "20". The values shown in current payout displays of FIG. 4A may also be suggested payouts based, for example, on past player choices or preferences. As the player customizes the payouts, his selection(s) will replace the values shown in the "current payout" displays 416. This process will be further illustrated in FIGS. 5A, 5B, and 6. Customization choices displays 418 show alternative payouts which may be selected by a player as by touch screen or other selection device. Further selections on customization menu 410 comprise a "Return to Main Menu" button 420, which brings up the previous menu allowing customization of another element, and a "Customization Completed" button 422 which, when selected, causes the gaming device to adjust one or more other elements which were not customized by the player in order to maintain a desired house advantage. The adjustment of other elements is described further below following a description of the player interfaces. The outcomes available for customization, as illustrated in FIG. 4A, are meant as examples only. Any number and variety of outcomes could be available to the player for customization.

Figure 4B:
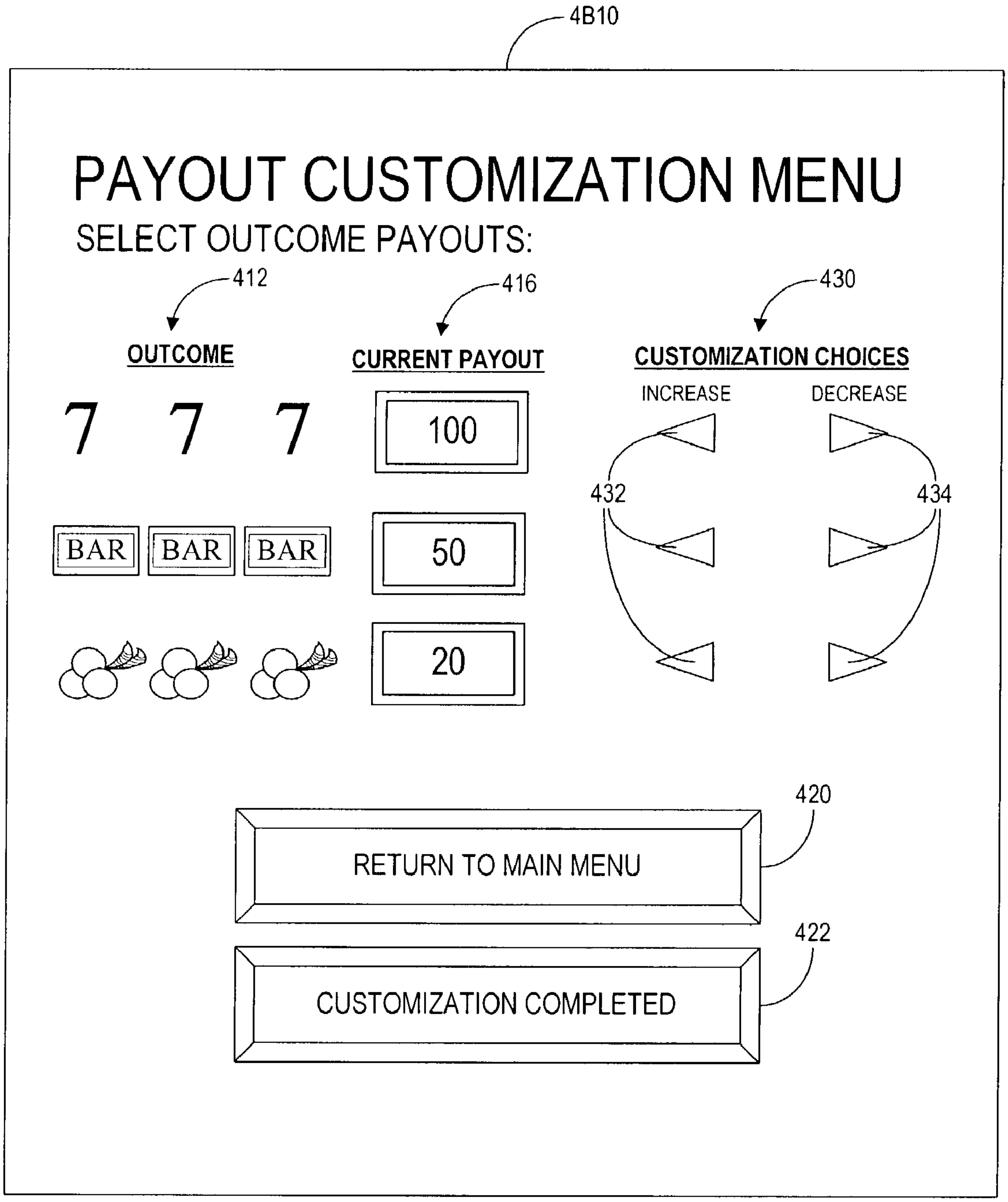
FIG. 4B is an exemplary illustration of an alternative payout customization menu screen for the gaming device of FIG. 1.

FIG. 4B shows an alternate embodiment of a customization menu 4B10 wherein a new customization choices display element 430 contains "Increase" and "Decrease" buttons 432 and 434. These buttons allow a user to incrementally increase or decrease payouts for each corresponding outcome without being limited to selecting from predetermined values. In this embodiment, as the player presses the "Increase" and/or "Decrease" buttons, the corresponding "current payout" value changes accordingly. For example, if the player presses the "Increase" button corresponding to the "7-7-7" outcome once, the current payout value for that outcome would change from "100"to "101."

Figure 4C:
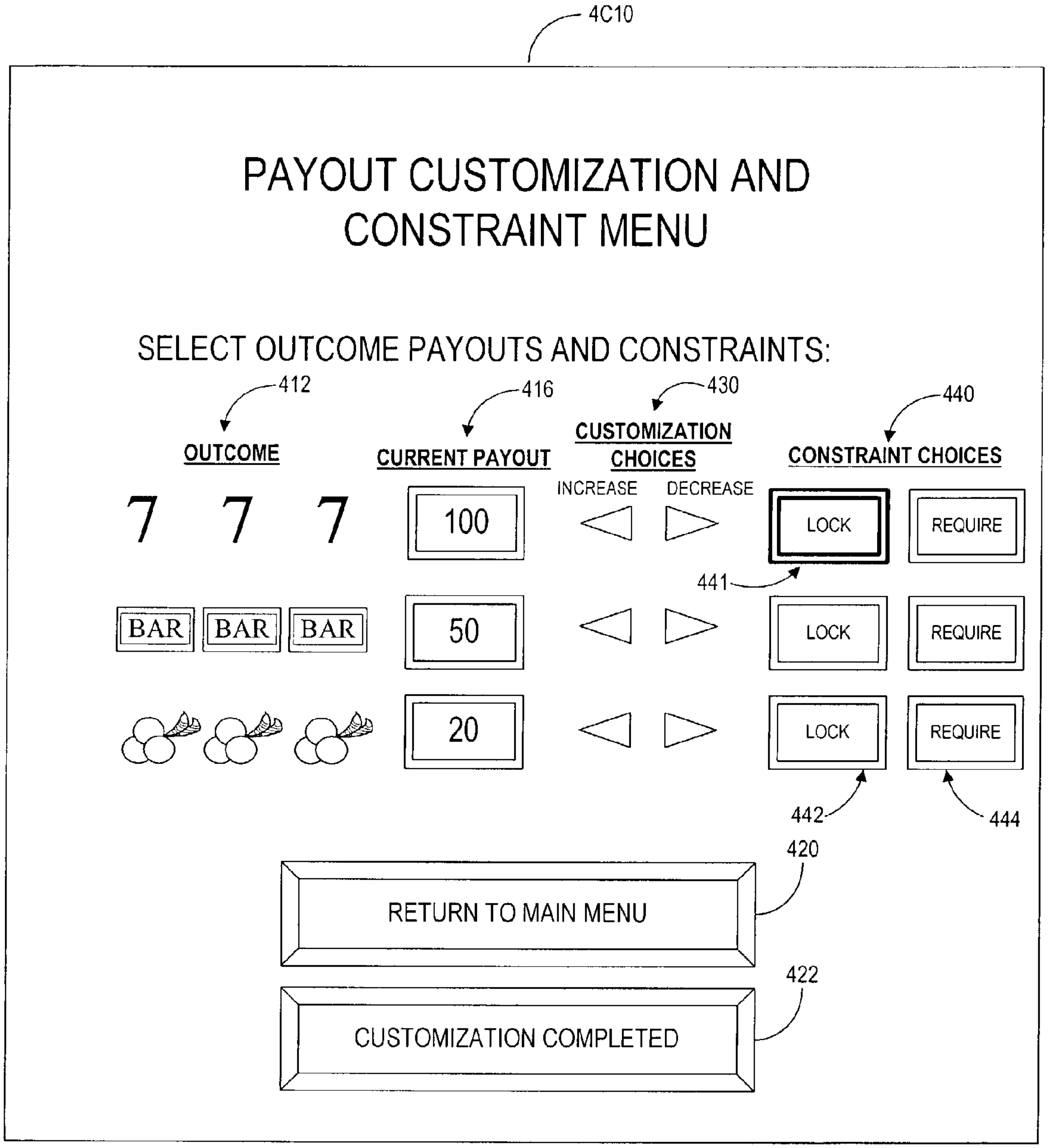
FIG. 4C is an exemplary illustration of a payout customization and constraint menu screen for the gaming device of FIG. 1.

FIG. 4C shows one embodiment of a customization and constraint menu 4C10 wherein constraint choices 440 provide the player the opportunity to apply constraints to one or more elements. If selected, a "lock" constraint, such as that illustrated at 442, may force the value of the corresponding element to remain at its current value. For example, in FIG. 4C, the "lock" button 441 corresponding to the outcome "7-7-7" has been selected, as indicated by the highlighting of the button's border. Therefore, the payout of the outcome "7-7-7" may be constrained to remain at the "current value" 416 of 100. Also, if selected, a "require" constraint, such as that illustrated at 444, may force the value of the corresponding element to be altered. For example, if a player were to selected the "require" constraint 444, then the player may thereby force of the payout of the outcome "cherry-cherry-cherry" to change from its "current value" 416 of 20, to some other value. In one embodiment, menu 4C10 may be accessed through the selection of the "payout" option 312 in the menu illustrated in FIG. 3B.

Figure 4D:
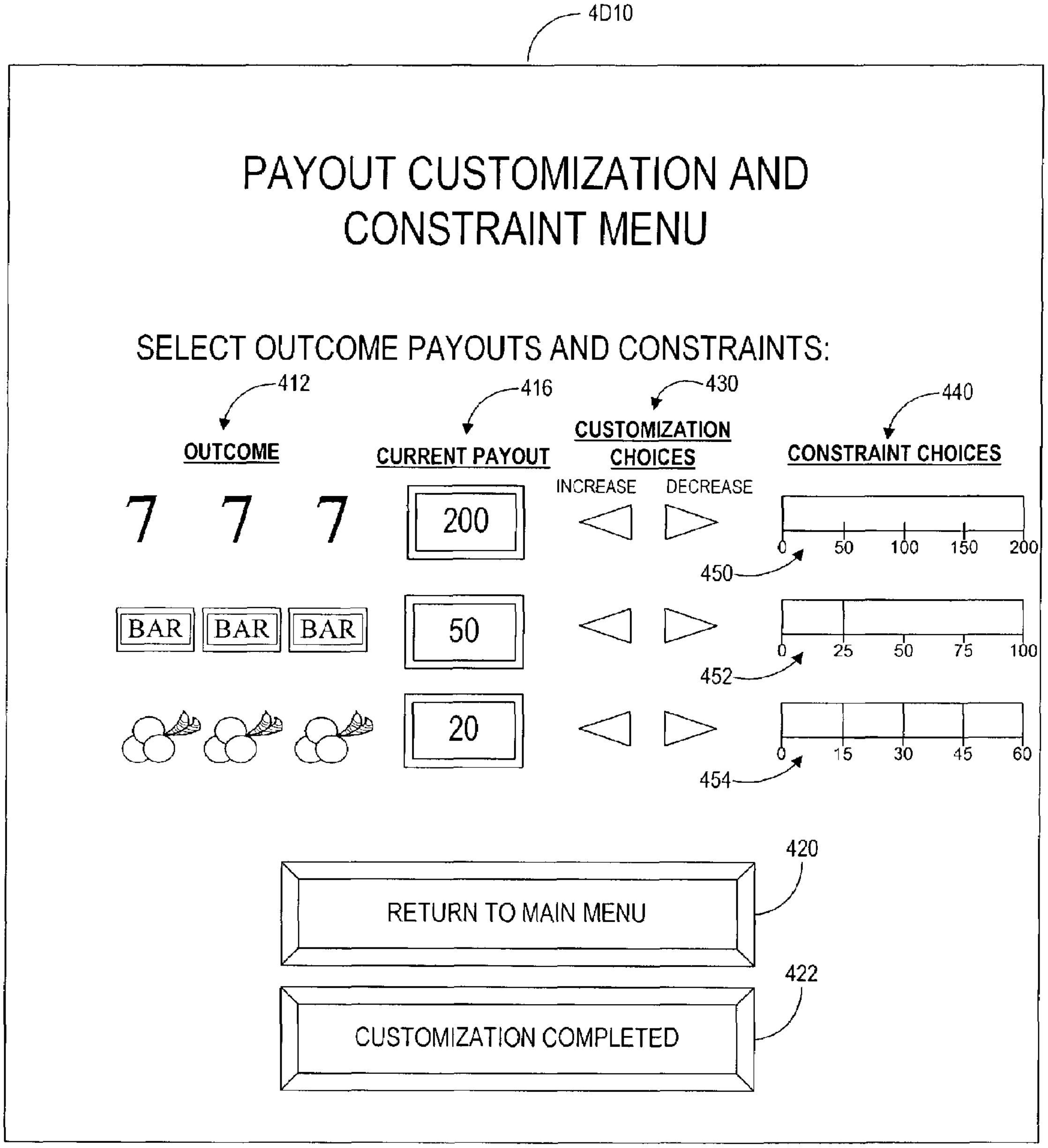
FIG. 4D is an exemplary illustration of an alternative payout customization and constraint menu screen for the gaming device of FIG. 1.

FIG. 4D shows one embodiment of a customization and constraint menu 4D10. In FIG. 4D, a player may apply constraints by highlighting portions of a number line, such as the number line 452. The highlighted portions of the number line may then correspond to the range of values that the corresponding element may assume. In one embodiment, menu 4C10 may be accessed through the selection of the "payout" option 312 in the menu illustrated in FIG. 3B.

Figure 5A:
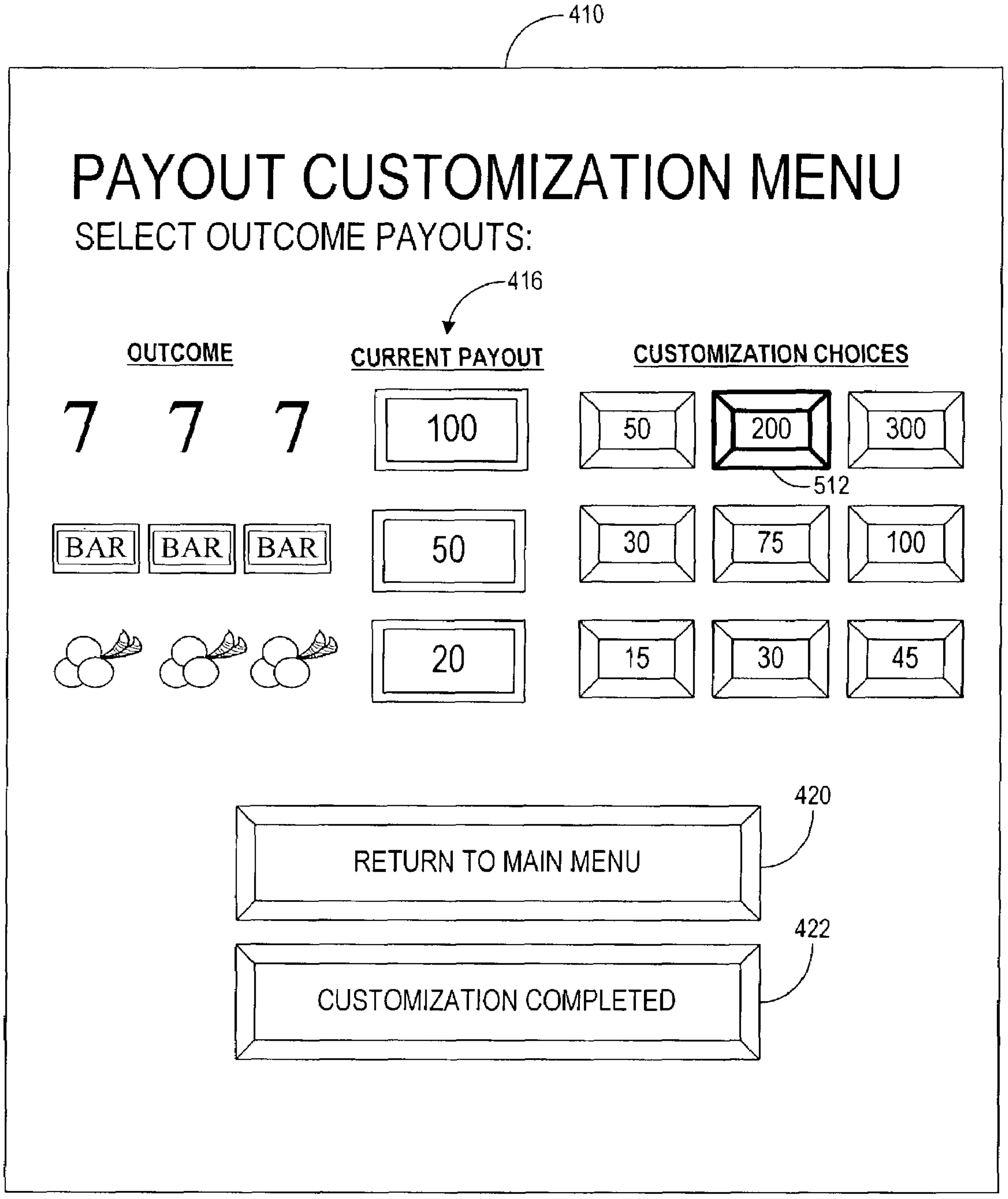
FIG. 5A is an exemplary illustration of a specific payout customization menu screen for the gaming device of FIG. 1.

Returning now to the embodiment of a customization menu first illustrated in FIG. 4A, FIG. 5A shows the customization choices of the player. For an outcome of "7-7-7", the player has chosen "200" at 512 as opposed to the default payout of "100". For the outcomes "bar-bar-bar," and "cherry-cherry-cherry" the player has left the default values of "50" and "20" respectively, as indicated at 416. The player may thus obtain a feeling of control and may be more likely to stay with the current machine. Upon selection of the customization completed button 422, the current payout displays 416 may change. For instance, the payout value of "100" corresponding to the outcome "7-7-7" may change to the value of "200" chosen by the player. Furthermore the gaming device may calculate a new value of "15" corresponding to the outcome "cherry-cherry-cherry". Thus, the payout value of "20" corresponding to the outcome "cherry-cherry-cherry" may be changed to "15".

Figure 5B:
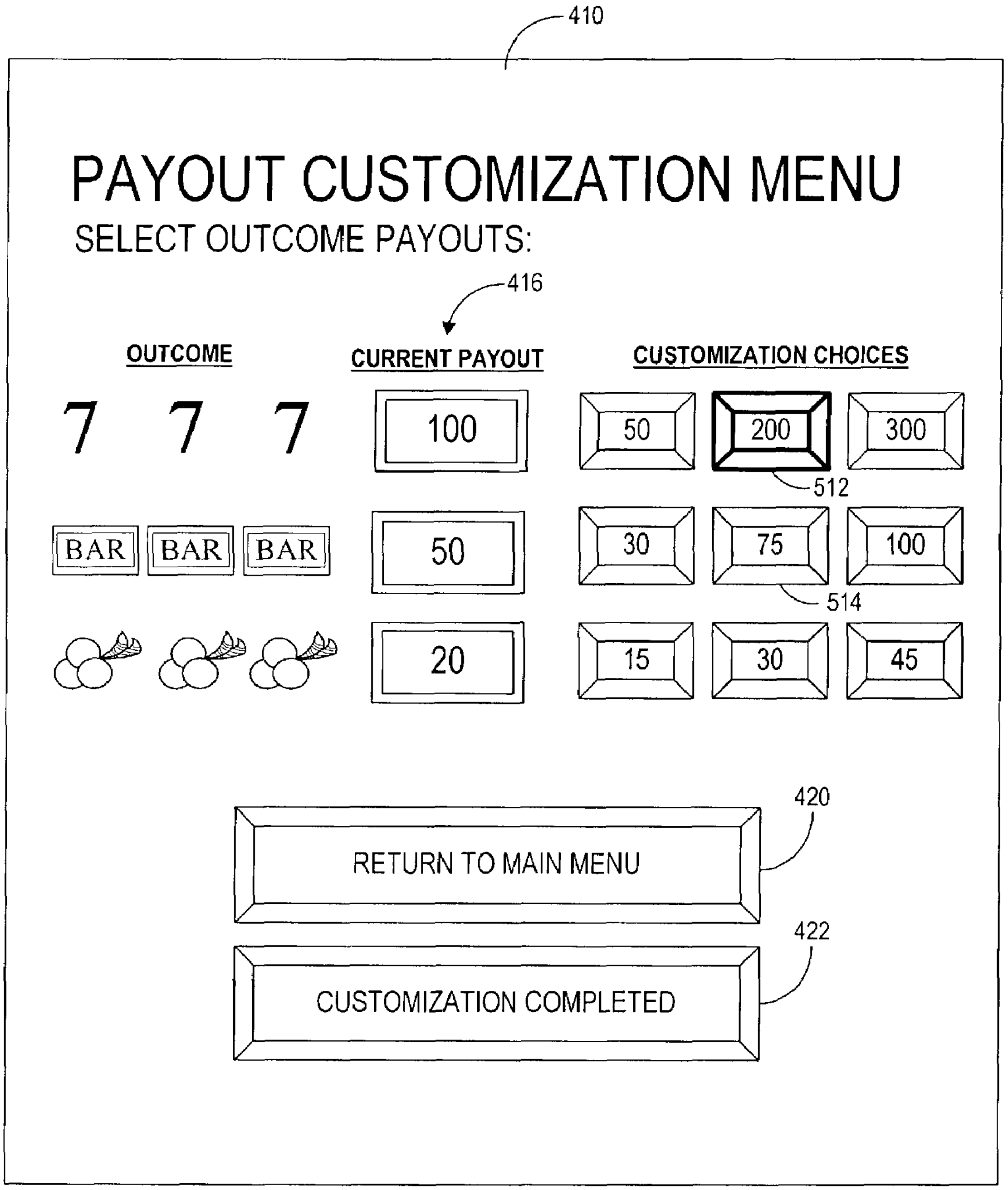
FIG. 5B is an exemplary illustration of a specific payout customization menu screen for the gaming device of FIG. 1, with certain customization choices grayed out.

In one embodiment, once a player has selected "200" for the payout of the outcome "7-7-7," as shown at 512, other customization choices are grayed out, as illustrated at 514 (of FIG. 5B). The player can no longer select the choices that have been grayed out. The graying out of certain customization choices by the gaming device may be desirable in one or more embodiments to prevent a player from selecting multiple customization choices that favor the player, and leaving the gaming device with a limited number of elements with which to compensate for those choices. For example, suppose in the payout customization menu screen 410 of FIG. 5B, that the player were allowed to select "200" for the payout of the outcome "7-7-7," "100" for the payout of the outcome "bar-bar-bar," and "45" for the payout of the outcome "cherry-cherry-cherry." Then all the player customizations choices would favor the player (all selected payouts would be larger than the current payouts). In order to maintain a constant house advantage, the gaming device would have to make offsetting adjustments to the values of one or more other elements, such as the values of other payouts or such as other probabilities. But since player adjustments would have been so favorable to the player, the gaming device might have to make large offsetting adjustments, or offsetting adjustments to the values of many different elements.

In one or more embodiments, the gaming device might be limited in the size or number of offsetting adjustments that can be made. For example, the gaming device might have only a few winning outcomes, allowing for the reduction of only a few payouts. Additionally, the gaming device manufacturer may not wish for players to know the probabilities of occurrence of any outcomes, and so the gaming device may not allow the alteration of probabilities of outcomes' occurrences. Therefore, the graying out of certain customization choices is one way in which the gaming device may avoid having to make large offsetting adjustments to element values, of having to make offsetting adjustments to a large number of element values, or of having to make offsetting adjustments to the values of elements that the gaming device is restricted from altering. It should be noted, however, that in one or more embodiments, a gaming device may have a sufficient number of elements whose values are available for modification. Furthermore, the gaming device may have few restrictions on the amounts by which element values may be altered. Therefore, in these embodiments, the gaming device need not necessarily gray out certain customization choices.

In a further embodiment, menus similar to menu 410 may be provided for selection of other elements. For example, by substituting "current probabilities" for the "current payout" of display 416, and selecting probabilities in the customization choices 418 display, the menu represented in FIG. 4A is easily changed to handle customization of probabilities. To change the wager amount, only two display areas are required, such as represented at 416 and 418 since the wager amounts pertain to all outcomes. Hence the display area 416 would represent the current wager amount, and display area 418 represents the choices as determined by the casino. In an alternate embodiment, the wager amount button on main menu 310 represents multiple amounts that may be selected directly from the main customization menu 310 without having to navigate to a secondary menu. For example, the wager amount button, when selected, may reveal a pull down menu directly on the screen of the main customization menu 310. In a still further embodiment, rather than selecting from predetermined choices, a player may enter a desired amount either via a keypad, or by selecting "increase" and "decrease" arrows 432 and 434 displayed on the payout customization menu 4B10 as shown in FIG. 4B. Such selection will cause display of a customized payout value which may then be selected by pressing button 420 or 422. Further buttons may be provided to cancel customization at any point in the process of operating the menu.

There are many examples of player customization. In one example, a player chooses to double the top jackpot. The gaming device compensates by lowering the probability of hitting the top jackpot in order to maintain a pre-defined house advantage of 7%, or of some other desired percentage. In another example, the player may choose to increase the probability of hitting a jackpot and decrease the wager per pull. The gaming device compensates by decreasing the value of the jackpot payout. Alternatively, the player may choose to increase the value of smaller prizes. In this case, the gaming device compensates by lowering the probability of hitting outcomes that yield those prizes. The above-described menus that allow customization may be provided by software, referred to as a player input module. The player input module receives a modification to one or more game elements through menus and player interaction with the gaming device. The software may be stored in storage device 104.

Figure 6:
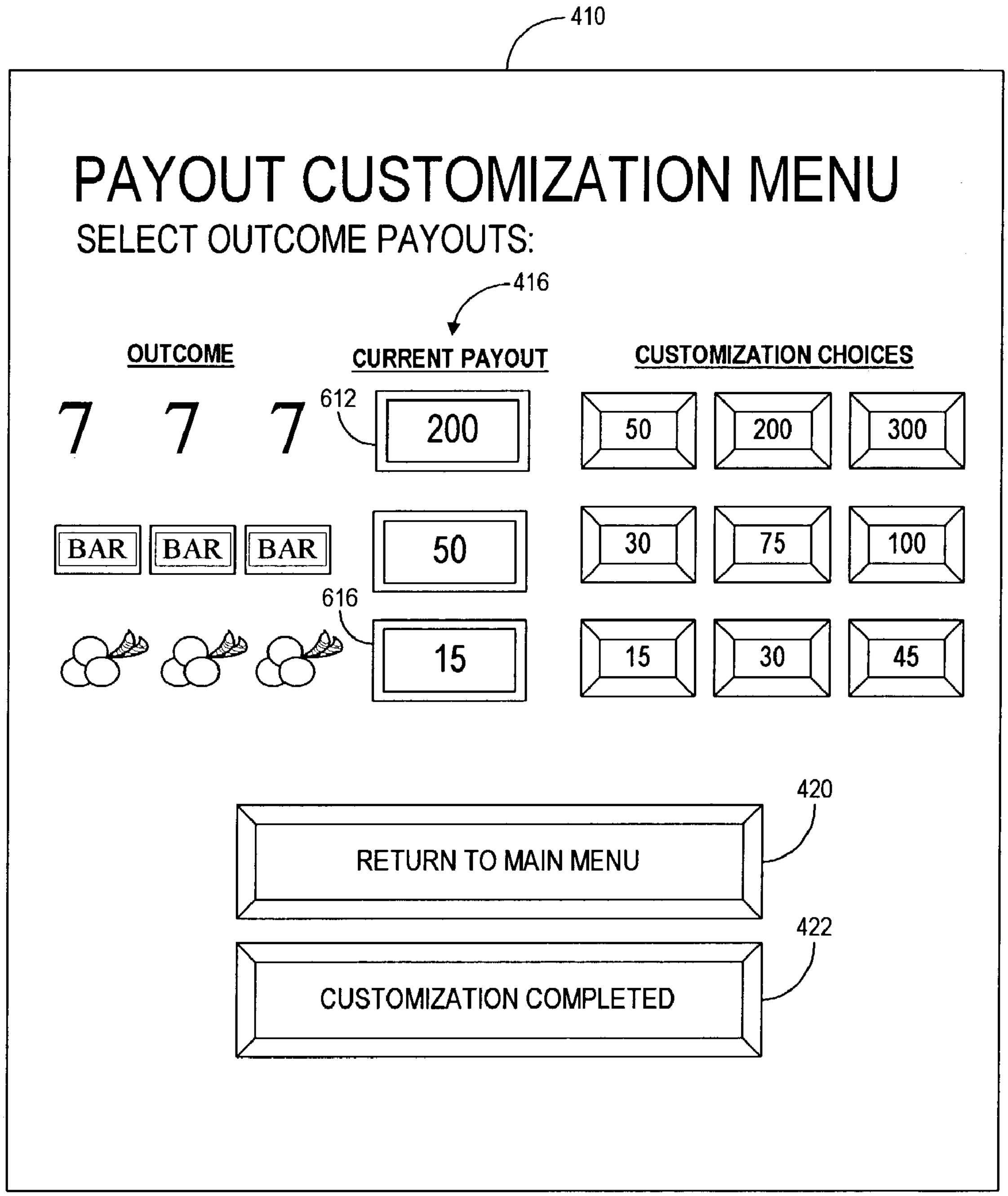
FIG. 6 is an exemplary illustration of adjusted 'current payout' output based on the player's choices in FIG. 5.

Reference is now made to FIG. 6, which is an exemplary illustration of payout customization menu 410 after the player's customization choices have been incorporated. In FIG. 6, the current payout 416 for the outcome "7-7-7" has been altered from its value of 100, illustrated in FIG. 4A, to a new value of 200 (612). Furthermore, the current payout 416 for the outcome "cherry-cherry-cherry" has been altered from its value of 20, illustrated in FIG. 4A, to a new value of 15 (616). In the exemplary illustration of FIG. 6, the value of 200 (612) for the outcome "7-7-7" represents a value selected by the player, whereas the value of 15 (616) for the outcome "cherry-cherry-cherry" represents a value calculated by the gaming device in order to compensate for the value of 200 chosen by the player. Therefore, the outcome "7-7-7" has served as a customizable element, and the outcome "cherry-cherry-cherry" has served as a compensating element.

Figure 7:
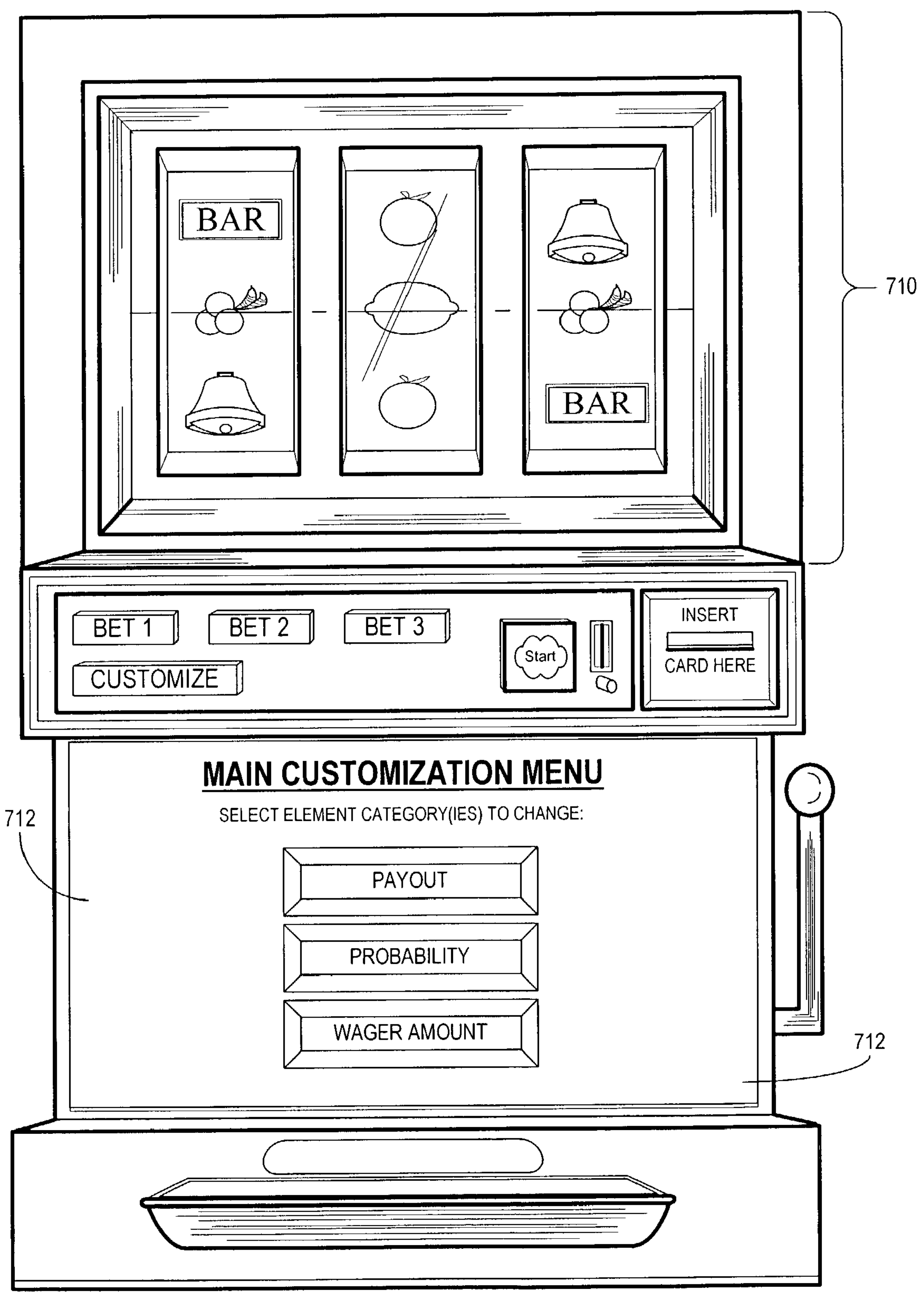
FIG. 7 is an example of a front elevation view of an alternate embodiment of a gaming device having a screen display appear in place of the payout schedule.

In FIG. 7, an alternate embodiment of a gaming device 710 includes screen display 712, which comprises a main customization menu in the lower portion of the gaming device. In this embodiment, the display 712 is electronic and shows the payout schedule when a player is not in the process of customization.

Figure 8:
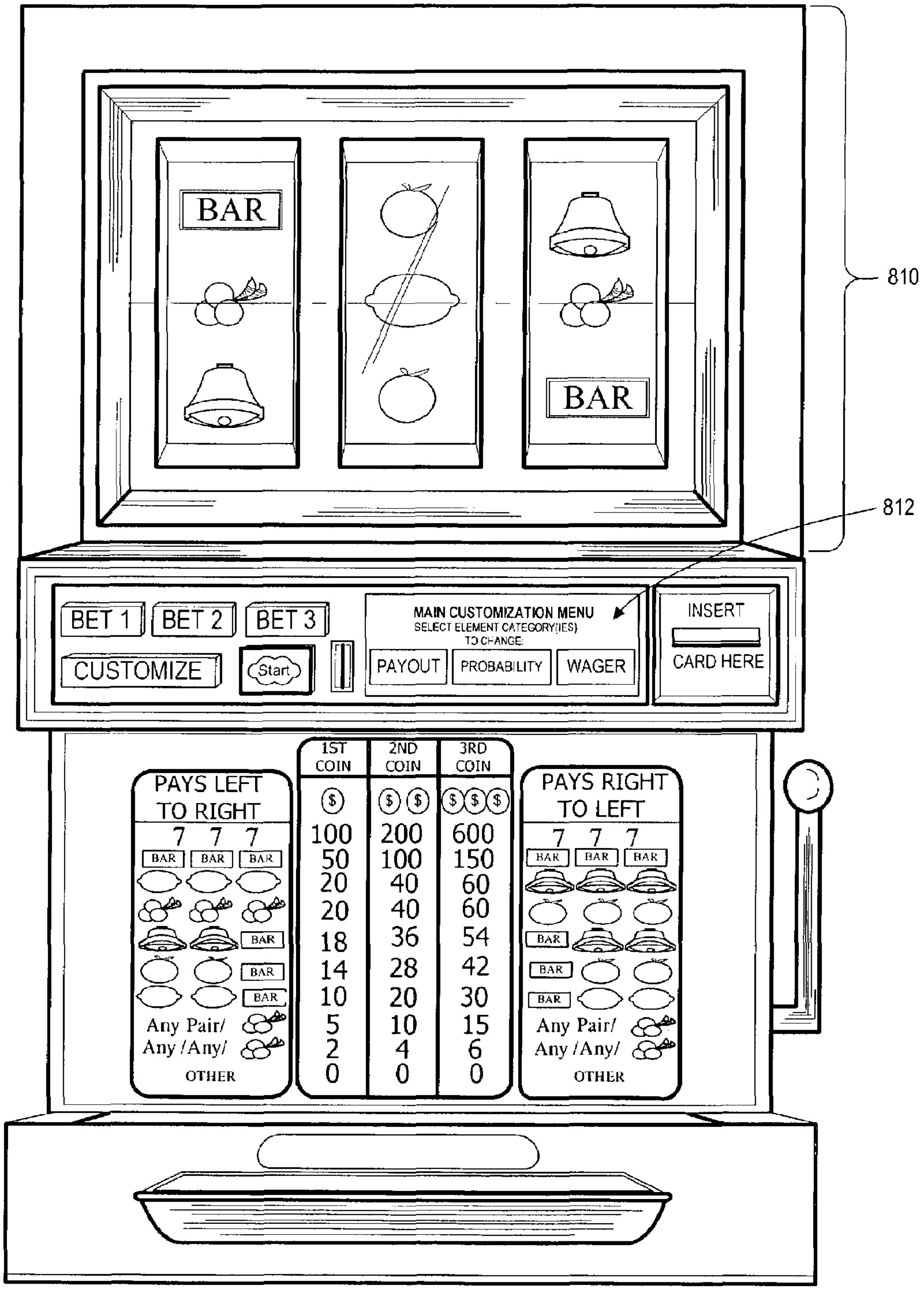
FIG. 8 is an example of a front elevation view of an alternate embodiment of a gaming device having a screen display built into the middle part of the body of the machine.

FIG. 8 is an illustration of an alternate embodiment of a gaming device 810 where a main customization menu 812 is built into the middle part of the body of the machine.

Figure 9A:
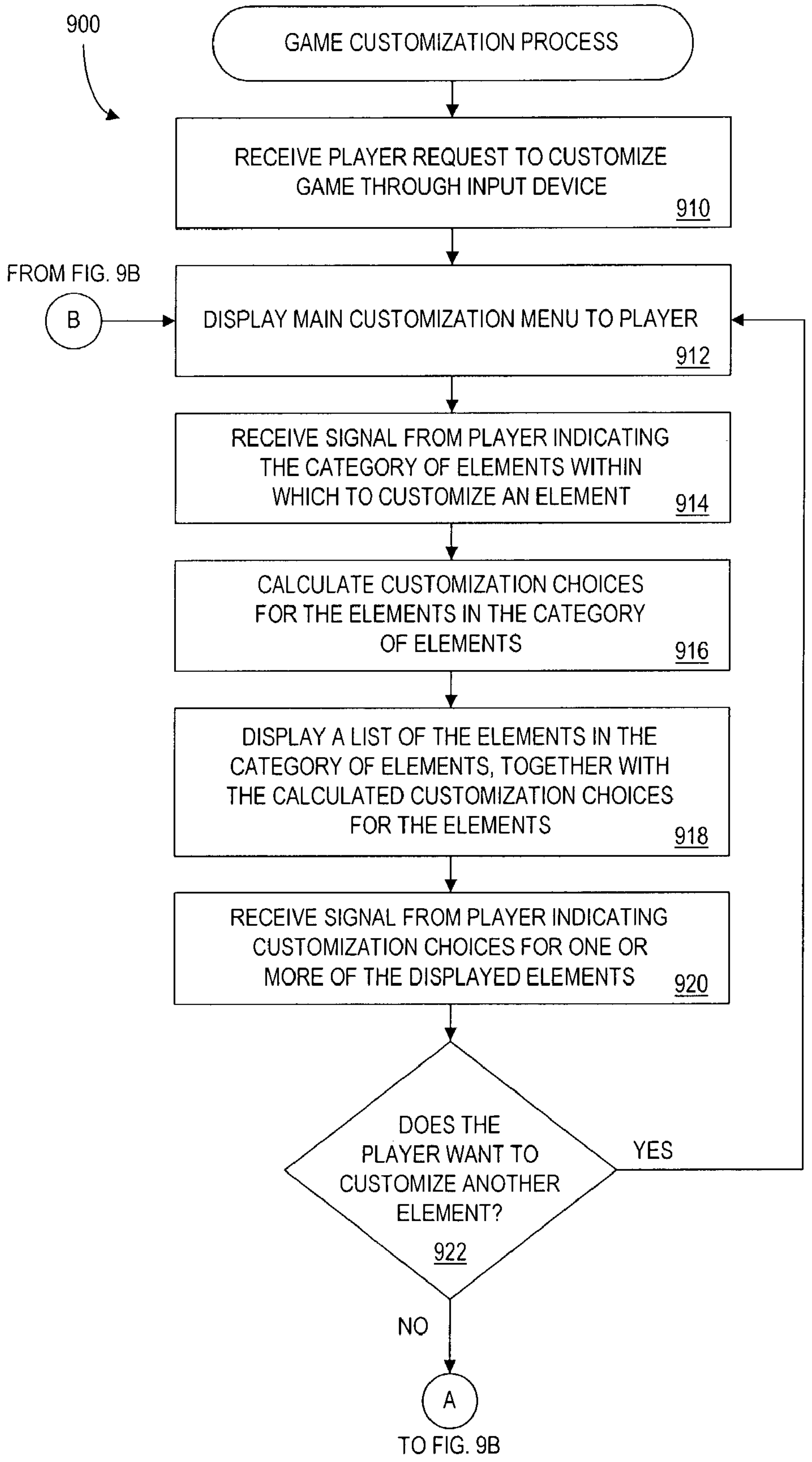
FIGS. 9A and 9B together comprise a flowchart representation of a customization step for a gaming device, in accordance with one or more embodiments of the present invention.
Figure 9B:
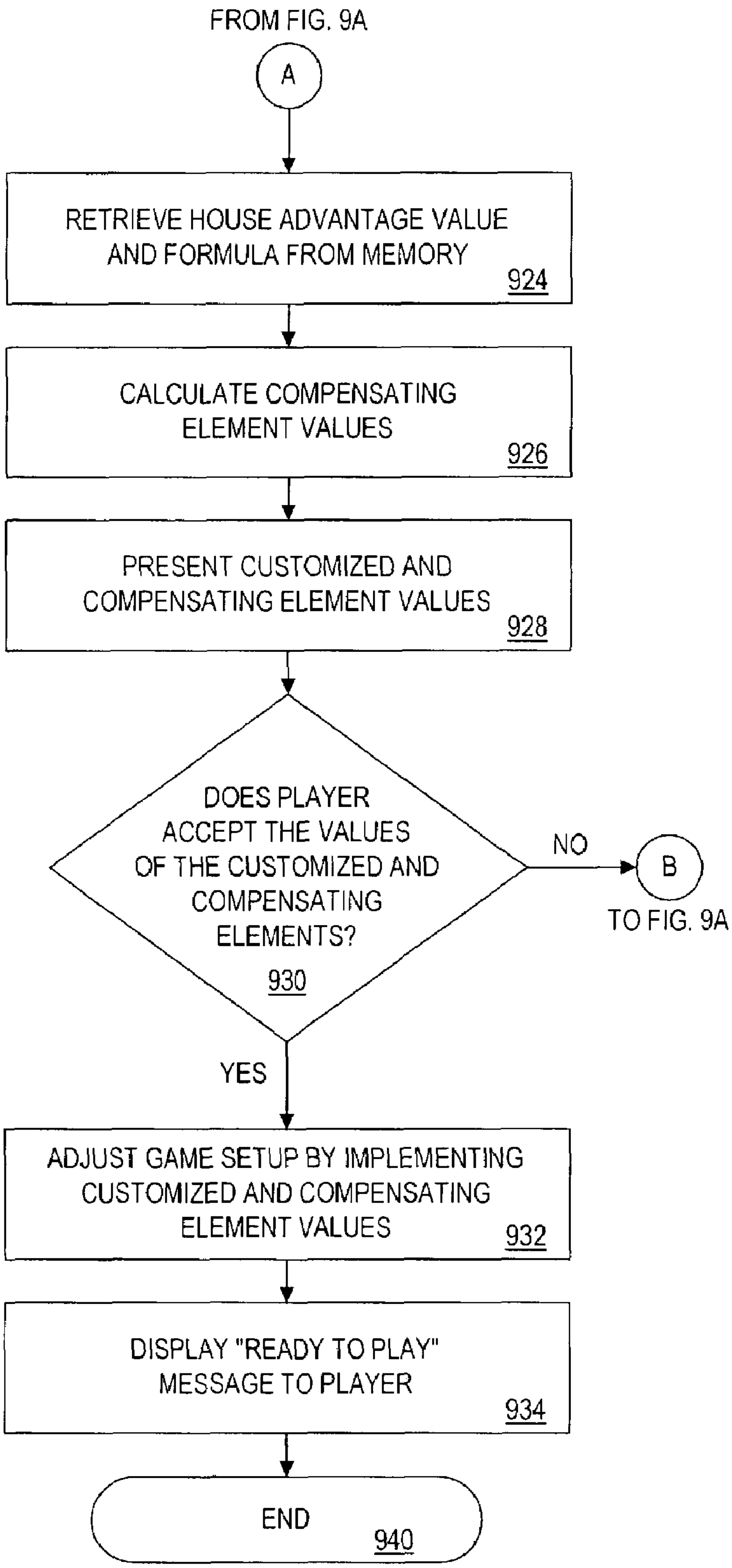

FIGS. 9A and 9B together comprise a flowchart of one embodiment of a customization process. In one embodiment, the flowchart represents the steps carried out by processor 102 while executing a program, including an element modification module and the player input module stored on data storage device 104. The program may be stored on any machine readable medium and may be downloaded from a remote device via network interface 106 which may comprise an ethernet card, modem or other suitable communications card or port. The customization process begins at 900 and is represented by blocks in flowchart form. The blocks represent steps performed by software modules or objects.

A player request to customize a game is received at step 910 and the main customization menu is displayed at step 912. The customization step 912 is illustrated in FIG. 3A as "MAIN CUSTOMIZATION MENU" 310. At step 914, a signal from a player, indicating a category of element to customize, is received. In the illustration of FIG. 3, the categories of elements are: elements effecting the payouts of outcomes (denoted "payout"), elements effecting the probability of outcomes occurring (denoted "probability"), and elements effecting the required wager amount of the player (denoted "wager amount"). Many other categories of elements are possible. One of the purposes of displaying categories of elements to the player is to simplify the process by which the player chooses an element to customize. In keeping with this purpose, an alternative to the "Main Customization Menu" of FIG. 3A might be a search feature. Using the search feature, a player might type in a description of a category of elements. Exemplary descriptors might include "quantity of symbols", "probability of four-of-a-kind," and "wager amount". The results of the search might lead to a targeted menu listing individual elements and the values the elements are permitted to assume.

In the embodiment illustrated in FIGS. 3A and 4A, the player will be allowed, for one or more elements within the category of elements chosen by the player, to select a value from among a set of choices determined by the gaming device. Therefore, at step 916, the gaming device determines for each element in the category of elements whether the element is available to have its value altered by the player, and if so, the values to which the element's current value may be altered. In the example illustrated in FIG. 4A, the category of elements includes the payout for the outcome "7-7-7," the payout for the outcome "bar-bar-bar," and the payout for the outcome "cherry-cherry-cherry." For the outcome "7-7-7," the gaming device may determine possible payouts (i.e., values that the payout element is allowed to assume) to be 100, 50, 200, or 300. For the outcome "bar-bar-bar," the gaming device may determine possible payouts to be 50, 30, 75, or 100. For the outcome "cherry-cherry-cherry," the gaming device may determine possible payouts to be 20, 15, 30, or 45.

The gaming device may determine the customization choices using one or more criteria. One example of a criterion comprises limiting the values that elements may assume to "round" numbers, such as numbers evenly divisible by 100, 50, 25, 10, 5, 2, or 1.

Another example of a criterion for determining customization choices comprises limiting the values that elements may assume to those that do not exceed the capacity or the capabilities of the gaming device. For example, a mechanical slot machine with 22 stops on a reel cannot put 23 cherries on a single reel. In yet another example of a criterion, no gaming device can make an outcome or one of a set of outcomes occur with probability greater than one, or less than zero. Another criterion would limit customization choices to those that could possibly or reasonably be offset using compensating elements. For instance, a player might not be allowed to set the payout of all outcomes of the form "cherry-any-any" to 1000. Doing so would force the gaming device, for example, to greatly reduce the probability of the occurrence of all outcomes of the form "cherry-any-any" in order to maintain a house advantage. However, the gaming device may not be configured to generate random numbers according to probabilities below a certain threshold.

Still another criterion would limit customization choices to be within a fixed range of values from a reference point. For instance, customization choices are limited to those that would assign a value to an element between 50% below the element's default value, and 100% above the element's default value. Many other criteria for presenting customization choices are possible.

At 918, the elements within the selected category of elements, and the corresponding element customization choices are presented to the player. For example, in the illustration of FIG. 4A, the player has selected the category of elements that effect the payout of outcomes. Thus, FIG. 4A displays a menu of outcomes, the current payout for each outcome, and choices of values to which the player may adjust the payout of each outcome. The customization choices may be, for example, preprogrammed and stored in a table, or may be generated by the casino at a central server and downloaded into storage device 104 for use by this process. Alternatively, the player may choose for elements any value between a selected range, as illustrated for the category of elements related to payouts in FIG. 4B.

At 920, a choice for element customization in FIG. 5, is received from the player. The customization step 920 is illustrated for the category of elements related to payouts in FIG. 5A at 512. At 922, if the player wishes to customize another element, flow is returned to 912 where the main customization menu is once again displayed to the player. An example of the customization step 922 is illustrated in FIG. 5A at 420 and 422. If no further customization requests are indicated by the player, recalculation of other element values occurs. At 924, a house advantage value and formula are retrieved from memory 104, and at 926, remaining element values are calculated. At 928, the resulting element values (player selected and machine recalculated) are used to replace the default values and are displayed to the player at 928 as indicated at elements 612 and 616. The recalculation of internal element values may be a process executed within the machine and, therefore, may not be shown in the figures. In other embodiments, the recalculation of internal element values may be shown to the player. For example, the gaming device might present on a display a series of algebraic steps used to calculate a value for one or more elements. The customization step 928 is illustrated in FIG. 6 at 612 and 616.

Next, the program checks at 930 to see if the player has accepted the values for the customized elements. A player can so indicate by pressing the customization completed button 422 or the return to main menu button 420. If the player has not accepted the values for the customized elements, control is returned to block 912 to display the main customization menu and offer the player a chance to change the customization or return to default values. In one embodiment, a timer is used to automatically reset the gaming device to the default values if no activity is detected for a predetermined time. Once the player has accepted the customized elements at 930, a game setup is modified by implementing the customized element values in a known manner at block 932. A "Ready to Play" or other suitable indication is provided to the player at 934. Internal customization tables are changed, and the game may then be played and the customization process ends at 940.

These steps apply equally well to the customization of elements other than payout. Such elements are easily modifiable by following the above steps. In particular, at 912, the player is shown the elements available for customization. At steps 914 to 916, the player selects at least one element to be customized. At step 920, the player selects at least one value to substitute for the default values, and at step 926, the machine adjusts other element values or a value to compensate for the player selected values. The resulting values are displayed at 928, and the player accepts or rejects the resulting set at 930. Finally, the machine applies the accepted values to game play at 932.

As defined herein, two major categories of elements may be payout elements and non-payout elements. In one embodiment, a player customizes a payout element and the gaming device compensates by altering the value of another payout element. In another embodiment, the player customizes a payout element and the gaming device compensates by altering the value of a non-payout element. In a third embodiment, a player customizes a non-payout element and the gaming device compensates by altering the value of a payout element. In a fourth embodiment, the player modifies a non-payout element and the gaming device compensates by altering the value of a non-payout element. In addition to these four embodiments, there are embodiments where the player might customize multiple elements and the gaming device might compensate by altering the value of multiple elements. For example, the player might customize a first element that is a payout element and a second element that is a non-payout element, and the gaming device might compensate by altering the value of a third element that is a payout element and a fourth element that is a non-payout element.

The Significance of Various Categories of Elements

Discussion now turns to the probability of occurrence of a given outcome as an element. With many existing gaming devices, a player is largely unaware of the probability of any given outcome occurring. Gaming devices typically do not publish or display the probability of an outcome occurring. Furthermore, a player often doesn't even know how many symbols are on a reel of a gaming device, as the reel may be electronic in nature and may contain a theoretically unlimited number of symbols. Even if a player does know the number of symbols on a reel of a gaming device, he cannot necessarily extrapolate a probability of a symbol's occurrence. For example, just because a reel has five symbols on it does not mean that each has a probability of ⅕ of occurring. Rather, a random number generator internal to the gaming device may preferentially weight the probability of occurrence of some symbols over others.

Since players have been largely unaware of the probabilities of outcomes' occurrences, it has not been obvious to allow players to change such probabilities. One might question why players would want to change something whose value they don't know in the first place.

Changing the probability of an outcome's occurrence has also been difficult for a gaming device to accomplish within a regulatory framework. Typically, a gaming device must undergo a process of regulatory approval in which a regulator verifies the house advantage claimed by a gaming device. Any subsequent changes to the probability of an outcome's occurrence would potentially change the house advantage provided by the gaming device. Therefore, the gaming device would potentially be subject to a new regulatory approval process any time a change was made to a probability of an outcome's occurrence.

However, as described herein, probability elements may serve as important elements for adjustment by a player or a gaming device. Players may be willing to adjust probabilities if they are actually told what the probabilities are. Players may also be willing to adjust probabilities on a percentage basis (e.g., increase 50%, decrease 25%), even if they do not know the absolute value of the probabilities. Furthermore, players may be willing to allow the gaming device to adjust probabilities of whose values the players are unaware. It may make no difference to a player that a probability has gone from one unknown value to another, since in neither case does the player know the probability.

Probability elements are also extremely flexible elements. Whereas payouts may be denominated in terms of whole numbers (e.g., multiples of one coin), probabilities may be denominated in terms of extremely small fractions (e.g., $2^{-32}$). Therefore, probabilities may be adjusted by extremely small or precise amounts in order to achieve a desired house advantage for a gaming device.

Additionally, it seems plausible that gaming regulators would allow, without the need for re-approval, the adjustment of probability element values, and of other element values, if there were assurances built into the processor of the gaming device that the house advantage would remain constant. For example, a gaming device might store internally a record of all changes made to the values of elements, and a time at which such changes were made. A gaming regulator might then examine the record in order to verify that the house advantage did not vary significantly from any given time to another. Such records may also be stored at a casino server, or at any other location.

Discussion now turns to wager amount as an element. With many existing gaming devices, a player often has a choice as to the amount to be wagered on each handle pull. Typically, a player is able to place a wager whose size is a multiple of a base unit. The base unit may be 5 cents, 25 cents, 1 dollar, etc. The wager may be twice the base unit, three times the base unit, and so on, typically with a cap at some multiple of the base unit. The cap may be 3 times the base unit, five times the base unit, 90 times the base unit, etc. By varying the size of a wager, a player may vary the paytable used to pay winning outcomes, or he may vary the number of lines played. For example, a player who achieves a winning outcome may win \$5.00 if his wager was 25 cents, \$10.00 if his wager was 50 cents, \$15.00 if his wager was 75 cents, and so on. As another example, a player who wagers 25 cents may receive the benefit of an outcome occurring along a first pay line, a player who wagers 50 cents may receive the benefit of two pay lines, a player who wagers 75 cents may receive the benefit of three pay lines, etc. Additionally, a wager that is the multiple of a base unit may simultaneously enable a player to receive the benefit of multiple pay lines and to change the paytable for any outcome to be achieved on one of the multiple pay lines. For example, by wagering \$1.00, a player may receive the benefit of two pay lines, with wins along the pay lines paid at twice the rate of a wager equal to the base unit (i.e., 25 cents). Many current gaming devices are configured so that an increase in the size of a wager will result in a proportional increase in the payouts for all outcomes. For example, a doubling of a wager amount will result in the doubling of the payouts for every outcome. The usual result is that the payback percentage of the gaming device is held fixed.

The present invention allows for a wager amount to be used as a compensating element for player customizations. However, unlike the way in which many existing payout schedules vary (i.e., with payouts all increasing proportionally to one another), a player may adjust some payouts upwards or downwards while leaving others unchanged, or while adjusting them in the opposite direction. Therefore, payouts are not necessarily all adjusted in proportion, and a required wager amount cannot necessarily be changed simply in proportion to a change in one of the payout amounts. The present invention, however, allows computation of a required wager amount that would leave the house advantage nearly unchanged. For example, equation 1 may be used to determine a required wager amount. Furthermore, the required wager amount determined with the present invention need not necessarily be a multiple of a base wager amount. For example, suppose the minimum wager at a gaming device was \$1.00. The present invention might determine a new required wager amount to be \$1.05 due to player adjustments to payout amounts. It should also be noted that, with existing gaming devices, the amount of money a player inserts decides the paytable that will be used for the current game. However, with the present invention, a player may first decide the paytable to be used, and then the player may be instructed as to the required wager to be made in order to receive his desired paytable. One benefit of the present invention is therefore that a player may be prevented from mistakenly initiating a game after having inserted a wager amount that does not correspond to his desired paytable. Situations may thereby be avoided, for example, where a player achieves an outcome but does not receive the payout that he expected because he inserted the wrong wager amount.

In addition to the above benefits, the present invention allows for a gaming device to allow a tradeoff between a wager amount and the probability of one or more outcomes' occurrence. For example, a player may increase the probability of an outcome occurring, and the gaming device may then require a larger wager from the player to initiate a game in which the probability has been altered. With the present invention, a gaming device may also allow for a tradeoff between wager amount and comp points awarded, wager amount and rate of play required, wager amount and type of prize awarded, etc.

Discussion now turns to rate of play as an element. If a player wagers a fixed amount per handle pull, and a casino maintains a fixed house advantage per handle pull, then the casino may expect to make higher profits per hour as the player plays more rapidly. Therefore, it may be in a casino's interest to encourage more rapid play from players. Additionally, a casino may be willing to make one or more concessions to the player, such as in the form of increased payouts or increased probabilities for winning outcomes, in exchange for more rapid play on the part of the player.

A player's rate of play has, however, been largely neglected as something that a gaming device or casino might control. As a player has the option to leave a gaming device at any time, it is difficult to require that a player make a single handle pull, let alone a whole series of handle pulls within a set period of time. Players have many reasons for playing slowly. Players may wish to visit the restrooms, find food, or chat with friends. Furthermore, a player may run out of credits. If a player has no credits invested in a gaming device, then the gaming device typically cannot influence the player to play quickly until the player inserts more credits. However, the player cannot necessarily be compelled to insert more credits.

Despite the aforementioned difficulties, it is possible that a player can be encouraged to play quickly. First, the player may be motivated to play quickly by an advantage that is provided to the player. For instance, the value of a payout element is increased so long as the player maintains an increased rate of play. Secondly, a player may be encouraged to play at an increased rate only when the player has an adequate number of credits in a gaming device. For example, the player may be encouraged to play at an increased rate only if he has at least fifty credits in a gaming device. Thirdly, a player may allow the gaming device to play automatically on his behalf. In this way, a player may take breaks to chat or visit the restroom, and may still maintain a minimum rate of play. In addition, a player may be encouraged to maintain a minimum rate of play through the use of penalties. For example, if a player slows for five minutes below a rate of 15 pulls per minute, a $3 charge may be added to the player's hotel bill.

Not only has a player's rate of play been neglected as something that can be controlled, but a rate of play has also largely been neglected as a means of generating offsetting reductions to a house edge. One reason is that a house edge is typically measured as a function of a single handle pull. However, a rate of play may only be measured using multiple handle pulls. For example, a rate of play may be measured as a given number of pulls per hour. Therefore, an element whose value represents a rate of play has not been used to offset reductions to a house edge caused by modifying payout elements, probability elements, or wager amount elements.

Figure 9C:
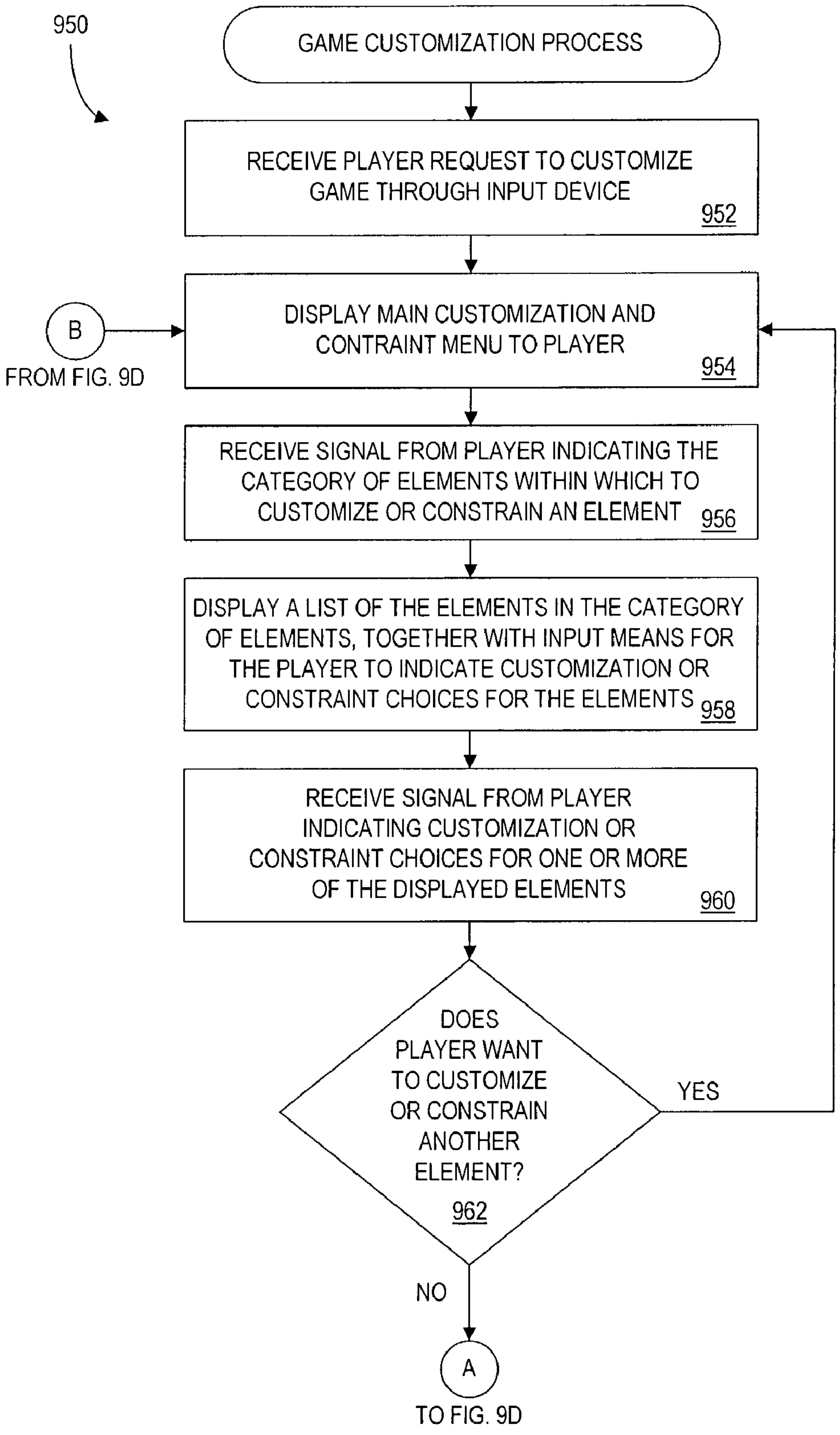
FIGS. 9C and 9D together comprise a flowchart representation of a customization and constraint step for a gaming device, consistent with one or more embodiments of the present invention.
Figure 9D:
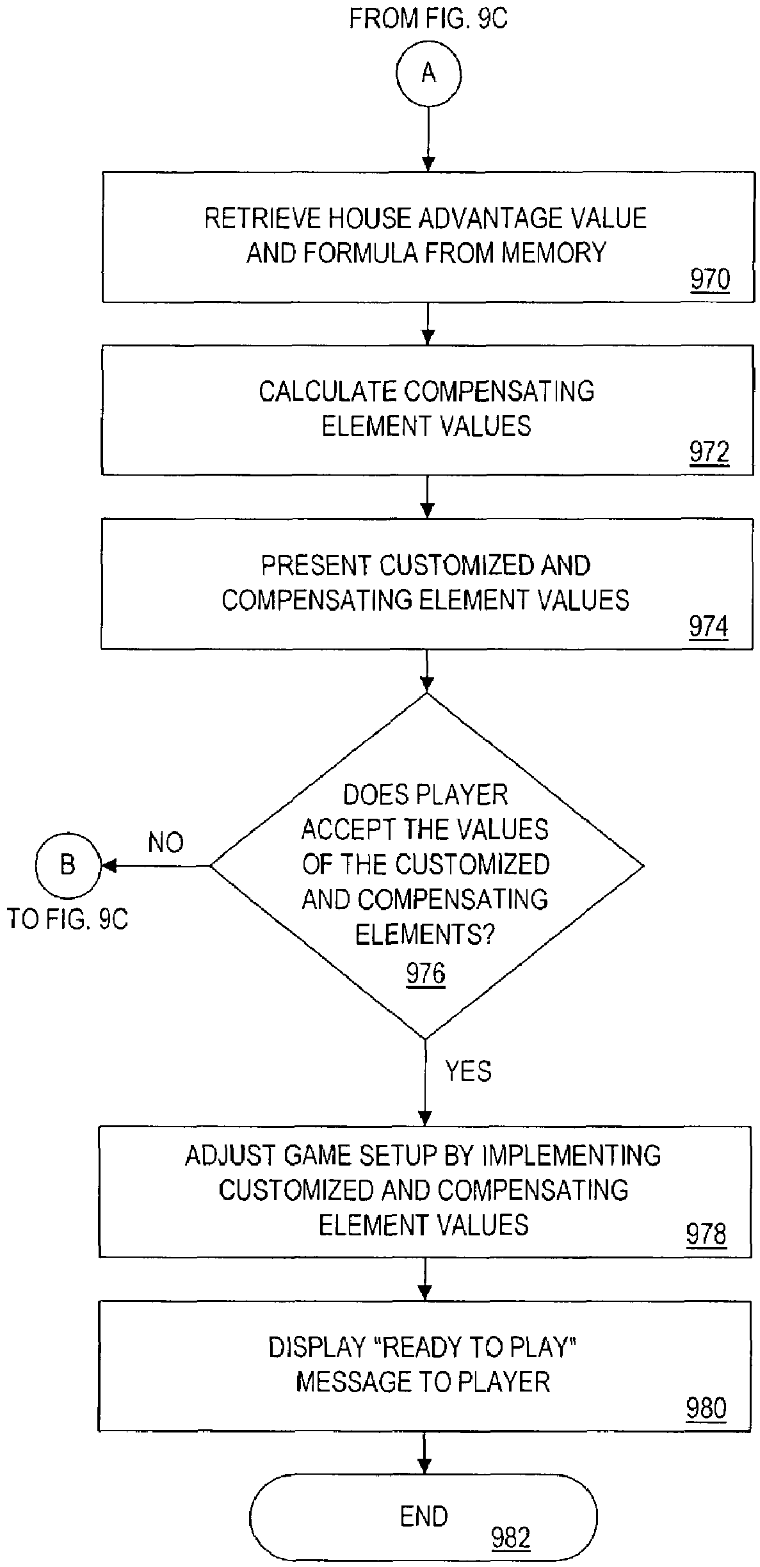

Reference is once again made to the figures. FIGS. 9C and 9D together constitute an alternate embodiment of the customization process. A difference from the process described in FIGS. 9A and 9B is that the player may impose one or more constraints on the values of elements. Therefore, after the customization process begins at step 950, and the gaming device receives a player request to customize the gaming device at step 952, the player is now presented with a customization and constraint menu instead of simply a customization menu. The gaming device then receives a player selection from the menu of a category of elements within which to customize or constrain an element (step 956).

At step 958, the gaming device then displays a list of elements in the chosen category. An exemplary display of the list of elements is shown in FIG. 4C, item 412. Also shown is the current payout for each outcome 416, and the customization choices 430. In addition, FIG. 4C shows constraint choices 440. For each element listed, there are two constraint choices: "lock" 442 and "require" 444. A player selection of "lock" may force the corresponding payout to remain at the current value. In other words, the gaming device will not be able to alter the corresponding payout to compensate for a player customization. A player selection of "require" may force the gaming device to alter the corresponding payout from the current value. The gaming device may receive a player selection of "require" for a particular element if the player wishes for that element to be used as a compensating element. In some embodiments, if the gaming device first receives from the player selections of the customization choices 430 to alter the current payout 416, then the gaming device may thereafter prevent the player from pressing "lock" or "require". In this embodiment, for example, the "lock" option may be intended to fix a payout to its default or to its most recent value, and not to a value just chosen by the player.

Figure 14:
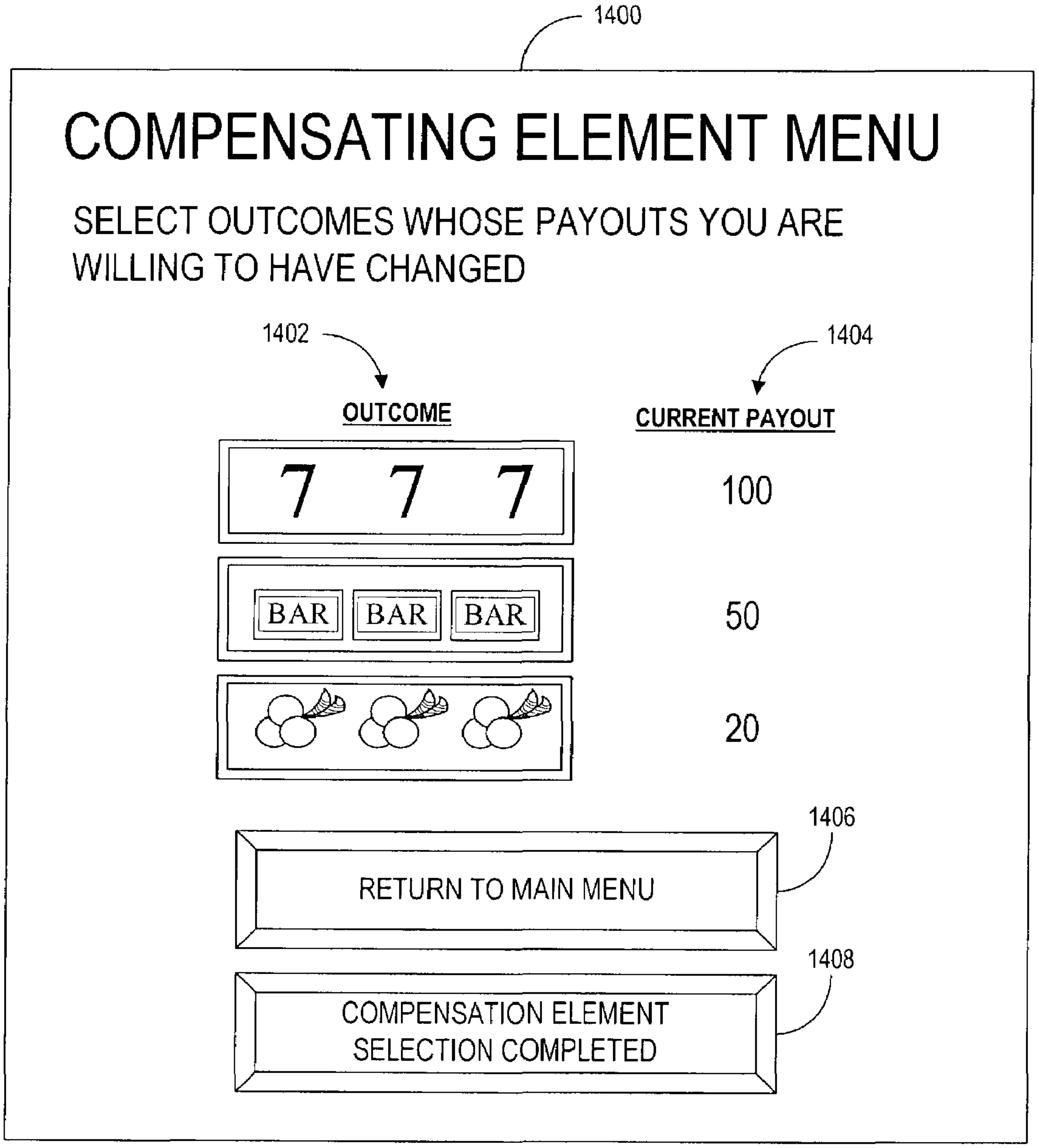
FIG. 14 is an exemplary illustration of a payout customization menu screen for the gaming device of FIG. 1.

In FIG. 4C the player selection of the "lock" button 441 has been received by the gaming device, causing the border of the button to become highlighted. The gaming device has received no selection from the player, as yet, for constraints to the payout of the outcome "bar-bar-bar" or to the payout of the outcome "cherry-cherry-cherry." If the gaming device does not receive from the player a selection of a customization for an element, then the element may be regarded by the gaming device as an element whose value may be altered by the gaming device without restriction. That is, the gaming device is free to alter the value of the element to compensate for player customizations, although the gaming device need not alter the element's value. In FIG. 14 is illustrated a screen from which a player may specifically indicate the elements that the gaming device may alter without restriction. However, in many embodiments, in order to compensate for player customizations, the gaming device must first alter the value of an element where the player has selected "require" as a constraint choice for the element before altering the value of an element that has not been constrained by the player.

Of course, many other constraint choices are possible. An "increase" constraint choice might force the gaming device to increase the value of the corresponding element. Similarly, a "decrease" constraint choice might force the gaming device to decrease the value of the corresponding element. An "at least" choice, together with a threshold value entered by the player, might force the gaming device to alter the value of the element to be at the player-entered threshold, or above. An "at most" choice would work in the opposite fashion. In some embodiments, a gaming device may allow a player to manually key in a complete description of a constraint. For example, "100-200, 300-400" might indicate that an element value is to fall within the range of 100 to 200 or 300 to 400.

In another embodiment, possible element values may be represented by a horizontally oriented number-line. The leftmost point on the number line may represent the lowest possible element value, and the rightmost point on the number line may represent the highest possible element value. Intermediate points may represent element values between the lower and the higher extremes. FIG. 4D, items 450, 452, and 454 illustrate three exemplary such number lines. A player may be allowed to impose a constraint by highlighting portions of the number-line in order to indicate that an element's value is constrained to fall within the highlighted portions. In 452, the gaming device has received player input highlighting the portion of the number-line spanning from 25 to 100. Thus, the value for the payout of the outcome "bar-bar-bar" is constrained to fall in the range of 25 to 100. In 454, the gaming device has received player input highlighting portions of the number-line spanning from 0 to 15 and from 30 to 45. The payout for the outcome "cherry-cherry-cherry" must therefore fall in the range of 0 to 15, or 30 to 45. No areas in the number-line of 450 have been highlighted. In this example, the gaming device has already received player inputs for customizing the payout for the outcome "7-7-7" to be at 200, from a default of 100. Therefore, it does not make sense for the gaming device to receive input from the player to impose a constraint on the payout of the outcome "7-7-7."

In some embodiments, there is no distinction between customizing an element and constraining an element. This is because customizing an element is equivalent to constraining the value of the element to take on a particular, player-chosen value. Therefore, the player may simply be permitted to impose constraints, after which the gaming device is free to adjust the values of the elements within those constraints.

At step 960, the gaming device receives a signal from the player indicating the player's customization or constraint choices for one or more of the elements. As discussed, this signal may include any player customization values for the payouts of the outcomes "7-7-7," "bar-bar-bar," "cherry-cherry-cherry," or for any other outcome. The signal may include customization values for elements in other categories of elements, such as probabilities or wager amounts. The signal may also include constraints imposed by the player, including designations of elements whose values may not be altered, or designations of elements whose values must be altered, and including the ranges in which the values of elements may fall. After step 960, the process continues much as it does for the process described in FIGS. 9A and 9B, starting from step 922.

Element Customization Operation

Multiple formulas may be stored within data storage device 104 and used by the above process to enable the processor to calculate how much one or more element values must change in order to accommodate the element customization by the player, while keeping the house advantage constant. Equation (1) provides the relationship between the wager amount, payouts, probabilities, and the house advantage:

$$WagerAmount - \sum_{i=1}^{n} \left(Prob_{x_i} \times Pay_{x_i}\right) = HouseAdvantage \tag{1}$$

Where

- n is the number of possible outcomes
- $x_i$ is the ith outcome
- $Prob_{x_i}$ is the probability of the ith outcome occurring
- $Pay_{x_i}$ is the payout associated with the ith outcome
- Wager Amount is the number of coins wagered
- House Advantage is the portion of the wager retained by the casino In other words, the house advantage is equal to the wager amount less the sum of all potential payouts times the probability of each potential payout. This sum of all potential payouts multiplied by their respective probabilities is known as the expected value of the payouts. After altering one of the elements and selecting another "compensating" element to change as a result, the above equation enables the gaming device 100 to determine how much the compensating element must change.

Although the above equation is sufficient to calculate any required changes, it requires that a compensating element be selected. By establishing rules for the selection of the compensating element change, the above equation may be simplified. For example, if it is assumed that for every payout change requested the machine is to calculate a new probability associated with that payout, and that any probability changes are compensated by a change to the probability of getting no payout, the equation collapses to:

$$CompensatingProbability_{x_i} = \frac{\left(OldPay_{x_i} \times OldProb_{x_i}\right)}{NewPay_{x_i}} \tag{2}$$

Where

- Compensating $Prob_{x_i}$ is the new probability generated to offset the payout change
- Old $Pay_{x_i}$ is the payout for $outcome_{x_i}$ before the player made the change
- Old $Prob_{x_i}$ is the probability for $outcome_{x_i}$ before the player made the change
- New $Pay_{x_i}$ is the new payout for the outcome selected by the player In another example, an equation can be generated to calculate a payout change to compensate for another payout change, assuming that the compensating payout is pre-determined.

$$Pay_{c_{new}} = \frac{\left[\left(Prob_{c_{old}} \times Pay_{c_{old}}\right) - \left(Prob_{x_{i_{new}}} \times Pay_{x_{i_{new}}}\right) + \left(Prob_{x_{i_{old}}} \times Pay_{x_{i_{old}}}\right)\right]}{Prob_{c_{new}}} \tag{3}$$

Where

- c denotes the compensating element that the machine adjusts
- x denotes the element customized by the player In yet another example, an equation is developed to calculate a wager change to compensate for a payout change as follows:

$$\text{New WagerAmount} = \text{OldWagerAmount} + (Prob_{x_{new}} \times Pay_{x_{new}}) - (Prob_{x_{old}} \times Pay_{x_{old}}) \tag{4}$$

Similar equations may of course be developed for other compensating requirements. In one embodiment, all elements that are not modified by the player are modified to compensate for the player modified elements. Alternatively, the player may customize some elements and may then specify one or more elements that cannot be altered by the gaming device. Then the elements that are not modified by the player and are not specified as unalterable by the player may be modified to compensate for the player modified elements. The above equations are examples only. It is understood that other equations may be developed by those skilled in the art. FIGS. 10-12 illustrate the use of some of the above equations. In all of the above equations, it should be noted that there may be restrictions on the number of elements that may be changed by the player, so that the gaming device has enough remaining elements to accommodate the amount of compensation required. Furthermore, the restrictions placed on the number of elements that may be changed may vary dynamically as the gaming device receives player selections of elements and of new element values. For example, if the gaming device receives player selection of an element value that is highly favorable towards the player, then the gaming device may decrease the number of elements whose values the player is permitted to modify.

One compensating element might be a player's speed of play. To illustrate, equation (1) from above, which shows the house advantage as a function of payout size and probability, is modified to show the house's advantage per hour of play.

$$RateOfPlay \times \left(WagerAmount - \sum_{i=1}^{n} \left(Prob_{x_i} \times Pay_{x_i}\right)\right) = \frac{HouseAdvantage}{Hour} \tag{5}$$

Where

- Rate of Play is the number of handle pulls the player makes per hour
- Wager Amount is the number of coins wagered (assumed to remain constant)

House Advantage/Hour is the amount of money the casino can expect to retain every hour To maintain a constant house advantage per hour, the player's rate of play may be changed to offset any change in wager size, probability of the occurrence of outcomes, or payouts of outcomes. The following equation describes the new required rate of play for a player after modifications have been made to the wager amount, probabilities, and payouts.

$$RateOfPlay_{c_{new}} = RateOfPlay_{c_{old}} \times \frac{\left(WagerAmount_{old} - \sum_{i=1}^{n}\left(Prob_{x_{i_{old}}} \times Pay_{i_{x_{old}}}\right)\right)}{\left(WagerAmount_{new} - \sum_{i=1}^{n}\left(Prob_{x_{i_{new}}} \times Pay_{x_{i_{new}}}\right)\right)} \quad (6)$$

Note however, that an adjustment in a player's rate of play may not provide enough compensation in some embodiments. If, for example, the player has customized various elements so as to give the house a zero advantage on every handle pull, then the denominator in (6) is zero, and even an infinitely fast player would not be able to give the house a non-zero advantage per hour. If the player has customized the various elements so as to give the house a negative advantage on each individual handle pull, then (6) would say that a player's new rate of play has to be negative, something that isn't physically possible. So in order for a player's rate of play to be used as a compensating element, the house must have some positive advantage on each handle pull. If, after player customizations, the house does not enjoy a positive advantage on every handle pull, then the house may first adjust other compensating elements to assure a positive house advantage on every handle pull. Only then may the house adjust the player's rate of play to assure a standard house advantage per hour.

Note that it may seem as if a player's rate of play is not under the control of the house or its proxy, e.g., a gaming device. However, the gaming device may assure that the player does maintain a minimum rate of play by, for example, generating outcomes automatically if the player fails to play in time. For each automatically generated outcome, the gaming device may deduct an appropriate wager amount from the player's credit balance on the gaming device. Additionally, if the outcome generated automatically by the gaming device is a winning outcome, the gaming device may pay the player the appropriate payout. In some embodiments, the casino does allow the player to have an advantage on every handle pull. For example the player might expect to earn two cents on every handle pull. A casino might allow the player to have such an advantage in exchange for work done by the player, or in order to show appreciation for the player's business. In these embodiments, the casino might limit the player's rate of play in order to minimize the casino's loss per hour. The casino might limit the player's rate of play by, for example, allowing the player to make only one handle pull in any given ten-second period.

In many embodiments, the house advantage is not required to remain exactly the same after the player has customized one or more elements, and the casino has adjusted one or more compensating elements. Rather, the house advantage might be required to fall within a certain range. For example, the house advantage might be required to fall within the range of 4.75% to 5.25%. With more possibilities for the house advantage, it is easier for a gaming device to find a combination of adjustments to compensating elements that produces an allowable house advantage. Additionally, it is easier for the gaming device to find adjustments to compensating elements that produce round numbers. For example, rather than adjusting a particular payout to 20.79 in order to produce a house advantage of exactly 5%, a gaming device might adjust the payout to 21 in order to produce a house advantage of 4.95%, which may still be within an allowable range.

The range in which a house advantage must fall may be described by two inequalities, combined below:

$$\text{MinAdvantage} \leqq \text{HouseAdvantage} \leqq \text{MaxAdvantage} \quad (7)$$

Where

MinAdvantage is the minimum allowable house advantage

MaxAdvantage is the maximum allowable house advantage and HouseAdvantage is defined by equation (1) above Equation (7) can be rearranged in various ways to determine the range in which the value of a compensating element should fall. For example, suppose $\text{HouseAdvantage}_{old}$ is known, since it can be determined using equation (1) together with the old values for all the elements. Now, suppose the player adjusts the payout for outcome $x_i$ to $\text{NewPay}_{x_i}$ from $\text{OldPay}_{x_i}$, and the gaming device compensates by adjusting the probability of outcome $x_i$ from $\text{OldProb}_{x_i}$ to $\text{CompProb}_{x_i}$. $\text{HouseAdvantage}_{new}$ will be equal to $\text{HouseAdvantage}_{old} + \text{OldProb}_{x_i} \times \text{OldPay}_{x_i} - \text{CompProb}_{x_i} \times \text{NewPay}_{x_i}$. Plugging the expression for $\text{HouseAdvantage}_{new}$ into equation 7 gives:

$$\text{MinAdvantage} \leqq \text{HouseAdvantage}_{old} + \text{OldProb}_{x_i} \times \text{OldPay}_{x_i} - \text{CompProb}_{x_i} \times \text{NewPay}_{x_i} \leqq \text{MaxAdvantage} \quad (8)$$

Some rearrangement yields:

$$\frac{HouseAdvantage_{old} + OldProb_{x_i} \times OldPay_{x_i} - \text{Min}Advantage}{NewPay_{x_i}} \geq CompProb_{x_i} \quad (9)$$

$$CompProb_{x_i} \geq \frac{HouseAdvantage_{old} + OldProb_{x_i} \times OldPay_{x_i} - \text{Max}Advantage}{NewPay_{x_i}}$$

Of course, $\text{CompProb}_{x_i}$ is subject to other restrictions too: e.g., $\text{CompProb}_{x_i} \geqq 0$. So, subject to the restrictions presented in equation 9, and other restrictions, the gaming device may set $\text{CompProb}_{x_i}$ to any convenient value. Equation 7 may likewise be employed for finding ranges within which the gaming device may adjust the value of other elements.

FIG. 10 shows a table indicated generally at 1010 of payouts having multiple columns comprising an outcome column 1012, a default payout column 1014 and a customized payout column 1016. There are 18 records or rows corresponding to payouts for each of 18 outcomes. Columns 1014 and 1016 indicate the number of coins paid out on a game play where a random number results in the generation of a particular outcome shown in outcome column 1012. More particularly, the payout columns indicate the number of coins paid out on a game play where a random number results in the generation of a particular outcome 1012. This table shows customized payouts where the player adjusted the payout of the top jackpot from 100 to 200 coins in a row 1020 and the machine automatically adjusted the payout for the outcome "cherry-cherry-cherry" from 20 to 15 coins in row 1022, using equation 3 above. The customized and compensating payouts of FIG. 10 correspond to those of the customization process illustrated in FIGS. 4A, 5A, and 6. A payout other than the payout for the outcome "cherry-cherry-cherry" could have been designated as the compensating payout if desired. Such selections are more easily programmed in by the house, but, in an alternate embodiment, could be selected by the player. The important aspect of the compensating payout is that it is determined such that a constant house advantage is maintained (5.5% in this example).

FIGS. 11A and 11B are a payout table 1100 and a probability table 1120 which illustrate another embodiment of the current invention. In this embodiment, the gaming device 100 adjusts the probabilities of hitting the prize-winning outcomes corresponding to the player customized payouts, using equation 2. Payout table 1100 comprises an outcome column 1112, a default payout column 1114 and a customized payout column 1116 as in FIG. 10. Probability table 1120 comprises an outcome column 1122, default random number column 1124 and expected hits per cycle column 1126, and two corresponding customization columns comprising random number column 1128 and expected hits per cycle column 1130. Specifically, FIG. 11A shows the player's payout customization choices (for the outcomes of "7-7-7," "bar-bar-bar," and "plum-plum-plum" corresponding to rows 1117, 1118 and 1119) while FIG. 11B shows the corresponding probability changes made by the gaming device, determined by using formula 2 at rows 1137, 1138 and 1139 respectively. It should be noted that while the tables have been shown as two separate figures, they may actually be part of the same table, or further broken into smaller tables for programming efficiencies.

The above random number columns contain values that indicate a range of random numbers associated with each record, or outcome. For example row or record 1139 corresponding to the payout for the outcome "plum-plum-plum" comprises a default range of 10534 to 10583. Thus, when random number generator 112 generates a random number in the range of 10534 to 10583 for a game play, reel controller 116 controls reels 132, 134, 136 to display the described "plum-plum-plum" outcome. Further, when customized, the range of 10568-10592 causes the same display to appear when a random number is generated in that range. As seen in the expected hits column, the values in the fields corresponding to those columns at that record show that a random number will fall in the customized range about half that of the default range. With a cycle of 10,648 plays, the outcome "plum-plum-plum" is expected to occur in the default range 50 times, and in the customized range of random numbers, 25 times. FIG. 12 is a representation of another embodiment of the present invention. In this embodiment, gaming device 100 compensates for the player customization of the payout element by adjusting the wager amount, using equation 4. As with previously shown payout tables, payout table 1200 has an outcome column 1210, a default payout column 1212 and a customized payout column 1214. Allowing the player to customize the top jackpot by raising it from 100 coins to 10,548 coins at record 1220 raises the required wager amount from 1 coin to 2 coins at record 1230 with no change in the probability of hitting the "7-7-7" outcome.

Personalization

In one or more embodiments, a player may adjust the value of an element in such a way as to personalize the element. For example, the player could customize the top jackpot to be the "paying off" of one of the player's credit card balances. The player would enter in his credit card account number before play begins and if he won the top jackpot the casino would pay the balance due on the credit card account as of the time of the win. In one or more embodiments, there would be a limit as to how large the balance could be (e.g., the casino will pay any balance up to $10,000) and the house advantage for the machine would be determined under the assumption that all of the jackpot wins would be worth the maximum allowable balance (e.g., $10,000).

Work Performed by the Player

Rather than changing an element value, the casino might require that a player perform work for the casino in order to provide the casino with any value (e.g., in the form of work product) that was given up to the player when the player adjusted the values of one or more elements. For example, the casino might lose an average of 3 cents per handle pull because a player increased a given payout. The casino may receive an equivalent value back when the player does work for the casino. Work might include, for example, answering survey questions or sampling games on newly prototyped gaming devices. Since customer feedback about the customer's casino experience is valuable to a casino, the casino would be willing to allow a player to make favorable customizations in exchange for feedback.

In some embodiments, third parties desire work from the player. For instance, a detergent manufacturer might ask for the player's opinion on a variety of detergent box designs. The detergent manufacturer might then pay the casino for administering its surveys, and the casino might then pass on part of the payment to the player by allowing the player to make favorable customizations. For example, for every answer to a survey question that the casino submits to a detergent manufacturer, the detergent manufacturer may pay the casino 3 cents. Therefore, for every survey question answered by a player, the casino may allow the player to make an adjustment to an element value that reduces the house advantage by 2 cents. In this way, the casino has made an average of a 1-cent profit for every survey question answered by a player.

Other work the player might perform may include: playing host to other casino patrons; participating in focus groups; promoting casino games, shows, meals, or other events; recommending any other product or service; making a purchase; sampling products; listening to sales pitches; monitoring the feed from a security camera; making a sales call; providing expert advice (e.g., tax advice or legal advice); receiving a price quote (e.g., on a life insurance policy); transferring a balance (e.g., transferring a credit balance from one credit card to another); and making a payment (e.g., to a company or to a charity).

In some embodiments, the player may initially adjust a customizable element with the expectation that the casino will adjust a corresponding compensating element in order to maintain a fixed house advantage. However, instead of adjusting a compensating element, the gaming device may make an offer to the player. An offer might ask the player to do work such as is described above, e.g., answering survey questions. If the player accepts the offer, and performs the work required, then no compensating element need be adjusted. The player's gaming device may remain customized for some temporary number of handle pulls, after which the player may again have to perform work. Otherwise, the gaming device may adjust a compensating element. In some embodiments, the player need only accept the offer and agree to do the work later. For example, if the player agrees to test drive a new car in the future, then the player may enjoy the benefits of customization without the casino adjusting any compensating elements. To ensure that the player honors his commitment, the casino may reserve the ability to penalize the player if he does not honor his commitment. For instance, when a player commits to receiving a life insurance quote, he may also provide the casino with a credit card number. If the player does not then receive a life insurance quote in the next 30 days, then the casino may charge a $50 penalty to the player's credit card.

In some embodiments, the amount of work a player must perform varies in relationship to the amount by which he adjusts a customizable element. For instance, the player may adjust the payout of the "cherry-cherry-cherry" outcome anywhere from its current value of 20 coins, all the way up to a possible 40 coins. For each game that the player adjustment is to remain in effect, if the player adjusts the payout to 21 coins, then he must answer one survey question. If the player adjusts the payout to 22 coins, then he must answer two survey questions, and so on. In a related embodiment, the player first adjusts a customizable element. The gaming device must then adjust a compensating element in order to maintain the house advantage. However, by performing work, the player may lessen the amount by which the casino adjusts the compensating element. Suppose, for example, that the casino intends to adjust the payout of the "plum-plum-plum" outcome (the compensating element) from 20 down to 5 as a result of an earlier player customization. The player might instead request that the gaming device adjust the payout of the outcome "plum-plum-plum" down to 6 by answering one survey question, down to 7 by answering two survey questions, and so on.

It may happen that a player adjusts a customizable element, and then the gaming device adjusts a corresponding compensating element, after which the player achieves an outcome that was effected by the adjustment in the compensating element. For example, the player increases the payout for a straight-flush in video poker, and the gaming device compensates by reducing the payout for a four-of-a-kind. If the player later achieves four-of-a-kind, he may be disappointed at his reduced payout, and wish he had not adjusted the customizable element in the first place. Therefore, according to one embodiment, when a player achieves an outcome whose effect on the player has been changed due to a customization or compensation, the player may have the opportunity to receive the benefit of the outcome as if the customization or compensation had not taken place. For example, if the payout for four-of-a-kind had recently been reduced from 25 to 10, then upon achieving four-of-a-kind, the player may have the opportunity to receive a payout of 25 rather than 10. In one embodiment, to receive the old payout, the player may be required to perform some work. For example, the player might have to answer survey questions. In another example, the player might have to commit to a certain amount of future gaming. Future gaming may entail playing for at least one hour at gaming devices of one dollar or higher denominations. Still another alternative is for the player to commit to doing business at a designated establishment. For example, the player may commit to buying a dinner for two at the casino's restaurant. Allowing a player to receive the old payout rather than the lower, newly adjusted payout has the strong psychological effect of allowing the player to avoid disappointment. As such, the player may be especially willing to perform work in order to receive the payout of 25 rather than the payout of 10.

Equations for Modifying Various Elements

Certain elements that have been described do not typically enter into casino equations for determining, for example, the expected profitability of a gaming device. A casino may typically account for the payouts of outcomes, the probabilities of outcomes, and the wager amount per handle pull in determining whether a gaming device will be profitable. But a casino may not account for a number of comp points awarded per handle pull, an amount of work to be performed by a player, or an upfront deposit provided by a player, for example. Therefore, if a player is to adjust the payout for a particular outcome, a casino may be uncertain as to how much work to require of a player, for example, in order to maintain an overall level of profitability for the casino.

A first step for a casino in determining how to adjust the value of a general type of element might be to place a monetary worth on a particular unit value of the element. For example, an element describing the number of minutes of work a casino patron would perform in answering survey questions might have a monetary worth of 10 cents per unit value, i.e., 10 cents per minute of answering survey questions. Thus, if the element took on a value of 4 minutes, then the monetary worth of the value of the element would be 10 cents per minute times 4 minutes, or 40 cents. In the preceding example, a positive value of 10 cents was assigned to the unit value of the element because a person's answering survey questions confers positive value to a casino. Perhaps the casino can sell to a marketing firm for 10 cents the survey answers given by a player in one minute. An element describing a number of comp points to be awarded might have a value of minus 1 cent per comp point. The negative monetary worth assigned to each comp point indicates that giving comp points away takes value from a casino. Perhaps the casino will later have to spend money for merchandise to be given to a player for his accumulated comp points. As another example, suppose an upfront deposit is to be received from a player. The deposit is to result in some benefit being conferred upon the player for the next 100 handle pulls. The monetary worth of the upfront deposit may be expressed on a per-handle pull basis. Thus, if the deposit is $5.00, then the monetary worth of the deposit is $5.00/100 per handle pull, or 5 cents per handle pull.

Once a monetary worth is placed on the unit value of an element, the casino may determine the monetary worth of a change in the element's value. For example, if the element's value changes by six units, than the monetary worth of a change in the element's value is six times the monetary worth of the unit value of the element, with appropriate sign (i.e., plus or minus) depending on the direction of the change. Plugging in some actual numbers, if a number of comp points to be awarded per handle pull changes by plus 5, and the monetary worth of a comp point is minus 1 cent, then the monetary worth of the change in the element value that describes the number of comp points awarded per pull is minus 5 cents.

To offset the monetary worth of a change in an element's value, and to thereby maintain a desired level of profitability, the casino need only make an offsetting change in another element's value, of equivalent but opposite monetary worth. That is, to offset a monetary worth of minus 5 cents associated with the change in one element's value, the casino may change another element's value, where the change has a monetary worth of plus five cents. Of course, the offsetting change may be made in multiple elements' values, such that the total monetary worth associated with changing the multiple elements' values is equal to plus five cents. Also, it is possible that a player would change the values of several element, and that the total monetary worth of the changes made by the player may be offset by changes in the values of one or more other elements.

An equation describing how a casino might maintain a desired level of profitability is given below. The equation says that the total monetary worth of all changes in element values must equal zero.

$$\sum_i MonetaryWorth_{x_i} \times (Value_{x_{i_{new}}} - Value_{x_{i_{old}}}) = 0 \tag{10}$$

Where i is an index taken over all elements $x_i$ is the ith element $Value_{x_{i_{new}}}$ is the new value of the ith element $Value_{x_{i_{old}}}$ is the old value of the ith element $MonetaryWorth_{x_i}$ is the monetary worth associated with each unit value of element $x_i$ In a typical scenario, most element values will not be changed. That is, the player will not request a change, and the gaming device will not change an element as a compensating element. For an element that does not change, the expression in parenthesis in equation 10, $Value_{x_{i_{new}}} - Value_{x_{i_{old}}}$, reduces to zero. Suppose, in fact, that the values of only two elements change. These elements will be denoted by an "x" subscript to indicate a customizing element, and a "c" to indicate a compensating element. Equation 10 reduces to:

$$MonetaryWorth_x \times (Value_{x_{new}} - Value_{x_{old}}) + MonetaryWorth_c \times (Value_{c_{new}} - Value_{c_{old}}) = 0 \tag{11}$$

Solving the above expression for $Value_{c_{inew}}$, yields:

$$Value_{c_{new}} = -\frac{MonetaryWorth_x}{MonetaryWorth_c}(Value_{x_{new}} - Value_{x_{old}}) + Value_{c_{old}} \tag{12}$$

As in illustration of the use of the formula 12, suppose a player wishes to increase the number of comp points awarded per handle pull from 1 comp point to 4 comp points. The number of comp points awarded per handle pulls is thus the customizing element. $Value_{x_{Old}}$ is equal to 1 and $Value_{x_{new}}$ is equal to 4. To compensate, the casino will require the player to perform work. The amount of work performed by the player per handle pull is therefore the compensating element. Suppose that the player currently performs no work. Therefore, $Value_{c_{old}}$ is equal to 0. The casino next assigns a monetary worth to each unit of comp points (one comp point), and to each unit of work (here one survey question answered). Each comp point is deemed to be worth minus 1 cent to the casino. Each survey question answered by the player is deemed to be worth 3 cents to the casino. Therefore, $MonetaryWorth_x$ is equal to−1 cent, and $MonetaryWorth_c$ is equal to 3 cents. Plugging the above values for the variables in equation 12 gives $Value_{c_{new}} = -(-1/3*(4-1))+0=1$. Therefore, to maintain the profitability level of the casino, the player should be required to answer one survey question per handle pull.

Formula 12 may conceivably be used with any two elements where a monetary worth can be assigned to unit values of the elements. If more than two elements are involved, as with e.g., two customizable elements and three compensating elements, then equation 10 can be used. It should be noted that equation 10 will often not have a unique solution, as multiple compensating elements would give the casino added flexibility in making adjustments. It should also be noted that equation 10 assumes that $MonetaryWorth_{x_i}$ is a constant. Therefore, equation 10 may not be valid in situations where $MonetaryWorth_{x_i}$ varies as a function of one or more element values. For example, the monetary worth of each unit of payout for an outcome is also dependent on the probability of the outcome occurring. The higher the probability of an outcome occurring, the more, each unit of payout is worth, at least in absolute value. However, even when $MonetaryWorth_{x_i}$ is not a constant, equation 10 may still hold when the element values upon which $MonetaryWorth_{x_i}$ depend do not change. For example, the monetary worth of a unit of payout does remain constant if the corresponding probability does not change.

Tradeoffs Involving Circumstances External to the Gaming Device

In some embodiments, a player may make or accept customizations that increase the house advantage. In return the player may, for example, receive products or services from the casino. For example, the player may agree to reduce the payout for a royal flush. In return, the player is allowed free access to the casino spa. Other possible services include: gym access, free in-room pay-per-view, free phone calls from the player's room or from the player's gaming device, meals, show tickets, rooms, room upgrades, access to restricted playing areas, better drinks, faster hopper fills, etc. Of course, the casino may merely discount products or services as a benefit rather than providing them for free.

In some embodiments, a player customizes a gaming device to reduce the house advantage, or even to give the player an advantage. The player then compensates the casino through an external means. For example, the player might customize a gaming device to replace a blank symbol with another "7", thus making a jackpot outcome of "7-7-7" more probable. In return, $10 is added to the player's hotel bill. Other ways with which a player might compensate the casino include giving up a seat in an overbooked show, giving up a hotel room on an overbooked night, and giving up a meal reservation at an overbooked restaurant.

In some embodiments that have been described, the casino gives up some of the house advantage at a gaming device in exchange for some external compensation, e.g. an increase in the player's hotel bill, or a relinquishment of seat reservations. However, since the player may theoretically make an unlimited number of handle pulls from which to derive a benefit, and since the external compensation may be of a fixed nature (e.g. a one-time addition to a hotel bill), it is possible that the casino will still be put at a disadvantage. For instance, suppose a player customizes a gaming device so that the player now has an advantage of one cent per handle pull. In return, $30 is added to the player's hotel bill. Now, the player need only make 3000 handle pulls in order to recover the $30 charged to his hotel bill. Any handle pulls beyond 3000 begin to earn money for the player.

Values of Elements Reverting to Default Values

In some embodiments, the casino may limit the duration of any customization that provides the player with an advantage at a gaming device. For example, a customization may only be good for a limited number of handle pulls. Alternatively, a customization might only be good for a certain amount of coin-in. Another alternative is that a customization may only be good for a certain number of handle pulls in which the customization is relevant. For example an increased payout for the outcome "cherry-cherry-cherry" is valid only for the first 5 handle pulls in which the outcome "cherry-cherry-cherry" occurs. Still another possibility is that a customization is only good until the player wins or loses a certain amount of money.

A change to a customized element may remain in tact for a set duration, or the customized element may gradually revert to its default value. For instance, a player may customize a video poker game to pay 10 coins for a three-of-a-kind outcome, where the default payout is only 3 coins. The player compensates by agreeing to make 30 minutes in phone calls from his room. Now, the payout for three-of-a-kind might remain at 10 coins for the next 70 handle pulls, and then go immediately back to 3 coins. Alternatively, the payout for three-of-a-kind might remain at 10 coins for 20 handle pulls, then go to 9 coins. The payout might then remain at 9 coins for another 20 handle pulls, and may then go to 8 coins. In this way, the payout for three-of-a-kind gradually decreases from 10 coins down to 3 coins over the course of 140 handle pulls. In a similar fashion, the probability of a certain outcome occurring may remain at a customized level for a period of time and then drop suddenly to its default value, or it may gradually revert to its default value. In fact, there are many other paths that the value of a customized element may take in going from its customized value to its default value. For instance, the payout for three-of-a-kind might be customized to start at 10. The payout for three-of-a-kind may then rise all the way up to 20 coins, before dropping steeply back to 3 coins. Another path would take the payout from 10 coins, down to zero coins, and then back up to 3 coins.

In this last example, it is possible that the house maintains a constant house advantage per hour without adjusting any other elements besides the payout for three-of-a-kind. This is because, although the payout of 10 coins decreased the house advantage, the house advantage increased when the payout was decreased to zero coins. Therefore, according to some embodiments, the house compensates for a current player advantage with an offsetting house advantage in the future. In another example, the player customizes a gaming device so that the jackpot is 10 times more likely to occur during the next handle pull than it is normally. However, to receive this benefit, the player must agree to make nine subsequent handle pulls in which he is not eligible to win the jackpot at all. The casino may ensure that the player does follow through on his agreement to make nine subsequent handle pulls by reserving the right to penalize the player if he does not. For example, the casino may ask for the player's credit card number. If the player does not make the nine handle pulls required of him within a set period of time, then the casino may charge $5 to the player's credit card. Instead of applying a penalty, the casino could also require that the player pre-pay for the nine handle pulls.

The order in which the player is benefited and disadvantaged may also be reversed. The player might first make nine handle pulls in which he is ineligible for the jackpot. Then, on the $10^{th}$ handle pull, the jackpot is made 10 times more likely to occur than it would be at its default probability of occurrence. An embodiment where the player is disadvantaged to begin with has the further advantage that the casino need not require the player to commit to future handle pulls in which the player will be at a disadvantage.

In some embodiments, a customization may come closer to a default value without completely reverting to the default value. For example, a player adjusts a customizable element to the point where a gaming device, with an original house advantage of 5 cents per coin wagered, no longer provides the house with any advantage, and in fact provides the player with a 5-cent per handle pull advantage. The value of the customizable element may continue to provide the player with an advantage for 20 handle pulls. Then the value may be adjusted to provide the player only a 4-cent advantage per handle pull. The value may continue adjusting every so often until once again the house enjoys an advantage. However, when the house advantage becomes 2 cents per handle pull, the value of the customizable element becomes fixed. Therefore, as long as the player continues to gamble, he does so at only a 2-cent disadvantage rather than at the usual 5-cent disadvantage. The casino benefits from the player's continued gambling because the casino does still have an advantage on every handle pull. However, the player also benefits, since the house advantage is not as large as the 5-cent norm.

Throughout the preceding and the subsequent discussion, it should be noted that the values of compensating elements may also begin at one level, and end up at another level, such as the default level. The values of compensating elements may revert suddenly or gradually, or they may take irregular paths, just as has been described with the values of customizable elements.

In some embodiments, the player might customize a gaming device so that any changes remain in effect for a specified number of handle pulls. However, the player may leave the gaming device prior to completing the specified number of handle pulls. In this case, the gaming device may immediately revert to its default state, or it may remain as customized while the next person completes the unfinished specified number of handle pulls. The gaming device may infer the departure of a player, for example, by noting that the player's tracking card has been withdrawn from the player tracking card reader of the gaming device. In some embodiments, the player who performed the customizations may have them stored with the central server. Then, when the player resumes play, potentially at a different gaming device, the central server may cause the player's gaming device to assume the stored customizations. The player may then complete his remaining specified number of handle pulls.

If a player does leave a gaming device that has been customized, it may be desirable for the gaming device to display one or more indicators as to its altered state. In this way, a new player who sits down at a customized gaming device will not be surprised, for example, when certain payouts are not as he expected. An indicator may take the form of a colored light emitting diode (LED), or other light source attached to the gaming device. When the LED is red, approaching players are forewarned that the gaming device has been customized. However, when the LED is green or off, the gaming device is in its default state. Other indicators might include a full payout table displayed on the display screen of the gaming device, or on the lower panel of the gaming device as shown at 229. Then, if any payouts had been customized, a new player would know by looking at the payout table. Similarly, tables of the probabilities of various outcomes occurring might be displayed on the display screen of the gaming device. Many other indicators are possible. Even if a player does not leave a gaming device, an indicator may still indicate whether or not the gaming device has been customized. The player will thus have a reminder of the fact that he has made customizations.

Types of Prizes

One customizable element is the type of prize that is used as a payout. A payout may be made in casino tokens, in United States currency, in the currency of another country, or in a writing that entitles the player to an amount of currency or tokens. Such writings may simply take the form of a slip of paper that the player has the right to redeem for cash or tokens at a casino desk. Such writings may further limit the player to receiving cash or tokens only if redeemed for cash or tokens at some time in the future. A payout might also take the form of tickets, including tickets to shows, tickets to movies, tickets to plays, tickets to concerts, airline tickets, tickets to sporting events, and so on. A payout may also take the form of merchandise, such as automobiles, apparel, appliances, consumer electronics, gourmet foot, etc. A payout may further take the form of discounts, rebates, or gift certificates good towards certain purchases at specified merchants. There are many other possible prizes that can be used as payouts.

It is possible that when a player customizes the type of prize that is used as a payout, the gaming device will make no compensating adjustment to a different element. This is because the monetary worth of a prize chosen by a player may equal the monetary worth of the default payout for the gaming device. Therefore, the house advantage has not been altered by the player's choice of a prize different from the default prize. In this context, "monetary worth" may refer to one or more of the following: a product's retail price, a product's manufacturing cost, a product's replacement cost, the expected sale price of a product through another channel, etc. As it pertains to a token payout, "monetary worth" may refer to the cash equivalent, e.g., the amount of cash for which the tokens may be redeemed at a casino desk.

The Gaming Device Provides Customization Offers

In one or more embodiments, the gaming device could prompt the player with customization offers upon certain event triggers. For example, after a series of losing spins, the gaming device might suggest that the player increase the probability of a winning outcome in exchange for lowering one or more payouts. In another example, after the player has received several outcomes of "bar-bar-bar", the gaming device might suggest that the player increase the payout for the outcome "bar-bar-bar" in exchange for which the player will increase his rate of play.

Player's Preferred Customization Choices Stored on the Central Server

In a further embodiment, the player's preferences for customizing the gaming device could be stored on the central server and retrieved by means of the player identifier when the player inserts a player-tracking card into a machine. The touch screen presented in the preferred embodiment could alternately be a computer screen accompanied by a keypad that allows the player to select and enter data.

A Compensating Element is Modified Before a Customizable Element

In one embodiment, a player first indicates his intention to customize a gaming device. Then, the gaming device adjusts the value of a compensating element. The player is then allowed to customize one or more customizable elements. The player may be allowed to adjust the values of the customizable elements only up to the point of offsetting the prior adjustment to the compensating element made by the gaming device.

Factors by which the Gaming Device Determines Categories of Elements, and Individual Elements, for Presentation to the Player As can described herein, a variety of different categories of elements, and individual elements, may be presented to a player. In one or more embodiments, it may be cumbersome to present to a player every category of elements or every individual element from which a player would select e.g., elements whose values are to be adjusted. All the choices might not fit on a screen of a gaming device, particularly if explanations were provided alongside every choice as to, e.g., the meaning of a particular category of elements. Therefore it may be desirable for a gaming device to select what categories of elements from among all possible categories, or what individual elements from among all individual elements, are to be presented to a player as options for customization or compensation (or for designation by the player as an element that may be changed, as an element that cannot be changed, as an element that must be changed, etc.).

Reference is now made to FIG. 13. FIG. 13 illustrates an exemplary "Main Compensating Menu", where the player is asked to select compensating element categories. As with the menu illustrated in FIGS. 3A and 3B, the menu illustrated in FIG. 13 allows the player to choose a category of payout elements, a category of probability elements, or a wager amount element. However, in the menu of FIG. 13, the player's choice will ultimately lead to the choice of one or more compensating elements. The final choice of one or more compensating elements may be made either by the player, the gaming device, or the casino server. Likewise, the final choice of values for the one or more compensating elements may be made by either the player, the gaming device, or the casino server. Note that of all the categories of elements, and of all the elements discussed herein, there are only three choices depicted in FIGS. 3A, 3B, and 13. Therefore, FIGS. 3A, 3B, and 13 illustrate a possible need for determining an order in which to present categories of elements, and individual elements. Once an order is determined, it may also be determined which categories or elements are to be presented, and which are not to be presented at all. For example, categories of elements falling early in the order may be presented, whereas categories of elements falling late in the order may not be presented.

Reference is now made to FIG. 14. FIG. 14 illustrates an exemplary "Compensating Element Menu", where the player is asked to select compensating elements. For example, the player might select the outcome "bar-bar-bar" by touching the screen area labeled "bar-bar-bar" under outcome heading 1402. The player may thereby select the payout of the outcome "bar-bar-bar" as a compensating element. Once the player has selected one or more compensating elements, the gaming device might select values for a subset of the one or more compensating elements. Additionally, or alternatively, the player might select values for a subset of the one or more compensating elements. Note that the menu depicted in 14 may appear on the screen of a gaming device after the player has selected the "Payout" option 312 illustrated in FIG. 13. Note also that FIG. 14 also illustrates a limited number of elements. Therefore, once again is illustrated a possible need for ordering elements so as to determine, in part which are to be presented to a player for the player selection of compensating elements.

Figure 15:
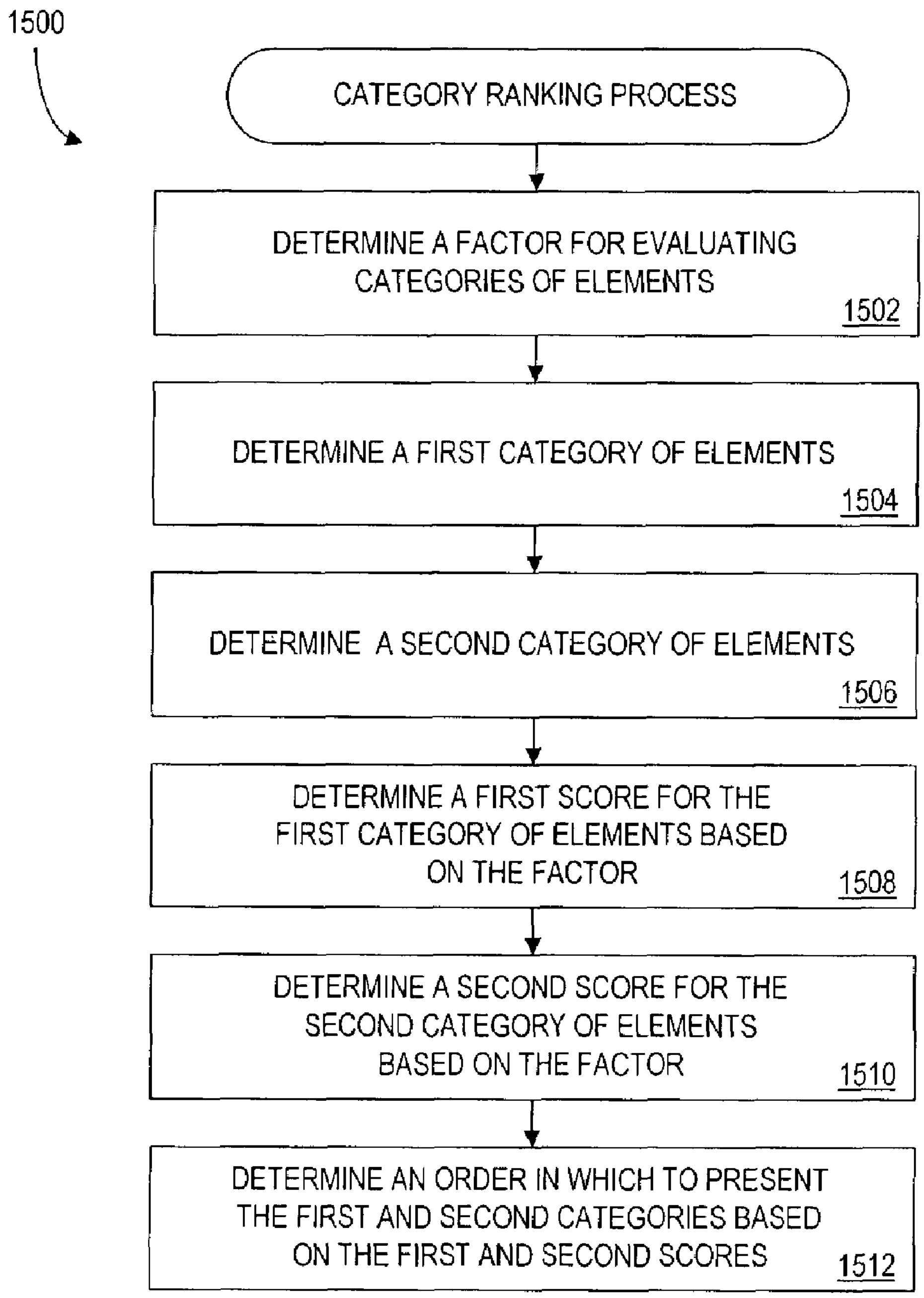
FIG. 15 is an exemplary illustration of a flowchart representation of a process for determining an order for the presentment of categories of elements.

The flowchart of FIG. 15 illustrates one method for choosing an order in which categories are to be presented. The same method works as well when determining an order in which individual elements are to be presented, or an order in which a combination of categories and individual elements are to be presented. It should be noted that determining an order in which categories of elements are to be presented may include determining categories of elements that will be presented and categories of elements that will not. For example, if there are four categories of elements under consideration, and only three are to be presented, then placing the four categories of elements into an order implies that the last will not be presented.

At step 1502, a factor is determined for evaluating a category of elements. Of course, the factor may be used for evaluating individual elements as well.

One factor in determining which categories of elements, or which elements to present may be how familiar players are in general with a particular category of elements. For example, players may be quite used to thinking about payouts associated with certain outcomes, but may be unaccustomed to thinking about the probabilities associated with each outcome occurring. Many gaming devices, for instance, give an indication of payouts for each outcome, but give no indication of the probability of occurrence of such outcomes. If detailed information is known about a particular player, then the individual player's familiarity with a particular category of elements may also be considered.

Another factor is a consideration of what regulatory obstacles stand in the way of altering the values of certain elements. For example, gaming regulators often require that a gaming device maintain a pre-established payback percentage. Since altering the payout of an outcome, or the probability of an outcome's occurrence has the potential to alter a gaming device's payback percentage, gaming regulators often restrict such changes, at least without further verification by the regulators that the payback percentage has not been altered. In contrast, a casino is often free to provide comp points to players as it sees fit. Therefore, a casino may alter, for example, the number of comp points provided per handle pull at a gaming device without the necessity of passing regulatory hurdles.

Another factor is a consideration of the psychological impact an alteration of an element within a category of elements, or alteration of an individual element, might have upon a player. For example, suppose a gaming device could reduce the payouts for particular elements, or could reduce the probabilities of the occurrence of particular elements, so as to achieve a desired payback percentage for the gaming device. Since the player may be more familiar with the payouts, the player may react more negatively to the reduction in payouts than to the reduction in probabilities. Thus, for example, a gaming device might choose to present to a player probability elements as a possible category of elements to be used as compensating elements, before presenting the player with payout elements as a possible category of elements to be used as compensating elements. As another example, suppose two categories of elements are payouts for outcomes paying more than 20 coins, and payouts for outcomes paying less than 20 coins. Now, if payouts for outcomes paying more than 20 coins are reduced, such reductions may be large. For example, an outcome paying more than 20 coins may be reduced from 50 to 25 coins. The large reductions may occur because outcomes paying more than 20 coins may occur with relatively low frequency and may thus require large reductions in payout in order to have a significant effect on the payback percentage of a gaming device. However, if payouts for outcomes paying less than 20 coins are reduced, then such reductions may be relatively small, e.g., from 3 coins to 2 coins. Therefore, the psychological impact upon a player of the reduction of the payouts for low-paying outcomes may be less than the psychological impact of the reduction of payouts for high-paying outcomes.

Another factor is a consideration of whether the alteration of a value of an element would destroy a metaphor or a myth by which the gaming device is trying to abide. For example, a video-reel gaming device may try to maintain the metaphor of a mechanical-reeled gaming device. With a mechanical-reeled gaming device, the number of symbols on a reel do not change (at least not easily), the order of symbols on a reel do not change, the types of symbols on a reel do not change, and so on. Of course, with a video-reel gaming device, simple alterations in the game program may make possible changes, such as the number of symbols on a reel, that would be difficult or impossible to achieve with physical-reel gaming devices. However, such changes might destroy the metaphor of a video-reel gaming device being the same as a physical-reel gaming device. The destruction of the metaphor might make players less likely to play video-reel gaming devices. Therefore a video-reel gaming device might give a player opportunities to customize payouts, for instance, before giving the player opportunities to customize the number of symbols on reel. Another factor is a consideration of how easy it is for a player to understand any changes that would be made to the value of an individual element, or to the value of an element within a category of elements. For instance, it may be more difficult for a player to understand elements that cover a limited time period than it is for players to understand elements that apply indefinitely. For example, a player might have more difficulty understanding that a jackpot is to be doubled only for the next 10 minutes, than understanding that a jackpot is to be doubled for as long as his session continues. A player might also have difficulty understanding elements that are not typically part of a gaming experience. For example, an element requiring the player to do a certain amount of work, e.g., in answering survey questions, is something that a player may have difficulty understanding since a player typically doesn't have to do work as part of gaming session.

Another factor is a consideration of how much complexity would be involved in changing the value of an element. For example, it may be relatively straightforward to change the payout of an outcome from one value to another. However it may be significantly more complicated changing the number of symbols on a reel. Suppose, for example, that a symbol is added to a reel. The addition of a symbol makes no difference, however, if the symbol has no probability of occurring. So now a positive probability must be assigned to the symbol occurring. To achieve the proper probability, perhaps the random number generating program of the gaming device must now be altered. Furthermore, if the new symbol is given some positive probability of occurring, then one or more other symbols on the reel must have less of a probability of occurring. So it must be determined which other symbols are to have their probabilities of occurrence lowered. Also to be determined are the amounts by which the probabilities of other symbols occurring must be lowered. Other considerations would include which outcomes the new symbol would make possible, what the payouts of such outcomes would be, and whether the newly possible outcomes would change the house advantage of the gaming device. Furthermore, the reduction in probabilities of the other symbols' occurrence might also effect the frequency of certain other outcomes' occurrence, and would likewise effect the house advantage of the gaming device. It can be seen, therefore, that altering the number of symbols on a reel might turn into a fairly complicated affair, and that a player might therefore be presented with options of altering payouts or probabilities before being given options of modifying numbers of symbols on a reel.

Another factor is a consideration of the amount by which the casino might benefit due to the changes in the values of certain elements, or of certain elements with categories of elements. For example, suppose one element is the type of prize to be awarded as a jackpot. The prize might be cash, jewelry, or a vacation package. Each prize might be of equal retail value. However, the casino may be able to make a profit on certain prizes due to lower costs of manufacture, special bulk rates obtainable by the casino, and so on. A casino might benefit more, for example, by giving away a $5000 diamond necklace than by giving away $5000 in cash, since the casino might be able to acquire the necklace for only $2500. Therefore, the casino might present a category of elements comprising elements whose values correspond to the type of prize to be awarded upon the occurrence of a given outcome, before presenting e.g., a category of payout elements.

Another factor is a consideration of whether the elements within a category of elements allow a player to make a satisfactory number of changes. For example, a player may wish to make changes to the values of multiple elements, or at least to have the opportunity to change multiple elements. Therefore, a category of elements containing only three elements may be insufficient to meet the player's desires. The player might have to visit screens for several different categories of elements in order to make his desired number of modifications, may forget the modifications he has already made within other screens, and may become disheartened.

Another factor is a consideration of whether the elements within a category of elements give the player too many opportunities to make changes. If a player has too many elements to consider, the player may become hesitant or confused. Furthermore, if the player does make a number of changes to element values, then the gaming device may have to make a number of corresponding changes to compensating element values. In any event, if the gaming device later asks for the player's approval in order to implement the selected changes, the player may later become confused or overwhelmed by the record of all the changes he has made. For example, if the player has made changes to the payouts of 30 different outcomes, and the gaming device has made compensating changes to the probabilities of the 30 different outcomes, then the player might be required to review a list of all 60 proposed changes before they are implemented and before the player is allowed to play. The large number of changes may be too overwhelming for the player, who perhaps did not realize how many changes he had made.

Another factor is a consideration of whether a plurality or all of the elements within a category may be conveniently modified at once. One purpose of the existence of a category of elements may be to allow the player to modify more than one element at once in a convenient and/or transparent manner. For example, suppose a player wishes to double the probabilities of the occurrence of all outcomes paying more than 20 coins. One option would be for the player to select individual probability elements corresponding to each outcome paying more than 20 coins, and to then double the probabilities manually. However, there may also be global options the player may select that apply to all elements within a category of elements. For example, the player may select a global option of doubling all probabilities of occurrence for the outcomes paying more than 20 coins. The player may, for example, select a "double all" button. The player might also select first from a set of possible customizations (e.g., double, triple, increase by 5%), and then select all the elements to which the customization will apply (e.g., by pressing an "apply to all" button on the touch screen of the gaming device). The process of customizing or generally applying a function or constraint to multiple elements can therefore be simplified. As an exemplary use of a constraint for all elements within a category of elements, a player may choose to limit reduction of all possible payouts in a bonus round to a reduction of 10% of their respective initial values. Thus, a first payout of 100 coins in a bonus round could go no lower than 90 coins, a second payout of 20 coins in a bonus round could go no lower than 18 coins, and so on.

As will be appreciated, many other factors may be used for evaluating categories of elements.

At step 1504, a first category of elements is determined. The category of elements may be any category, such as payout elements, probability elements, elements whose values describe the number of symbols on a reel, and so on. Then at step 1506, a second category of elements is determined. The second category of elements may also be any category of elements, although preferably a category different from the first category of elements.

At step 1508, a first score is determined for the first category of elements based on the factor. The factor may be any of the factors described herein, including player familiarity, regulatory difficulties, maintaining a metaphor, complexity of changes, etc. The score may be indicative of the degree to which any change to an element within a given category of elements would be favorable or unfavorable in light of the factor under consideration. For example, if a change in an element within a category of elements would involve numerous regulatory hurdles to be overcome, then the category of elements might be given an unfavorable score with respect to the factor considering regulatory hurdles. Scores may take the form of numbers. For example, a score may be an integer between 1 and 10, inclusively, with lower numbers being unfavorable scores, and higher numbers being favorable scores.

At step 1510, a second score is determined for the second category of elements based on the factor. Then at step 1512 is determined an order in which to present the first and second categories based on the first and second scores. For example, the category of elements that had the higher score (e.g., the more favorable score), may be placed in front of the category of elements that had the lower score in any ordered list involving the first and second categories of elements.

Although the flow chart of FIG. 15 has referred to a first category and a second category of elements, it may be appreciated that the process could be extended to any number of categories of elements, or to any number of individual elements, or to both. For example, three different categories of elements may be scored based on a given factor, and may be ordered accordingly.

Additionally, although the flow chart of FIG. 15 describes only one factor, it will be appreciated that categories of elements, or single elements, may be scored based on multiple factors. For example, a category of payout elements might score favorably on familiarity and favorably on complexity, but might score unfavorably on regulatory difficulties, and unfavorably on psychological impact. A category of element may receive a separate numerical score in light of each separate factor. For example a category of probability elements may receive a 1 for a factor pertaining to regulatory difficulties, but a 10 on a factor pertaining to complexity. Also, certain factors might be weighted more heavily than others. Thus, for example, player familiarity might be scored on a scale of 1 to 20, versus complexity being scored on a scale of 1 to 5. If scores are later added together to make an overall decision about whether a category of elements will be presented to a player, the familiarity factor would count more heavily in the final decision than would the complexity factor.

Scores might also take on qualitative values such as "fair", "favorable", "bad", etc. After scores are assigned to a number of factors related to a single category of elements, or to an individual element, the scores may be combined using a combination algorithm. One combination algorithm, mentioned already, is to add the scores up. Another combination algorithm would multiply the scores for certain factors by a constant before adding the scores up. The multiplication process would therefore act to weight certain factors more heavily than others. Another combination algorithm would combine scores in a rules-based fashion. For instance, an overall score might be considered favorable if scores for at least three factors are favorable. As will be appreciated, many other combination algorithms are possible. After several different categories of elements, or individual elements, receive overall scores, than the scores may be compared to determine which categories of elements, or which single elements, will be presented to a player, or to determine the order of presentation. For example, suppose the category of payout elements receives a score of 68, the category of probability elements receives a score of 63, the wager amount element receives a score of 58, and the comps awarded per handle pull element receives a score of 50. Then the gaming device might decide to present to the player the category of payout elements, probability elements, and wager amount as three possibilities for customization, based on the three having the highest scores. Furthermore, the category of payout elements may be presented first because it has the highest score, the category of probability elements second because it has the second highest score, etc.

There are other possible criteria for deciding which categories of elements, or which single elements, to present to a player for the purposes of customization, compensation, designation of elements whose values may not be altered, designation of elements whose values must be altered, and so on. For instance, if a player has previously shown no interest in altering the values of elements from within a certain category of elements, then the category of elements may no longer be presented to a player in the future. The fact that the player has shown no interest in the category of elements in the past may be stored, for example, in a player database (not shown). Also, even if a first player has never faced a choice of adjusting elements within a particular category of elements, but other players have shown no interest in the category of elements, then it may be inferred that the first player will also have no interest in adjusting elements within the category of elements, and the category of elements may not be presented to the player.

In one or more embodiments, certain categories of elements, or certain individual elements, may be presented to a player on a random basis. This might give a player some opportunity to see categories of elements, or individual elements, that might not otherwise be presented to the player because of a low associated score. If it turns out that the player is interested in the category of elements, then the player's interest may be noted and the player may be given the opportunity to have elements within the category of elements modified in the future.

In one or more embodiments, there may be a ranking system used to determine which elements within a category of elements are to be presented to a player, and in what order. For example, the screen of FIG. 4A shows various payout elements that are being presented to a player for customization. The payout elements in FIG. 4A may be arranged according to their current payouts. In other words, the outcome "7-7-7" may be presented first because it has the highest payout, the outcome "bar-bar-bar" may be presented second because it has the second highest payout, and so on. Therefore, in one or more embodiments, elements may be presented in an order corresponding to the numerical order of the element values. Also, in one or more embodiments, elements may be presented in an order corresponding to the numerical order of related element values. For example, the payout elements for a given set of outcomes might be presented in an order based on the probabilities of the outcomes' occurrence. Thus, the payout for the most frequently occurring element would be presented first, the payout for the next most frequently occurring element would be presented second, and so on. Elements within a category of elements may also be presented according to any of the criteria mentioned in relation to the presentation of categories of elements. For example, elements that would have the highest positive psychological impact if changed might be presented first. Or elements that are most familiar to players might be presented first.

In one or more embodiments, the factors described herein for selecting elements and categories of elements to present to a player may also be used in selecting elements to serve as compensating elements. For example, once a player has customized one or more elements, the gaming device may choose one or more elements from a set of possible elements to use as compensating elements. The set of possible elements may first be ordered using such factors as complexity, the presence of regulatory hurdles, the desire to keep some information secret, and so on. Once the set of possible elements are placed in order based on the factors, the gaming device may choose the first element to serve as a compensating element. If necessary, the gaming device may also choose the second element, third element, and on down the list. Of course, the gaming device may first order categories of elements according to the factors described herein. The gaming device may then choose the first category of elements, and the select one or more elements from within the category to serve as compensating elements.

Both Player and Gaming Device Participate in the Modification of the Value of an Element In one or more embodiments, after customizing one or more elements, the player may select a category of elements. The player may then allow the gaming device discretion in modifying the values of one or more of the elements within the category of elements. In this way, a player who does not particularly care which of multiple possible elements will be used as compensating elements, need not choose a specific element to serve as a compensating element. However, the player still has the opportunity to provide some direction to the gaming device by choosing the category of elements. For example, suppose a player has just increased the payout for an outcome. The player does not care so much about the probabilities of outcomes occurring, so the player chooses a category of "probability" elements to serve as the category from which one or more compensating elements will be chosen. The gaming device may then choose a specific outcome whose probability of occurrence may be modified. For instance, the gaming device may choose to reduce the probability of the outcome "bell-bell-bell" occurring. If it were up to the player to choose a specific element to serve as the compensating element, then the player would conceivably have to choose from among hundreds or thousands of elements, and such a choice might frustrate or overwhelm the player.

In one or more embodiments, a gaming device may choose a category of elements from which a compensating element will be chosen. The player may then choose a compensating element from within the category. In this way, both the gaming device and the player may have some control over the modifications to be made in order to compensate for player customizations. In one or more embodiments, the gaming device chooses a category of elements from which a compensating element will be chosen, and then chooses the compensating element. The player may, however, restrict the gaming device to choosing only one category of elements (i.e., the gaming device must choose all compensating elements from only one of a set of predefined categories). In this way, a player may ensure, for example, that only one type of modification can be made in association with his favorite outcome. For example, the player may ensure that the gaming device cannot reduce both the probability and the payout for his favorite outcome, "plum-plum-plum." The player may also restrict the gaming device to choosing compensating elements from only two of a set of predefined categories, or only three, etc.

In one or more embodiments, the player may wish to designate all elements within a category as elements whose values may not be altered. Rather than individually designating each element within the category of elements as an element whose value may not be altered, the player may designate all elements within the category at once as elements whose values may not be altered. For example, the player may select a "lock" option from a first pull down menu on the screen of a gaming device, and may then select an "apply to all elements in category" option from a second pull down menu. In one or more embodiments, a player may designate all elements within a category of elements as elements whose values may be altered or as elements whose values must be altered.

Gaming Device Does Not Inform a Player of the Absolute Value of an Element

In one or more embodiments, a player may modify the value of a customizable element, and then the player's gaming device may modify a compensating element. The gaming device may then inform the player of the modification made to the compensating element, and may ask whether the player is willing to continue play with the new values for the customizable and compensating elements. One consideration in informing the player about modifications made to element values is that the gaming device may not wish to disclose actual values for the elements. For example, a player often has no way of knowing the payback percentage of a gaming device, and the operator of the gaming device may not wish to inform the player of the payback percentage. If gaming devices did routinely disclose their payback percentages, then those with lower payback percentages might find themselves without customers. Also, certain element values might constitute trade secrets of a gaming device manufacturer. For example, a gaming device manufacturer may not wish to reveal the frequency with which certain symbols arise, because that might allow other manufacturers to copy their games. Another element value that may typically be hidden from a player is the amount of each player's wager contributed to a progressive jackpot.

Therefore, in one or more embodiments, a gaming device might not disclose actual element values to a player, even for elements that the player chooses to customize. Instead, the gaming device may disclose changes in element values. Such changes may be expressed in terms of percentages or in terms of the absolute value of a change. For example, a change in the probability of the outcome "cherry-cherry-cherry" may be expressed as a +5% if the outcome "cherry-cherry-cherry" has now been made 5% more likely to occur. Such a change may correspond to an initial probability of 100/100,000 and a new probability of 105/100,000. The same change may also correspond to an initial probability of 100/10,000 and a new probability of 105/10,000. The player has no easy way of knowing the true probability. A change expressed as an absolute value may read "+0.00005," or "plus 5 parts in 100,000." Referring again to FIG. 4B, it may be imagined that, in the current payout column, each number begins at 0, and represents a percentage change from a default payout. By pressing increase button 432 corresponding to the outcome "7-7-7," the player may increase the number in the current payout column e.g., from 0 to 5, indicating that the payout for the outcome "7-7-7" has increased by 5% from its default value. By pressing decrease button 434, the player may cause the number in the current payout column to go from 0 to −5, indicating that the payout for the outcome "7-7-7" has decreased by 5% from its default value. In this way, a screen such as that of FIG. 4B may allow a player to customize the value of an element without becoming aware of its absolute value.

Offsetting Changes Spread Out Over a Large Number of Elements

In one or more embodiments, the gaming device may use a large number of compensating elements to offset a customization made by a player. As such, the values of the compensating elements may each change by only a slight amount. One advantage of changing a large number of compensating element values by only a slight amount is that there will likely be no large change, unfavorable to a player, in a single element which might have an adverse psychological impact upon the player. Additionally, if the gaming device changes a large number of element values to offset a player customization, the gaming device may simply list some or all of the changed elements without listing their values. The gaming device might only say for example, "the following element values have been altered slightly," without showing the element values or the amounts of any alterations. In this way, the gaming device need not reveal actual element values that it desires to keep hidden.

One method for changing a large number of element values to compensate for a player change is as follows. The gaming device may have stored for one or more elements a predetermined threshold beyond which the element's value may not be set. The threshold may be stored, for example, in a memory of the gaming device, or in a memory of a central server with which the gaming device is in communication. For example, the payout for the outcome "bar-bar-bar" may typically be 50 coins, and may have a threshold value of 55. Therefore, in adjusting the payout for the outcome "bar-bar-bar," the gaming device may not set the payout to more than 55 coins. Note also that a threshold may denote a lower limit. For instance, the payout for the outcome "bar-bar-bar" may have a lower threshold of 45 coins, indicating that the payout for the outcome "bar-bar-bar" may not be adjusted below 45 coins. In one or more embodiments, there may not be separate thresholds specified for each element, but instead there may be a global threshold applicable to all elements. For example, all element values may not be adjusted either upwards or downwards by more than 10% of their default values.

Having predetermined thresholds for one or more elements, the gaming device may now determine a compensating element. The compensating element may be determined in a number of ways, using e.g., ranking criteria described above. The gaming device may then plug the value of the compensating element together with the old and new values for any elements the player has customized into an equation such as equation 13 below.

$$OldWagerAmount-\sum_{i=1}^{n}\left(OldProb_{x_i}\times OldPay_{x_i}\right)-\left(NewWagerAmount-\sum_{i=1}^{n}\left(NewProb_{x_i}\times NewPay_{x_i}\right)\right)=0 \tag{13}$$

It will be noted that equation 13 is just a modified version of equation 1, where the house advantage before any element value alterations has been set equal to the house advantage after any alterations. Thus, the expression on the top line of equation 13 (the old house advantage) minus the expression on the bottom line of equation 13 (the new house advantage)

is equal to zero. Using equation 13, the gaming device may be able to solve for a new value for the compensating element. However, especially if a player has made large changes to the values of customizing elements, the newly determined value for the compensating element may exceed an allowed threshold. For example, equation 13 may indicate that the compensating element of the wager amount per handle pull should be adjusted from its default value of $1.00 to $1.75. However, the wager amount per handle pull may have a threshold of $1.25, beyond which it may not be adjusted. Therefore, the gaming device might set the value of the wager amount to the threshold value that is nearest the value which would have compensated for player customizations. In this case, the value that would have compensated for player customizations is $1.75, and so the wager amount per handle pull will be set to the nearest threshold value of $1.25. Note that the wager amount per handle pull would not be set to $0.75, a lower threshold, since that would be going in the wrong direction.

Since the gaming device has not yet fully compensated for the player customizations, the gaming device may select another element. Perhaps the gaming device selects a probability for the outcome "bar-bar-bar." Next, the gaming device may plug in the old and new values for the customized elements, and the old and new value for the compensating element (the wager amount), and the current value for the probability of the outcome "bar-bar-bar" into equation 13. The gaming device may then be able to solve equation 13 for a new value for the probability of the outcome "bar-bar-bar." If the new value for the outcome "bar-bar-bar" falls below (or above) an allowed threshold, then the probability of the outcome "bar-bar-bar" is set to its new value, and the gaming device has succeeded in offsetting the effects of player customization. However, if the new value of the probability of the outcome "bar-bar-bar" would exceed (or go below) an allowed threshold, then once again the value for the probability of the outcome "bar-bar-bar" might be set to the closest threshold to its desired new value. Then, another compensating element would be determined and the procedure would repeat. Eventually, after adjusting enough values for compensating elements, the player customization would be offset. Furthermore, no values for compensating elements would have been adjusted above or below allowed thresholds. In this way compensating changes to player customizations may be spread over a large number of elements without individual changes being large. In some cases, it may happen that a player customization is so large that no amount of adjustment of the values of compensating elements, if the values are maintained within allowed ranges, will offset the effects of a player customization. In such cases, the player may not be allowed to make the customizations, or the thresholds may be relaxed.

As an example, suppose the old payout for the outcome "bar-bar-bar" is 50 coins, the old probability for the outcome "bar-bar-bar" is 20/10,000, the old payout for the outcome "cherry-cherry-cherry" is 20 coins, the old probability for the outcome "cherry-cherry-cherry" is 20/10,000, the old payout for the outcome "orange-orange-orange" is 20 coins, and the old probability for the outcome "orange-orange-orange" is 40/10,000. Now suppose the player customizes the payout for the outcome "bar-bar-bar" to be 55 coins. The gaming device first selects the payout for the outcome "cherry-cherry-cherry" as a compensating element. Using equation 13, without changing the values of any further elements, the gaming device may determine that the payout for the outcome "cherry-cherry-cherry" can be modified from its old value of 20 to a new value of 15 and can thereby offset the customization made by the player. However, suppose further that there is a threshold value below which the payout of the outcome "cherry-cherry-cherry" may not be changed, and that this threshold value is 17. Therefore, the payout for the outcome "cherry-cherry-cherry" may be set at 17. Next, since the gaming device has not completely offset the customizations made by the player, the gaming device selects the payout for the outcome "orange-orange-orange" as another compensating element. Plugging into equation 13 the old and new values for the payouts of the outcomes "bar-bar-bar" and "cherry-cherry-cherry," as well as the old value for the payout of the outcome "orange-orange-orange," the gaming device may determine that a new payout of 19 for the outcome "orange-orange-orange" will suffice to restore the house advantage to its old value. Therefore, the gaming device has compensated for an increase in the payout of the outcome "bar-bar-bar" from 50 to 55 by reducing the payout of the outcome "cherry-cherry-cherry" from 20 to 17, and the payout of the outcome "orange-orange-orange" from 20 to 19.

Note that the above method has dealt with constraints on element values that were imposed by the gaming device. In other words, the gaming device has adjusted the values of elements in such a way as not to cross over any thresholds. The above method may work just as well when constraints are player-imposed, e.g., as with constrained elements. Also, the above method does not require that element values that would otherwise cross a threshold be set to exactly the value of the threshold. For example, the payout of the outcome "cherry-cherry-cherry" above need not have been set to exactly 17, even though the threshold was at 17. The payout for the outcome "cherry-cherry-cherry" might instead have been set to 18, which is still within the threshold. The result of using a value of 18 would be that further adjustments would have to be made to the values of other elements.

Other Objectives of the Gaming Device

As described herein, in one or more embodiments, the gaming device allows the player to indicate a modification to the value of one or more customizable elements. The gaming device may then, in turn, modify the values of one or more compensating elements. In one or more embodiments, an objective of the gaming device is to modify the values of the one or more compensating elements in such a way as to maintain the house advantage constant, or within a desired range.

In one or more embodiments, the gaming device may have other objectives besides maintaining the house advantage within a desired range. In one embodiment, the gaming device may have the objective of maintaining a payback percentage of the gaming device within a desired range. Therefore, for example, if a player adjustment causes the expected payout of the gaming device to increase by 50%, then the gaming device may increase the wager required to play by 50%. By maintaining the wager amount and the expected payout in the same proportion, the gaming device may typically maintain a constant payback percentage.

In one or more embodiments described herein, the gaming device may have the objective of maintaining hourly profits within a desired range. Therefore, for example, if a player adjustment causes the house advantage of the gaming device to decrease by 10%, then the gaming device may increase the required rate of play by 100/(100−10), or approximately 11%. In this way, the product of the house advantage and the rate of play is maintained relatively constant, and therefore the hourly profits for the gaming device are maintained relatively constant.

In one or more embodiments described herein, the gaming device may have the objective of maintaining overall profits for the operator of the gaming device (e.g., a casino), within a desired range. Therefore, for example, if a player adjustment causes the house advantage of the gaming device to decrease, then the gaming device may require a commitment from the player to stay at the casino's hotel, to eat at the casino's restaurant, to do work for the casino, etc. The gaming device may also require the player to bring friends to play at the casino. In this way, although the gaming device itself may become less profitable, the casino will likely make money from the player in other ways.

In one or more embodiments, an objective of a gaming device may be to adjust a house advantage based on perceived demand for the gaming device. For example, when the casino in which a gaming device resides is crowded, the gaming device may have the objective of increasing the house advantage. With excess demand, there are likely to be one or more players willing to play a gaming device even when the gaming device has a relatively high house advantage. On the other hand, when the casino is only lightly populated, the gaming device may have the objective of decreasing the house advantage. With a lower house advantage, the gaming device may thereby be more likely to attract one of the few patrons of the casino. In accordance with these objectives, a gaming device may use the opportunity of a player adjustment to the value of an element in order to make a compensating adjustment to the values of one or more other elements in such a way as to result in a house advantage in line with the current objectives of the gaming device. For example, the gaming device may only have the opportunity to change its house advantage when a player first indicates an adjustment to the value of a customizing element. When the player has indicated such an adjustment, the gaming device may then make one or more compensating adjustments and, in the process, change the house advantage. In one or more embodiments, the gaming device may change its objective for a value of the house advantage based on the time of day. If business at the casino follows a predictable daily pattern, then the gaming device may thereby change its objective for a value of the house advantage based on the number of customers in the casino.

Note that the gaming device may not be directly aware of the number of people in a casino. Rather, the gaming device may receive signals from a casino server indicating the number of people currently in the casino. Signals received from the casino server may also directly indicate an objective for the gaming device. In fact, a gaming device may not necessarily change its house advantage only due to changing demand. A gaming device may also change its house advantage so as to more effectively compete with other casinos, so as to participate in promotions, so as to fall in line with new regulations, and so on.

In one or more embodiments, a gaming device may have an objective of maintaining a perception of some symbols being more valuable than others. For example, a mermaid-themed gaming device may have the objective of keeping the outcome "mermaid-mermaid-mermaid" as the highest paying outcome. Therefore, if a player adjusts the payout for the outcome "starfish-starfish-starfish" to be higher than the payout of the outcome "mermaid-mermaid-mermaid", then the gaming device may itself adjust the payout of the outcome "mermaid-mermaid-mermaid" to be once again higher than the payout of "starfish-starfish-starfish".

Video Poker Embodiments

Reference is now made to a game of video poker. Exemplary elements describe the number of cards in a deck, the rank or suit of a particular card, or the status of a card (e.g., not wild, wild, multi-valued). Possible player modifications to element values may include adding more cards to a deck, changing the rank or suit of a card in a deck, or designating a wild card in a deck. For example, a player may choose to add two more Jacks of spades to make a total of three Jacks of spades in a deck, change a two of clubs into an ace of diamonds, and make all threes wild cards.

In multi-play video poker games, a customizable element may be the number of hands that are present in a game. For example, a game might involve 50 hands of video poker. The hands are played simultaneously, and the player is paid for each hand according to whether or not the hand constitutes a winning poker hand. A player might now choose to play 52 hands instead of 50, with his wager remaining unchanged. A compensating element might then be the payout a player receives on any four-of-a-kind outcome. The payout for four-of-a-kind may be reduced or eliminated to maintain a constant house advantage.

Another customizable element in video poker may be the number of opportunities the player has to draw cards. In a typical game of video poker, a player might be dealt an initial five-card hand. The player can then draw anywhere from zero to five of the cards to achieve his final hand, the hand that determines his payout. The player may customize the machine so that he can draw cards a second, a third, or a fourth time. The number of cards the player can draw may also be customizable. For example, the player might be allowed to draw only as many as three cards per hand. This works to the disadvantage of the player, but may be offset by the modification of a value of a compensating element. (Note that the values of compensating elements may be adjusted in favor of the player.) Still another customizable element may be the position of the cards that the player can draw. For instance, the player might be allowed only to discard a card in the first, second, or third positions, but not a card in the fourth or fifth positions in a hand. Yet another customizable element is which card combinations the player may discard. For instance, the player may be allowed to only discard the first card in combination with the second card. The player may not be allowed to discard only the first card or only the second card. Another customizable element is the type of cards that a player may discard. For example, a player may only be allowed to discard cards with ranks from 2 through jack, or only cards that are diamonds.

Another customizable element in video poker is the threshold hand that qualifies to be classified as a certain outcome. For example, in Jacks or Better™ Video Poker, the threshold hand that qualifies as a paying hand is a hand with two jacks in it (and no other distinguishing characteristics). Two tens would not qualify for payment, whereas two queens would. A player might customize the game such that now two tens would be classified as a paying hand. A player might also customize a game such that king, queen, jack, ten, nine of a suit would count as a royal flush in addition to the existing ace, king, queen, jack, ten hand.

Another customizable element is the number of outcome classifications. For example, Jacks or Better™ Video Poker has the following outcome classifications, each corresponding to a respective payout: pair (jacks or better), two-pair, three-of-a-kind, straight, flush, full-house, four-of-a-kind, straight-flush, royal-straight-flush, for a total of nine classifications. A player might increase this number of classifications to ten. A further customization by the player might include the definition of an additional classification. For example the player may define a classification of four-of-a-kind (kings or better). The classification would include any hand containing either four kings or four aces. The player might further customize the payout for the new classification, e.g. 35 tokens versus 25 tokens for a simple four-of-a-kind.

A customizable element in any game requiring decisions on the player's part may be the amount of help the player receives from the gaming device. For example, in many versions of video poker, the player receives an initial hand and must then decide which cards to discard and replace. There is often one particular combination of cards that can be discarded in order to maximize a player's expected payout. So, after the gaming device has generated a primary hand for the player, the processor of the gaming device might execute a routine to determine the combination of cards that the player should discard in order to maximize his expected payout. The gaming device might then display a hint by highlighting the cards that the player should discard.

The player might customize the gaming device to provide any of a whole range of help possibilities. The gaming device might provide hints on every hand, on every other hand, on every third hand, or less frequently. The gaming device might provide hints at random, with hints occurring an average of once for every two hands. The player may be allowed a fixed number of hints, or a fixed number of hints per 100 hands, to be requested at the player's discretion. The gaming device might provide suggestions that maximize a player's expected value, or it might provide less optimal suggestions, though still suggestions that are beneficial to the player. The gaming device might provide hints that maximize things other than expected payout, such as the expectation of achieving a particular outcome, the expectation of achieving a non-zero payout, the expectation of achieving a payout in excess of a certain threshold, and so on.

Another game in which the gaming device might provide suggestions to the player is video blackjack. In video blackjack, the gaming device might suggest such things as whether to hit, to stand, to double down, to surrender, or to split. The bonus rounds of some gaming device games also require the player to make decisions. For instance, the player might have to choose one of three doors to open in order to reveal a prize. The gaming device might provide hints as to which door is the best to open. Other games, if played using a gaming device, or via the Internet, would also be suitable for hints. In pai gow poker and in pai gow, a gaming device could provide hints to the player on how to split his hand. In Casino War™, a gaming device could provide hints as to whether the player should surrender or go to war.

In one embodiment, the gaming device does not necessarily provide hints, but does provide a period of training for a player in order to improve the player's skill at a game. One customizable element is therefore the amount of training a player will receive.

In one embodiment, the player may be allowed to customize the number of cards that constitute a complete poker hand. Typically, there are five cards in a poker hand. A straight, for example, consists of five consecutively ranked cards, not four, and not six. However, there are variants of poker that involve hands of other than five cards. Guts poker, for instance, may be played with two or three-card hands. Pai gow poker involves one hand of two cards, and one hand of five cards. Therefore, a player might be allowed to customize a video poker machine to deal only four-card hands of poker, or only six-card hands of poker. In a four-card poker hand, it is evidently easier to achieve a straight or a flush, or a straight-flush. However, it is more difficult to achieve a pair, two pair, three-of-a-kind, a full-house, or four-of-a-kind. Therefore, to compensate for the adjustment to four-card poker, the gaming device might adjust the payouts for various outcomes so that the house advantage remains relatively constant. Other compensating elements might also be adjusted, such as the number of opportunities a player has to draw cards.

In one embodiment, the player may be allowed to alter the probability of getting a top payout after being dealt his initial five cards. For example, a player dealt four cards to a royal flush typically holds these four cards and draws one. Only one card in the 47 remaining cards will give the player the royal flush. In order to improve his probability of obtaining the royal flush, the player might be shown a representation of all of the remaining 47 cards and allowed to select one or more cards which will not be dealt. The player could thus eliminate the four of clubs, eight of diamonds, and six of spades, improving his chances of hitting the royal flush to one in 44. This change in probability is compensated by a decrease in the payout for the royal flush. Alternatively, the player could add cards to the 47 in exchange for a higher payout. Other video poker game elements may also be modified based on the player modification to the deck of cards.

Other Games

Many other games have the potential to allow for player customizations. In bingo, one element may be the number of rows on a bingo card. Another element might be the number of columns on a bingo card. Adjusting the value of an element describing the number of columns so as to subtract a column, for instance, would make it much easier to achieve a cover-all bingo, where a player covers every space on the bingo card. Another element might describe the number of "automatic" spaces, such as the automatic space typically found in the center of the card. Another element might describe the number of numbers that correspond to an individual space on a bingo card. For example, if the element value is adjusted to three, then the occurrence of any of three numbers would allow the player to place a chip in the individual space. Additional types of bingos may be added, such as a bingo consisting of three vertical chips crossing three horizontal chips (for a total of five chips, as the center chip is part of both the vertical and horizontal chips).

In keno, the value of an element describing the range of possible numbers to be drawn may be adjusted e.g., from 1-80 to 1-50. The player is thereby more likely to match numbers he has chosen. The value of an element describing the quantity of numbers that are drawn may be adjusted, e.g., from 20 to 30. The value of an element describing the payouts for matching certain numbers of picks may be adjusted. For instance, the payout for choosing three numbers and matching two of them might begin at 2.5 tokens. The player might adjust this to 4 tokens. To compensate, the casino might reduce the payout for matching all three of the numbers from 25 to 10 tokens. The value of an element describing a number of possible picks from may be adjusted e.g., from 15 to 25. Many other adjustments are possible in the game of keno.

In pachinko, the value of an element describing the size of winning pockets may be adjusted, the value of an element describing the number of balls received upon getting a ball into a winning pocket may be adjusted, the value of an element describing the number of extra balls received after aligning three symbols in an activated gaming device man be adjusted, or the value of an element describing the size of balls that are launched may be adjusted. Additionally, the arrangement of nails, or the arrangement of winning pockets may be adjusted. The player might be allowed to customize his machine so that a ball might be re-launched with exactly the same velocity with which it had previously been launched, e.g. on a winning launch.

Team Embodiments

In one or more embodiments, two or more players may be associated with one another as part of a team. For instance, a husband and wife may travel frequently together to the casino. The husband and wife may form a team and thereby derive both social and monetary benefits. For example, if the husband and wife achieve net winnings of $500 for a particular day playing $1 gaming devices, then the team may receive a $100 bonus from the casino. In addition, the husband and wife may interact frequently and experience team pride as they pursue their mutual goal. The casino benefits from team play because team play encourages multiple people to gamble together, thereby increasing casino business.

Figure 16:
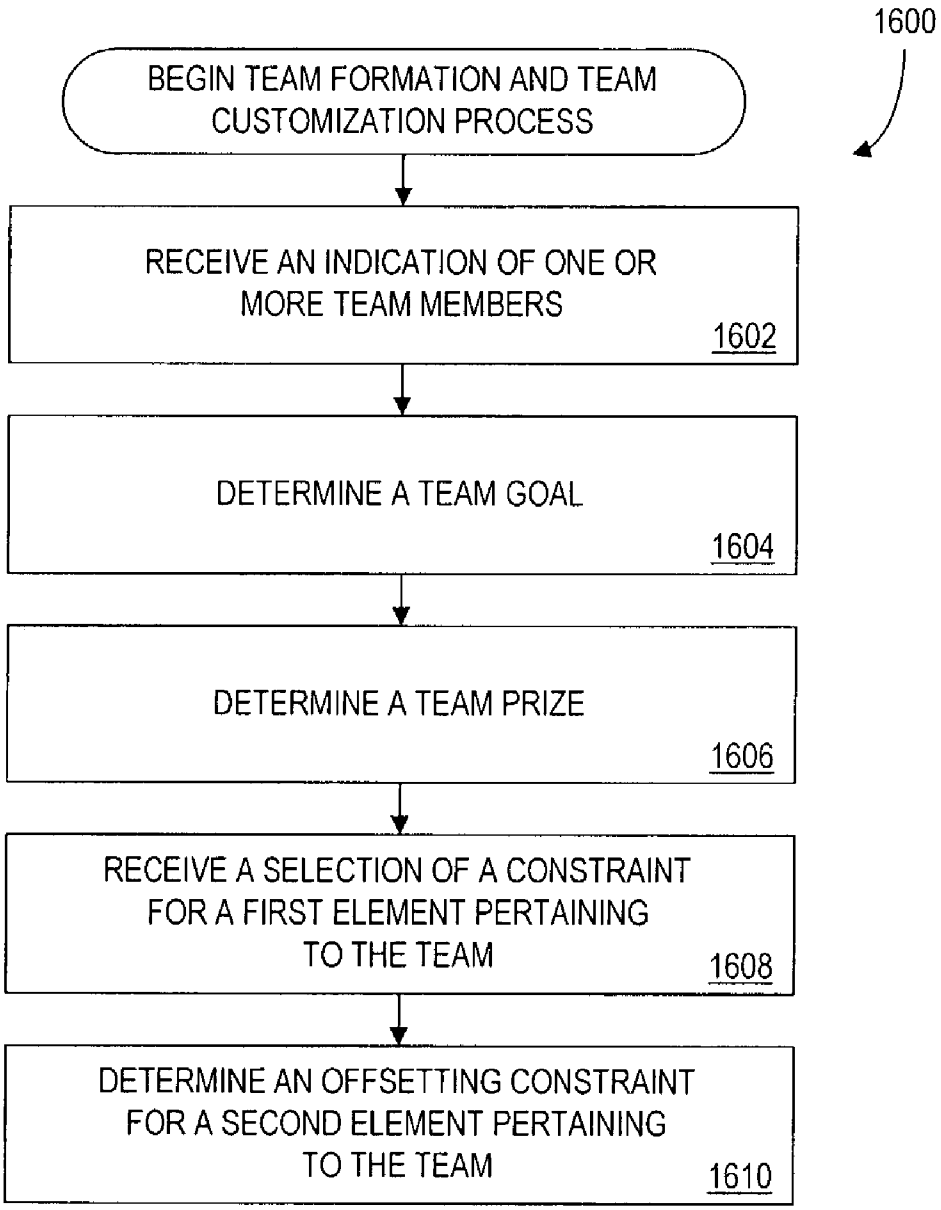
FIG. 16 is an exemplary illustration of a flowchart representation of a process for team formation and customization.

With teams in place, numerous possibilities exist for customizations relating to teams. Reference is now made to FIG. 16, which depicts a team formation and customization process 1600. The process 1600 may be performed by one or more gaming devices, or may be performed by a central server that may be in communication with one or more gaming devices. At step 1602, the central server receives an indication of one or more team members. For instance, one or more gaming devices may receive an indication from one or more players that the players wish to join a team. The gaming devices may then transmit the player names to the central server. The central server may then associate each of the players together in a database, and the players may thereby constitute a team. At step 1604, the central server determines a team goal. The team goal may be indicated by the one or more members or may be determined by the central server based on predetermined criteria (e.g., based on team size, team demographics, etc.). Exemplary team goals may be for the cumulative amount of team members' wagers to reach $3000 for a day, for the cumulative amount of time played by team members to reach 40 hours over a one-week period, or for three or more team members to achieve the outcome "bar-bar-bar" within a one-minute time frame.

At step 1606, the central server determines a team prize. Once again, the team prize may be chosen by one or more of the team members, or may be chosen by the central server. Exemplary team prizes include a free meal for each team member, a $50 cash prize for each team member, or a $500 donation made to a charity of the team's choice. In one or more embodiments, the team prize is provided to the team if and only if the team satisfies the team goal.

At step 1608, the central server receives a selection of a constraint for a first element pertaining to the team. Elements pertaining to a team may include all elements described herein that pertain to an individual. For example, one element might describe the payout for the outcome "cherry-cherry-cherry" at a first team member's gaming device. Another element might describe the probability of the outcome "lemon-lemon-lemon" at a second team member's gaming device. In addition, there may be many additional elements that pertain to teams. Examples of elements pertaining to teams include:

i. An element describing the number of team members.

ii. An element describing the amount of the team prize. For example, if the team prize is a cash prize, then a possible element describes the number of dollars awarded. If the team prize is free night stays in a casino hotel, then a possible element describes the number of free night stays to be awarded.

iii. An element describing the cumulative number of hours that team members must spend gaming.

iv. An element describing the minimum number of team members that must be playing at any one time in order for the team to be progressing towards their goal. For example, a team goal might require that the team as a whole spend 5 hours gambling, meaning that a certain minimum number of team members must all be gambling simultaneously for a period of five hours.

v. An element describing the minimum number of team members who must achieve a winning outcome within a particular time frame in order for the team to meet a team goal.

vi. An element describing the number of symbols that team members may swap with each other within an hour. For example, if a team member achieves an outcome of "bar-bar-bell", he may be allowed to swap his "bell" symbol for a "bar" symbol received by another team member. The present element may limit the number of such swaps a team may make per hour to three, for example.

It should be noted from the preceding examples of elements that some elements may relate to the team goal determined at step 1604, or to the team prize determined at step 1606.

At step 1610, the central server determines an offsetting constraint for a second element pertaining to the team. The second element may be any element described herein, e.g., a payout element, probability element, element describing the number of team members, etc. One benefit of a team embodiment is that a first element may pertain to a first team member, and a second element may pertain to a second team member. In one example, the first element described at step 1608 is the probability of the outcome "bell-bell-bell" for a first player. The second element described at 1610 is the probability of the outcome "orange-orange-orange" for a second player. Thus, the first player may receive an increased probability of achieving the outcome "bell-bell-bell," while the second player receives a decreased probability of achieving the outcome "orange-orange-orange."

In another example, one player on a team might customize the payout of the outcome "cherry-cherry-cherry" to be 30 coins rather than the default of 20 coins. The compensating element might be the number of his fellow team members who must be playing at the same time. To then compensate, for example, the player may be required to get three of his fellow team members to gamble for as long as his payout corresponding to the outcome of "cherry-cherry-cherry" remains at 30. The casino thereby compensates for a lower house advantage on the player's machine with increased business from the player's team members. In some embodiments, the more teammates of a player who are currently gaming, the more the player may adjust a customizable element. For instance, a player may adjust the payout of the outcome "cherry-cherry-cherry" up to 30 if he has 3 teammates playing, up to 35 if he has 4 teammates playing, up to 40 if he has five teammates playing, and so on.

In some embodiments, team members may reduce payouts or probabilities for their outcomes, thereby increasing the house advantage on one or more of their respective machines. To compensate them, the casino may provide the team with a team benefit. For example, the team may receive a block of free show tickets, a free team dinner, chartered transportation to or from the casino, and so on.

In some embodiments, when a first player adjusts a customizing element on his gaming device, the casino may adjust a compensating element on another player's gaming device (e.g. on the device of another team member). After the adjustments, the total house advantage between the two players' machines may remain constant, even though the house advantage on one machine might increase, and the advantage on the other may decrease. Tradeoffs may also occur among multiple player machines rather than just two. For example, a first person has his payout for the outcome "cherry-cherry-cherry" lowered, a second person has his jackpot raised, and a third has his probability of achieving four-of-a-kind raised. One benefit of this embodiment is that team members may each contribute to maximize the luck of a fellow team member who has been on a losing streak. To illustrate, suppose Joe, Sam, and Henry constitute a team of slot players. Sam has been on a losing streak, and so Joe and Henry wish to boost Sam's luck. Therefore, Joe and Henry each agree to have the probability of outcomes of the form "any-any-cherry" occurring on their machines reduced to zero. As compensation, the probability of outcomes of the form "any-any-cherry" occurring on Sam's machine is tripled. In this way, the house advantage among the three machines of the team remains constant, provided each team member is on a like machine, each team member makes handle pulls at the same rate, and each team member wagers the same amount. The casino can ensure, in various ways, that these factors hold true (i.e. that all team members do play at the same rate, etc.). For instance, team members must make their handle pulls in synchrony. In any event, when Sam's luck does finally start to improve, the team members' machines may be brought back to their default configurations.

It is to be understood that the above embodiment descriptions are intended to be illustrative, and not restrictive. Many other embodiments will be apparent to those of skill in the art upon reviewing the above description.

What is claimed is:

1. A method performed by a device operable to facilitate a wagering game, comprising:

receiving at a device operable to facilitate a wavering game a request from a player to modify a value of a first element corresponding to the wagering game from a first value to a second value;

modifying, by the device and in response to the request from the player, the value of the first element from the first value to the second value;

determining by the device a second element corresponding to the wagering game, wherein the second element corresponds to a third value;

determining by the device a fourth value for the second element based on at least one of the first value of the first element, the second value of the first element, and the third value of the second element; and causing the wagering game to be modified such that the second value for the first element and the fourth value for the second element are utilized in play of the wagering game.

2. A method performed by a device operable to facilitate a wagering game, comprising:

receiving at a device operable to facilitate a wagering game a request from a player to modify a value of a first element of the wagering game from a first value to a second value;

modifying, by the device and in response to the request from the player, the value of the first element from the first value to the second value;

determining by the device a second element of the wagering game, wherein the second element corresponds to a third value;

determining by the device a fourth value for the second element based on at least one of the first value of the first element, the second value of the first element, and the third value of the second element, wherein the first element is the probability of occurrence of the outcome "bar-bar-bar" on the gaming device;

wherein the second element is the minimum amount that must be wagered for a single round of the wagering game;

wherein the first value of the first element is 0.001;

wherein the second value of the first element is 0.002;

wherein the third value of the second element is $0.50; and wherein the fourth value of the of the second element is $0.55; and causing the wagering game to be modified such that the second value for the first element and the fourth value for the second element are utilized in play of the wagering game.

3. A method performed by a device operable to facilitate a wagering game, comprising:

determining by a device operable to facilitate a wagering game a first category of elements of the wagering game, wherein the first category of elements is the set of all elements, each of which describes the probability of occurrence of an outcome of the wagering game;

determining by the device a second category of elements of the wagering game, wherein the second category of elements is the set of all elements, each of which describes the payout of an outcome of the wagering game;

determining by the device an order in which to present the first category and the second category, thereby determining an order of customizable categories;

causing a presentation of the first and second categories according to the order of customizable categories to be presented to a player;

receiving at the device a selection of one of the first category of elements or the second category of elements, thereby receiving a selection of a customizable category, wherein the customizable category is the first category;

determining by the device a first element in the customizable category, wherein the first element is the probability of occurrence of the outcome "orange-orange-orange" in the wagering game;

determining by the device a second element in the customizable category, wherein the second element is the probability of occurrence of the outcome "cherry-cherry-bar" in the wagering game;

determining by the device an order in which to present the first element and the second element, thereby determining an order of customizable elements;

causing a presentation of the first and second elements according to the order of customizable elements to be presented to the player;

receiving at the device a selection of one of the first element or the second element, thereby receiving a selection of a customizable element, wherein the customizable element is the probability of occurrence of the outcome "cherry-cherry-bar" in the wagering game;

determining at the device a first value for the customizable element, wherein the first value is 0.005;

receiving at the device an indication of a second value for the customizable element, wherein the second value is 0.009;

receiving at the device a selection of a third element, thereby receiving a selection of a compensating element, wherein the compensating element is the number of comp points to be provided to the player for a single round of the wagering game;

determining at the device a third value for the compensating element, wherein the third value is 3;

determining at the device a fourth value for the compensating element based on at least one of the first value of the customizable element, the second value of the customizable element, and the third value of the compensating element, wherein the fourth value is 1; and causing the wagering game to be modified such that the fourth value for the compensating element is utilized in play of the wagering game.

4. The method of claim 3, further comprising:

determining a third category of elements of a gaming device;

determining a fourth category of elements of a gaming device;

determining an order in which to present the third category and the fourth category, thereby determining an order of compensating categories;

presenting to the player the third and fourth categories according to the order of compensating categories;

receiving a selection of one of the third category of elements or the fourth category of elements, thereby receiving a selection of a compensating category;

determining a fourth element in the compensating category;

determining a fifth element in the compensating category;

determining an order in which to present the fourth element and the fifth element, thereby determining an order of compensating elements;

presenting to the player the fourth and fifth elements according to the order of compensating elements; and wherein the step of receiving an indication of a third element comprises:

receiving a selection of one of the fourth element or the fifth element, thereby receiving a selection of a compensating element.

5. A method performed by a device operable to facilitate a wagering game, comprising:

receiving at a device operable to facilitate a wagering game a request from a player to modify a value of a payout from a first value to a second value, wherein the payout corresponds to an outcome of a gaming device;

modifying, by the device and in response to the request from the player, the payout from the first value to the second value;

determining by the device a rate of play that is to be required of the player in order for the player to be eligible to receive a payout of the second value;

generating by the device the outcome on the gaming device;

determining by the device whether the player has played in accordance with the rate of play required of the player; and causing, after determining that the player has played in accordance with the rate of play required of the player, a payout of the second value to be provided.

6. The method of claim 5, wherein the rate of play is 600 games per minute.

7. The method of claim 5, wherein the first value is different from the second value.

8. The method of claim 5, wherein the rate of play is a first rate of play, further comprising the step of:

determining a second rate of play for the player at the gaming device; and wherein the step of determining a first rate of play comprises:

determining a first rate of play based on at least one of the second value and the second rate of play.

9. The method of claim 8, wherein the step of determining a first rate of play comprises:

determining a first rate of play such that a profit the gaming device would be expected to make per hour when played at the second rate of play with the first value corresponding to the payout of the outcome is substantially equivalent to a profit the gaming device would be expected to make per hour when played at the first rate of play with the second value corresponding to the payout of the outcome.

10. The method of claim 5, further comprising:

determining a profit the gaming device would be expected to make per hour; and wherein the step of determining a rate of play comprises:

determining a rate of play based on at least one of the profit the gaming device would be expected to make per hour and the second value.

11. The method of claim 10, wherein the step of determining a rate of play comprises:

determining a rate of play such that the profit the gaming device would be expected to make per hour when played at the rate of play with the second value corresponding to the payout of the outcome substantially equals or exceeds a predetermined level of profit.

12. A method performed by a device operable to facilitate a wagering game, comprising:

receiving at a device operable to facilitate a wagering game a request from a player to modify a value of a payout from a first value to a second value, wherein the payout corresponds to an outcome of the wagering game;

modifying, by the device and in response to the request from the player, the payout from the first value to the second value;

receiving at the device a commitment from the player to perform an activity in exchange for which the player will be eligible to receive a payout of the second value upon the occurrence of the outcome;

causing the outcome to be generated; and causing a payout of the second value to be provided.

13. The method of 12, wherein the step of modifying comprises:

modifying, in response to a request from a player, the payout from a first value to a second value for a limited number of handle pulls.

14. The method of claim 12, wherein the step of receiving comprises:

receiving a commitment from the player to do at least one of:

(i) answer survey questions;

(ii) monitor the feed from a security camera;

(iii) participate in a focus group;

(iv) make a sales call;

(v) provide expert advice;

(vi) make a purchase;

(vii) sample a product or service;

(viii) receive a price quote on a product or service;
(ix) transfer a balance to a financial account;
(x) recommend a product or service to another; and
(xi) make a payment.

15. The method of claim 12, further comprising the step of: receiving an indication that the player has performed the activity.

16. A method performed by a device operable to facilitate a wagering game, comprising:

receiving at a device operable to facilitate a wagering game a request from a player to modify a value of a payout from a first value to a second value, wherein the payout corresponds to an outcome of the wagering game;

modifying, by the device and in response to the request from the player, the payout from the first value to the second value;

receiving at the device a payment from the player in exchange for which the player will be eligible to receive a payout of the second value upon the occurrence of the outcome;

causing the outcome to be generated; and causing a payout of the second value to be provided.

17. The method of 16, wherein the step of modifying comprises:

modifying, in response to a request from a player, a payout from a first value to a second value for a limited number of handle pulls.

18. The method of 16, wherein the step of receiving comprises:

receiving from the player a payment that is not a wager.

19. A method performed by a device operable to facilitate a wagering game, comprising:

receiving at a device operable to facilitate a wagering game, a request from a player to modify a value of a payout from a first value to a second value, wherein the payout corresponds to an outcome of the wagering game;

modifying, by the device and in response to the request from the player, the payout from the first value to the second value;

receiving at the device an agreement from the player to have a portion of future payouts withheld in accordance with predetermined rules in exchange for which the player will be eligible to receive a payout of the second value upon the occurrence of the outcome;

causing the outcome to be generated; and causing a payout of the second value to be provided.

20. A method performed by a device operable to facilitate a wagering game, comprising:

receiving at a device operable to facilitate a wagering game a request from a player to modify a value of a payout from a first value to a second value, wherein the payout corresponds to an outcome of the wagering game;

modifying, by the device and in response to the request from the player, the payout from the first value to the second value;

determining a first number of comp points provided per pull of the wagering game;

determining by the device a second number of comp points to be provided per pull based on at least one of the first number of comp points and the second value;

setting the second number of comp points as the number of comp points to be provided per pull in order for the player to be eligible to receive a payout of the second value upon the occurrence of the outcome; and causing the second number of comp points to be provided to the player upon the occurrence of the outcome.

21. A performed by a device operable to facilitate a wagering game method, comprising:

receiving at a device operable to facilitate a wagering game and from a player an indication of a first element of the wagering game;

receiving at the device and from the player an indication that the value of the first element must not be changed;

determining by the device a second element of the wagering game, wherein the second element is not the first element;

determining by the device a value for the second element; and causing the value determined for the second element to be used in play of the wagering game.

22. A method performed by a device operable to facilitate a wagering game, comprising:

receiving at a device operable to facilitate a wagering game a request from a player to modify the value of a first element of the wagering game from a first value to a second value;

modifying, by the device and in response to the request from the player, the value of the first element from the first value to the second value;

determining by the device and at least two categories of elements of the gaming device, wherein the at least two categories each have a respective ranking relative to the others;

selecting by the device a category of elements from the at least two categories of elements based on the respective rankings;

selecting by the device a second element from the selected category;

determining by the device a third value for the second element;

determining by the device a fourth value for the second element based on at least one of the first value of the first element, the second value of the first element, and the third value of the second element; and causing the wagering game to be modified such that the second value for the first element and the fourth value for the second element are utilized in play of the wagering game.

23. The method of claim 22, wherein the selected category of elements is a first category of elements;

further comprising the steps of:

determining whether the fourth value satisfies a predetermined criterion; and if the fourth value does not satisfy the predetermined criterion, selecting a second category of elements from the at least two categories of elements, wherein the second category of elements has a lower ranking than the first category of elements; and selecting a third element from the second category of elements.

24. A method performed by a device operable to facilitate a wagering game, comprising:

receiving at a device operable to facilitate a wagering a request from a player to modify the value of a first element of the wagering game from a first value to a second value;

modifying, by the device and in response to the request from the player, the value of the first element from the first value to the second value;

determining by the device two categories of elements;
selecting by the device one of the two categories of elements according to one or more predetermined criteria;
selecting by the device a second element from the selected category of elements;
determining by the device a third value for the second element;
determining by the device a fourth value for the second element based on at least one of the first value of the first element, the second value of the first element, and the third value of the second element; and
causing the wagering game to be modified such that the second value for the first element and the fourth value for the second element are utilized in play of the wagering game.

25. A method performed by a device operable to facilitate a wagering game, comprising:
determining by a device operable to facilitate a wagering game at least two categories of elements of the wagering game,
wherein each of the at least two categories has a ranking relative to each of the others;
causing the at least two categories of elements to be presented to a player,
wherein the at least two categories of elements are presented according to their respective rankings;
receiving by the device and from the player a selection of one of the at least two categories of elements;
causing one or more elements from within the selected category of elements to be presented to the player;
receiving by the device and from the player a selection of one of the presented elements;
modifying by the device the value of the element; and
causing the wagering game to be modified such that the modified value of the element is utilized in play of the wagering game.

26. The method of claim 25, wherein the step of presenting the at least two categories of elements comprises:
presenting two or more of the at least two categories of elements in rank order,
wherein a higher ranking of the presented categories is presented before a lower ranking of the presented categories.

27. The method of claim 25, wherein the step of presenting the at least two categories of elements comprises:
determining, from among the at least two categories of elements, a first category of a first rank;
determining, from among the at least two categories of elements, a second category of a second rank,
wherein the second rank is lower than the first rank;
presenting the first category; and
not presenting the second category.

28. The method of claim 25, wherein the step of presenting the at least two categories of elements comprises:
presenting for player customization the at least two categories of elements,
wherein the at least two categories of elements are presented according to their ranking.

29. The method of claim 25, wherein the step of presenting the at least two categories of elements comprises:
presenting, for use in compensating for player customizations, the at least two categories of elements,
wherein the at least two categories of elements are presented according to their ranking.

30. A method performed by a device operable to facilitate a wagering game, comprising:
modifying, by a device operable to facilitate a wagering game and in response to a request from a player, a value of a first element of the wagering game from a first value to a second value;
determining by the device a first monetary worth per unit value of the first element;
determining by the device a second element of the gaming device;
determining by the device a third value of the second element;
determining by the device a second monetary worth per unit value of the second element;
determining by the device a fourth value for the second element based on at least one of the first value of the first element, the second value of the first element, the first monetary worth, the second monetary worth, and the third value of the second element; and
causing the wagering game to be modified such that the second value for the first element and the fourth value for the second element are utilized in play of the wagering game.

* * * * *